US007496750B2

(12) United States Patent
Kumar et al.

(10) Patent No.: US 7,496,750 B2
(45) Date of Patent: *Feb. 24, 2009

(54) PERFORMING SECURITY FUNCTIONS ON A MESSAGE PAYLOAD IN A NETWORK ELEMENT

(75) Inventors: Sandeep Kumar, Cupertino, CA (US); Subramanian Srinivasan, San Jose, CA (US); Tefcros Anthias, Los Altos, CA (US); Subramanian N. Iyer, Cupertino, CA (US); Christopher R. Wiborg, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 11/007,421

(22) Filed: Dec. 7, 2004

(65) Prior Publication Data
US 2006/0123226 A1    Jun. 8, 2006

(51) Int. Cl.
*H04L 29/00* (2006.01)
(52) U.S. Cl. .................. 713/154; 713/153; 713/160; 726/13; 370/351; 370/389; 709/226
(58) Field of Classification Search .............. 713/153, 713/154, 160; 726/13; 370/351, 389; 709/226
See application file for complete search history.

(56) References Cited

U.S. PATENT DOCUMENTS

| | | | |
|---|---|---|---|
| 5,790,542 A * | 8/1998 | Kim et al. .............. 370/392 |
| 6,021,135 A | 2/2000 | Ishihara et al. |
| 6,115,378 A * | 9/2000 | Hendel et al. ........... 370/392 |
| 6,145,079 A * | 11/2000 | Mitty et al. ............. 713/170 |
| 6,341,130 B1 | 1/2002 | Lakshman et al. |
| 6,356,951 B1 | 3/2002 | Gentry, Jr. |

(Continued)

FOREIGN PATENT DOCUMENTS

WO    WO 03/021465 A1    3/2003

OTHER PUBLICATIONS

Michael Burns, Gregory Prier, Jelena Mirkovic, Peter Reiher; "Implementing Address Assurance in the Intel IXP Router"; Western Network Processors Conference, Oct. 2002; 17 pages. "www.cs.princeton.edu/~mburns/papers/isaveixp2002.pdf".*

(Continued)

*Primary Examiner*—Carl Colin
(74) *Attorney, Agent, or Firm*—Hickman Palermo Truong & Becker LLP

(57) ABSTRACT

Techniques are provided for performing security functions on a message payload in a network element. According to one aspect, a network element receives one or more data packets. The network element performs a security function on at least a portion of an application layer message that is contained in one or more payload portions of the one or more data packets. According to another aspect, a network element receives a first request that is destined for a first application. The network element sends, to a second application that sent the first request, a second request for authentication information. The network element receives the authentication information and determines whether the authentication information is valid. If the authentication information is not valid, then the network element prevents the first request from being sent to the first application.

50 Claims, 33 Drawing Sheets

U.S. PATENT DOCUMENTS

| | | |
|---|---|---|
| 6,510,434 B1 | 1/2003 | Anderson et al. |
| 6,510,464 B1 * | 1/2003 | Grantges et al. ............ 709/225 |
| 6,587,431 B1 | 7/2003 | Almulhem et al. |
| 6,597,918 B1 | 7/2003 | Kim |
| 6,678,827 B1 | 1/2004 | Rothermel et al. |
| 6,683,881 B1 | 1/2004 | Mijares et al. |
| 6,718,326 B2 | 4/2004 | Uga et al. |
| 6,745,041 B2 | 6/2004 | Allison et al. |
| 6,772,211 B2 | 8/2004 | Lu et al. |
| 6,772,223 B1 | 8/2004 | Corl, Jr. et al. |
| 6,785,732 B1 | 8/2004 | Bates et al. |
| 6,792,002 B2 | 9/2004 | Tezuka et al. |
| 6,816,455 B2 | 11/2004 | Goldberg et al. |
| 6,965,599 B1 | 11/2005 | Sakurai et al. |
| 6,996,842 B2 * | 2/2006 | Strahm et al. ................. 726/13 |
| 7,111,076 B2 * | 9/2006 | Abjanic et al. ............. 709/246 |
| 7,111,163 B1 * | 9/2006 | Haney ........................ 713/153 |
| 7,126,907 B2 | 10/2006 | Carpini et al. |
| 7,149,222 B2 | 12/2006 | Wiryaman et al. |
| 7,185,365 B2 * | 2/2007 | Tang et al. ................... 726/13 |
| 7,215,641 B1 | 5/2007 | Bechtolsheim et al. |
| 7,239,634 B1 * | 7/2007 | Chakravorty ................ 370/392 |
| 7,245,620 B2 * | 7/2007 | Shankar ...................... 370/392 |
| 7,296,268 B2 | 11/2007 | Darling et al. |
| 7,299,361 B1 | 11/2007 | Kim et al. |
| 7,362,763 B2 | 4/2008 | Wybenga et al. |
| 7,363,353 B2 * | 4/2008 | Ganesan et al. ............. 709/218 |
| 7,376,755 B2 * | 5/2008 | Pandya ....................... 709/250 |
| 2002/0046286 A1 * | 4/2002 | Caldwell et al. ............ 709/229 |
| 2002/0126672 A1 | 9/2002 | Chow et al. |
| 2002/0136403 A1 | 9/2002 | Henson et al. |
| 2002/0161907 A1 | 10/2002 | Moon |
| 2002/0165957 A1 | 11/2002 | Devoe et al. |
| 2002/0194342 A1 | 12/2002 | Lu et al. |
| 2002/0194345 A1 | 12/2002 | Lu et al. |
| 2002/0194350 A1 | 12/2002 | Lu et al. |
| 2003/0018726 A1 * | 1/2003 | Low et al. ................... 709/206 |
| 2003/0028599 A1 | 2/2003 | Kolsky |
| 2003/0095569 A1 | 5/2003 | Wengrovitz et al. |
| 2003/0105903 A1 | 6/2003 | Garnett et al. |
| 2003/0112802 A1 | 6/2003 | Ono et al. |
| 2003/0112809 A1 * | 6/2003 | Bharali et al. ............... 370/400 |
| 2003/0115448 A1 * | 6/2003 | Bouchard ................... 713/153 |
| 2004/0001444 A1 | 1/2004 | Sadot et al. |
| 2004/0054886 A1 * | 3/2004 | Dickinson et al. ........... 713/153 |
| 2004/0088585 A1 * | 5/2004 | Kaler et al. ................. 713/201 |
| 2004/0121789 A1 | 6/2004 | Lindsey |
| 2004/0133775 A1 * | 7/2004 | Callas et al. ................ 713/153 |
| 2004/0136371 A1 | 7/2004 | Muralidhar et al. |
| 2004/0167986 A1 | 8/2004 | Gilfix et al. |
| 2004/0170182 A1 | 9/2004 | Higashida et al. |
| 2004/0205336 A1 * | 10/2004 | Kessler et al. ............... 713/160 |
| 2004/0221319 A1 | 11/2004 | Zenoni |
| 2004/0267920 A1 | 12/2004 | Hydrie et al. |
| 2005/0021836 A1 | 1/2005 | Reed et al. |
| 2005/0050362 A1 * | 3/2005 | Peles .......................... 713/201 |
| 2005/0063377 A1 | 3/2005 | Bryant et al. |
| 2005/0071508 A1 * | 3/2005 | Brown et al. ................ 709/246 |
| 2005/0117576 A1 | 6/2005 | McDysan et al. |
| 2005/0216727 A1 * | 9/2005 | Chattopadhyay et al. .... 713/151 |
| 2006/0031374 A1 | 2/2006 | Lu et al. |
| 2006/0123467 A1 | 6/2006 | Kumar et al. |
| 2006/0123479 A1 | 6/2006 | Kumar et al. |
| 2006/0129650 A1 | 6/2006 | Ho et al. |
| 2006/0129689 A1 | 6/2006 | Ho et al. |
| 2006/0146879 A1 | 7/2006 | Anthias et al. |
| 2006/0155862 A1 | 7/2006 | Kathi et al. |
| 2006/0167975 A1 | 7/2006 | Chan et al. |
| 2006/0168334 A1 | 7/2006 | Potti et al. |

OTHER PUBLICATIONS

Marc Girardot and Neel Sundaresan. Millau: an encoding format for efficient representation and exchange for XMLover the web. [retrieved Jan. 31, 2005]. Retrieved from the internet: <URL: http://www9.org/w9cdrom/154/154.html>.

Fujitsu Limited, et al.. Web Services Reliability (WS-Reliability). Ver1.0. Jan. 8, 2003. pp. 1-45.

Ruslan Bilorusets et al.. Web Services Reliable Messaging Protocol (WS-ReliableMessaging). Mar. 2004.

International Searching Authority, "Notification of Transmittal of the International Search Report and the Written Opinion of the International Searching Authority, or the Declaration," PCT/US2006/024375, dated Oct. 17, 2006, 10 pages.

Current Claims, PCT/US2006/024375, 6 pages.

Decasper, Dan et al., "Router Plugins: A Software Architecture for Next-Generation Routers," IEEE ACM Transactions on Networking, vol. 9, No. 1, Feb. 2000, XP011038838, 14 pages.

International Searching Authority, "Notification of Transmittal of the International Search Report and the Written Opinion of the International Searching Authority, or the Declaration," PCT/US05/45625, dated Oct. 20, 2006, 7 pages.

Current Claims PCT/US05/45625, 9 pages.

International Searching Authority, "Notification of Transmittal of the International Search Report and the Written Opinion of the International Searching Authority, or the Declaration," PCT/US05/40861, dated Nov. 17, 2006, 7 pages.

Current Claims PCT/US05/40861, 6 pages.

International Searching Authority, "Notification of Transmittal of the International Search Report and the Written Opinion of the International Searching Authority, or the Declaration," PCT/US05/44171, dated Nov. 17, 2006, 7 pages.

Current Claims, PCT/US05/44171, 9 pages.

International Searching Authority, "Notification of Transmittal of the International Search Report and the Written Opinion of the International Searching Authority, or the Declaration," PCT/US05/43599, dated Feb. 28, 2007, 8 pages.

Current Claims, PCT/US05/43599, 8 pages.

International Searching Authority, "Notification of Transmittal of the International Search Report and the Written Opinion of the International Searching Authority, or the Declaration," PCT/US05/41254, dated Mar. 28, 2007, 7 pages.

Current Claims, PCT/US05/41254, 11 pages.

Girardot, Marc, et al., "Millau: An Encoding Format for Efficient Representation and Exchange of XML Over the Web", Computer Networks, Netherlands, vol. 33, Jun. 2000, 22 pages.

International Searching Authority, "Notification of Transmittal of the International Search Report and the Written Opinion of the International Searching Authority, or the Declaration", International application No. PCT/US05/46149, dated Jul. 20, 2007, 9 pages.

Claims, International application No. PCT/US05/46149, 10 pages.

* cited by examiner

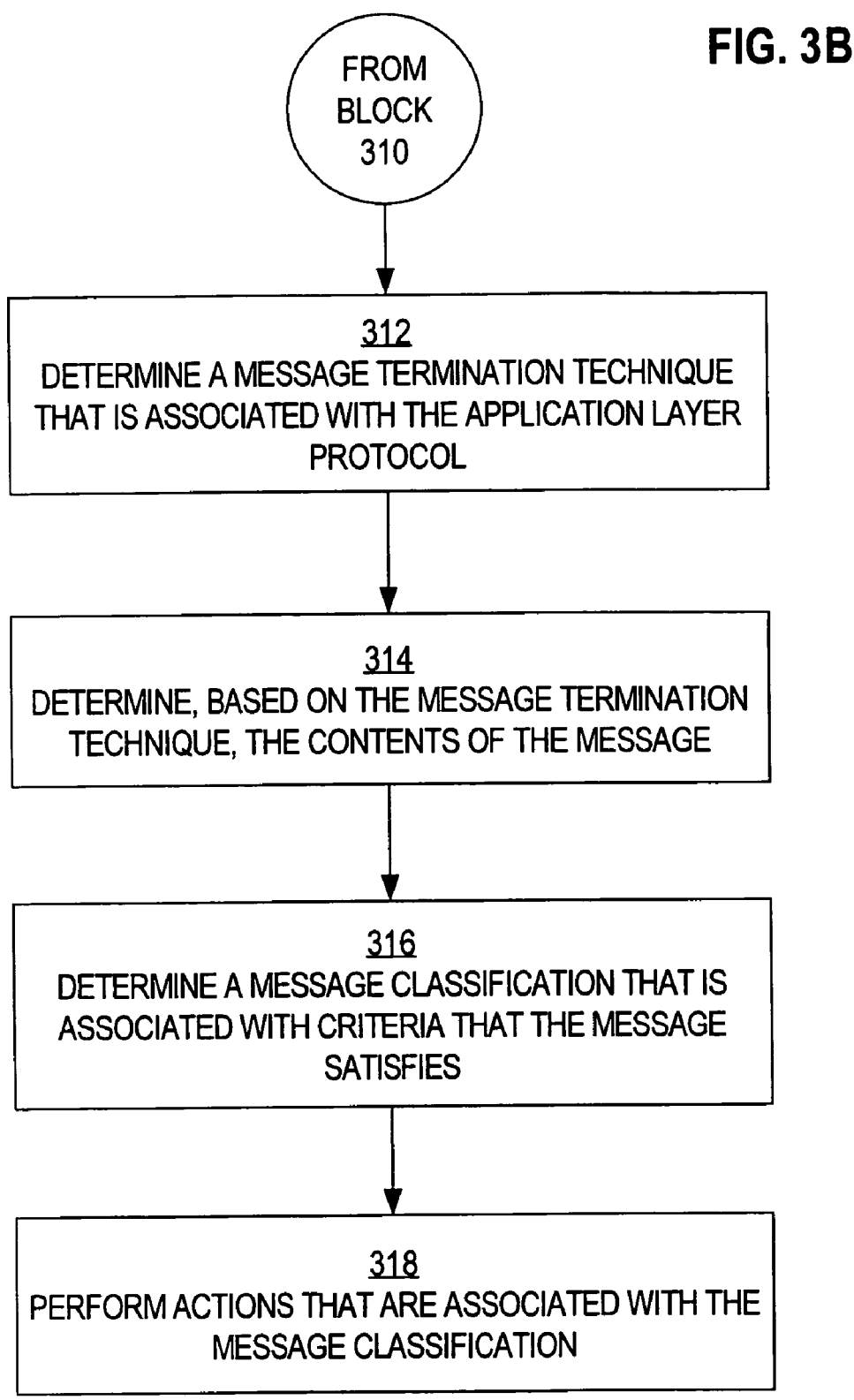

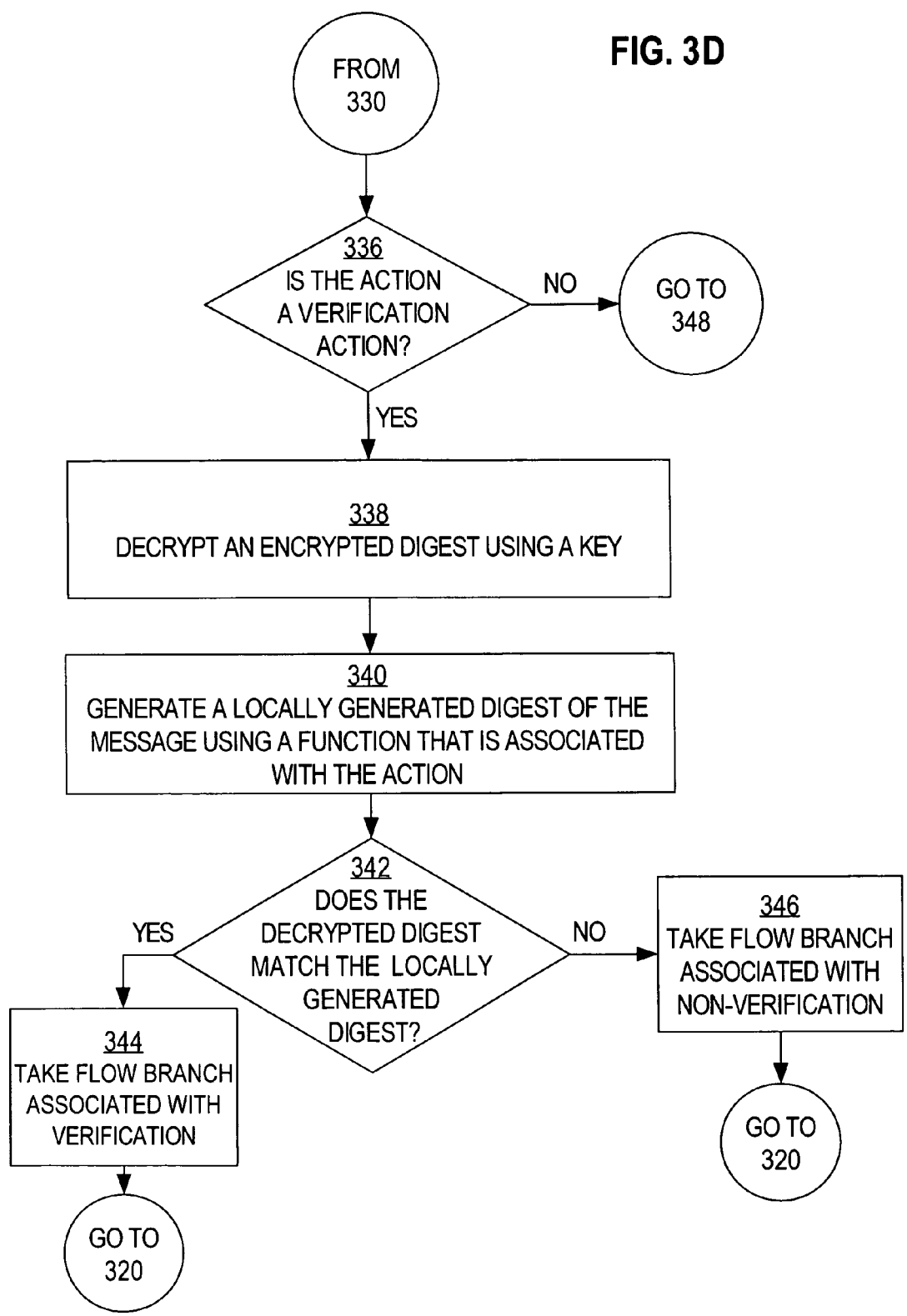

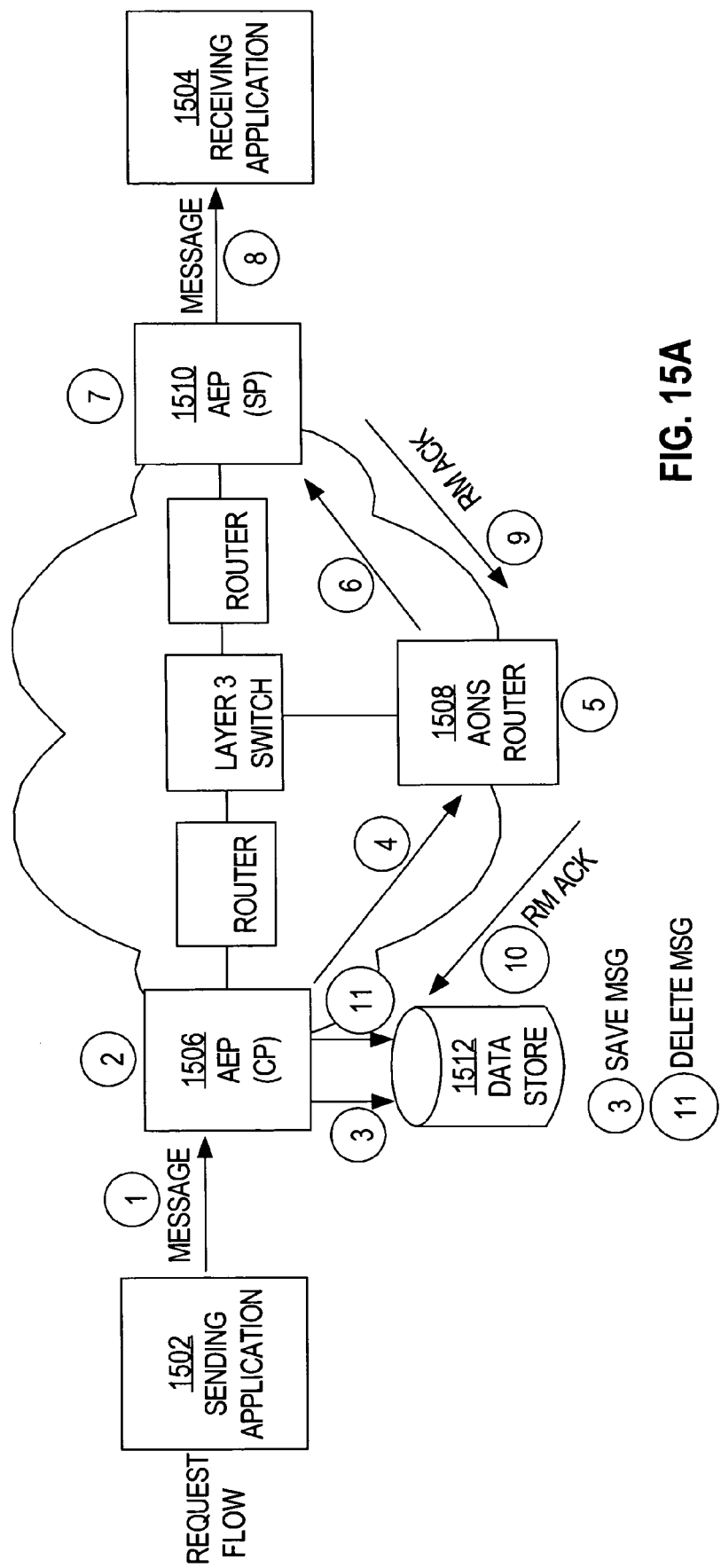

PERFORMING SECURITY FUNCTIONS ON A MESSAGE PAYLOAD IN A NETWORK ELEMENT

RELATED APPLICATIONS

This application is related to U.S. patent application Ser. No. 10/991,792 entitled "PERFORMING MESSAGE AND TRANSFORMATION ADAPTER FUNCTIONS IN A NETWORK ELEMENT ON BEHALF OF AN APPLICATION", by Pravin Singhal, Qingqing Li, Juzar Kothambalawa, Parley Van Oleson, Wai Yip Tung, and Sunil Potti, filed on Nov. 17, 2004; and U.S. patent application Ser. No. 10/997,616 entitled "CACHING CONTENT AND STATE DATA AT A NETWORK ELEMENT", by Alex Yiu-Man Chan, Snehal Haridas, and Raj De Datta, filed on Nov. 23, 2004; the contents of which are incorporated by reference in their entirety for all purposes as though fully disclosed herein.

FIELD OF THE INVENTION

The present invention generally relates to network elements, such as switches and routers, in computer networks. The invention relates more specifically to a method and apparatus for performing security functions on a message payload in a network element.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a business-to-business environment, applications executing on computers commonly communicate with other applications that execute on other computers. For example, an application "A" executing on a computer "X" might send, to an application "B" executing on a computer "Y," a message that indicates the substance of a purchase order.

Computer "X" might be remote from computer "Y." In order for computer "X" to send the message to computer "Y," computer "X" might send the message through a computer network such as a local area network (LAN), a wide-area network (WAN), or an inter-network such as the Internet. In order to transmit the message through such a network, computer "X" might use a suite of communication protocols. For example, computer "X" might use a network layer protocol such as Internet Protocol (IP) in conjunction with a transport layer protocol such as Transport Control Protocol (TCP) to transmit the message.

Assuming that the message is transmitted using TCP, the message is encapsulated into one or more data packets; separate portions of the same message may be sent in separate packets. Continuing the above example, computer "X" sends the data packets through the network toward computer "Y." One or more network elements intermediate to computer "X" and computer "Y" may receive the packets, determine a next "hop" for the packets, and send the packets towards computer "Y."

For example, a router "U" might receive the packets from computer "X" and determine, based on the packets being destined for computer "Y," that the packets should be forwarded to another router "V" (the next "hop" on the route). Router "V" might receive the packets from router "U" and send the packets on to computer "Y." At computer "Y" the contents of the packets may be extracted and reassembled to form the original message, which may be provided to application "B." Applications "A" and "B" may remain oblivious to the fact that the packets were routed through routers "U" and "V." Indeed, separate packets may take separate routes through the network.

The route that a packet takes through a network might not be secure. Parties intermediate to applications "A" and "B" in the network might be able to intercept packets and determine the packets' contents. Under circumstances where packets contain confidential or sensitive information, the consequences of such illicit interception can be disastrous.

In order to prevent intermediate parties from understanding intercepted packets and using the contents thereof for illicit purposes, applications may encrypt messages prior to sending packets that contain those messages through an untrusted network. One popular method of encryption is public key encryption. For example, application "A" might want to send a message to application "B" using public key encryption. Therefore, application "A" might encrypt the message using application "B's" public key. In encrypted form, the message is not understandable. Because the message is encrypted using application "B's" public key, only application "B's" private key can be used to decrypt the message, and only application "B" possesses application "B's" private key. Application "A" might send the encrypted message within one or more packets to application "B" as described above. Upon receiving the encrypted message, application "B" may use application "B's" private key to decrypt the message. Thus decrypted, the message is in the same form as before the message was encrypted. Another method of encryption is symmetric key encryption, in which both applications "A" and "B" use the same key to encrypt and decrypt messages, and only applications "A" and "B" possess the key.

In practice, the above encryption/decryption process can be more complicated than it initially seems. Taking public key encryption as an example, application "A" needs to obtain application "B's" public key before application "A" can encrypt messages to be sent to application "B." To provide application "B's" public key to application "A," a user of application "B" might e-mail the public key to a user of application "A." If this approach is used widely, then the user of application "B" will need to e-mail the public key not only to the user of application "A," but also to every potential sender of encrypted messages to application "B." There might be multitudes of such senders.

Complicating this situation is the fact that private keys sometimes expire or become lost. For example, if the hard drive of computer "Y" crashes, and if application "B's" private key was only stored on the hard drive (not an unreasonable scenario, given the private nature of the key), then application "B's" private key will be lost and application "B" will need to generate a new private key. Regardless of the reasons for needing to generate a new private key, along with the new private key, application "B" will need to generate a new corresponding public key; the new private key cannot be used to decrypt messages that have been encrypted using the old public key, so application "B" will need to inform all of the senders mentioned above that the old public key is no longer valid and that the new public key should be used instead.

The plight of application "A" is also considerable. Application "A" might send encrypted messages to many different recipients. Each recipient might have a different public key. It may be difficult for the user of application "A" to keep so many different public keys organized and up-to-date. If the e-mail approach to key distribution is used, then much of a user's time might be consumed with sending and receiving public keys or symmetric keys.

It is possible that only some, and not all, messages sent by application "A" ought to be encrypted. For example, application "A" might reside on the same trusted network as another application "C," and therefore, application "A" would not need to encrypt messages that are to be sent to application "C." For another example, application "A" might send, to another application "D," messages that are not confidential or sensitive in nature, and therefore, application "A" would not need to encrypt messages that are to be sent to application "D."

Because encryption and decryption sometimes involves significant processing overhead, not to mention the key exchanges discussed above, avoiding unnecessary encryption and decryption is often desirable. However, as matters stand, the determination of whether to encrypt or decrypt a message is often made on a message-by-message basis by an application's user, even in cases where the user knows with reasonable certainty beforehand that all messages having certain common characteristics do or do not need to be secured. These all-too-frequent determinations burden users and consume time that might otherwise be applied to more meaningful pursuits.

Thus, the "application-managed security" approach described above is impractical when applied to systems in which large numbers of applications need to communicate with each other in a secure manner. A more practical technique for allowing a multitude of applications to communicate with each other in a secure manner is needed.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A-F depict a flow diagram that illustrates one embodiment of a method of performing security functions at a network element, or as an intermediary application, on behalf of an application;

FIG. 15A and FIG. 15B are diagrams that illustrate a request/response message flow with reliable message delivery;

DETAILED DESCRIPTION

Figure 1:
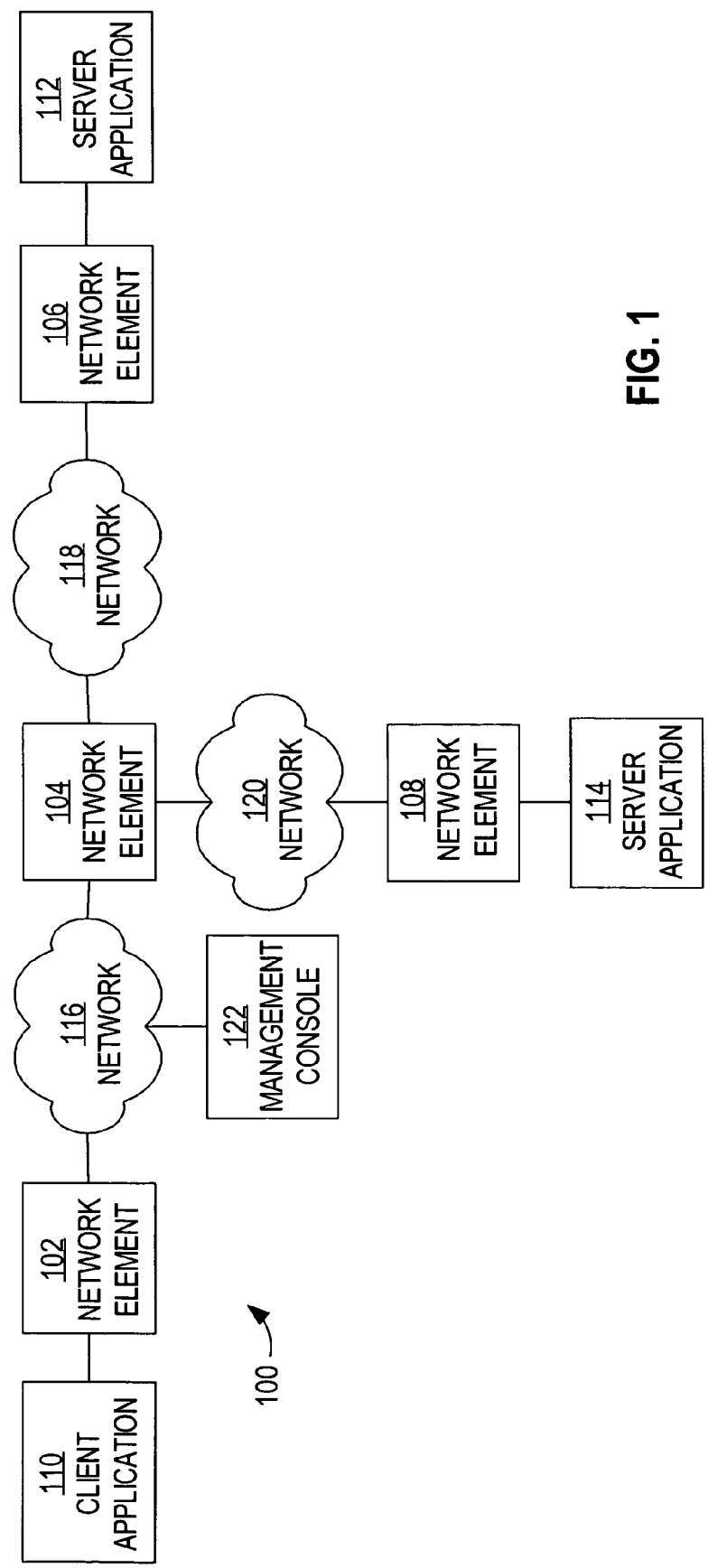
FIG. 1 is a block diagram that illustrates an overview of one embodiment of a system in which one or more network elements perform message payload processing functions on behalf of an application.

A method and apparatus for performing security functions on a message payload in a network element is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Examples
   3.1 Multi-Blade Architecture
   3.2 Performing Security Functions on Message Payloads in a Network Element
   3.3 Action Flows
   3.4 AONS Examples
      3.4.1 AONS General Overview
      3.4.2 AONS Terminology
      3.4.3 AONS Functional Overview
      3.4.4 AONS System Overview
      3.4.5 AONS System Elements
      3.4.6 AONS Example Features
      3.4.7 AONS Functional Modules
      3.4.8 AONS Modes of Operation
      3.4.9 AONS Message Routing
      3.4.10 Flows, Bladelets™, and Scriptlets™
      3.4.11 AONS Services
      3.4.12 AONS Configuration and Management
      3.4.13 AONS Monitoring
      3.4.14 AONS Tools 4.0 Implementation Mechanisms-Hardware Overview 5.0 Extensions and Alternatives

1.0 GENERAL OVERVIEW

The needs identified in the foregoing Background, and other needs and objects that will become apparent for the following description, are achieved in the present invention, which comprises, in one aspect, a method for performing security functions on a message payload in a network element on behalf of an application. According to one embodiment, one or more data packets are received at a network element such as a router, switch, network appliance, or other device that is attached or connected to a switch or router and that performs OSI Layer 2 and above processing. At the network element, an encryption function or a decryption function is performed on at least a portion of an application layer message that is contained in one or more payload portions of the one or more data packets. According to one embodiment, a network element performs an authentication function on behalf of an application. Thus, a network element may process an application layer message by performing security-related functions relative to the message.

Because a network element such as a router or a switch can perform encryption and decryption functions on messages, sending and receiving applications are spared the burden of performing such functions. Public, private and/or symmetric keys may be made accessible to the network element so that the network element can use the keys to perform specified cryptographic operations on messages that satisfy specified criteria. As a result, such keys do not need to be distributed and redistributed among applications involved in cryptographically protected communications. When a particular key needs to be updated, the key may be updated at relevant network elements that are intermediate to the applications. Applications do not even need to be "aware" that messages that the application send and receive are being cryptographically protected.

According to one embodiment, processing an application layer message comprises conceptually separating the contents of the application layer message from the remainder of the one or more data packets and inspecting and interpreting the contents in a manner that is based on semantics associated with the contents. This kind of inspection, which is more fine-grained than packet-level inspection, may be referred to as "deep content inspection." For example, each part of a multi-part (MIME) message may be separately interpreted, inspected, and handled based on the semantics associated with that part. For example, if a part of a multi-part message is a JPEG image, then that part is inspected based on JPEG semantics; if a part of a multi-part message is an XML document, then that part is inspected based on XML semantics; other parts may be inspected based on different semantics. The distinct components of a message are understood by the semantics associated with that message. Each distinct component of a message may be handled in a different manner based on that component's type. For example, a JPEG image part might be encrypted with one key and signed, but an XML document part might be encrypted with a different key and remain unsigned.

In other aspects, the invention encompasses a computer apparatus and a computer-readable medium configured to carry out the foregoing steps.

2.0 STRUCTURAL AND FUNCTIONAL OVERVIEW

FIG. 1 is a block diagram that illustrates an overview of one embodiment of a system 100 in which one or more of network elements 102, 104, 106, and 108 perform security functions on message payloads. Network elements 102, 106, and 108 may be proxy devices, for example. Network element 104 may be a network router or a switch such as router 600 depicted in FIG. 6 below, for example.

Client application 110 is coupled communicatively with network element 102. A server application 112 is coupled communicatively to network element 106. A server application 114 is coupled communicatively to network element 108. Each of client application 110 and server applications 112 and 114 may be a separate computer. Alternatively, each of client application 110 and server applications 112 and 114 may be a separate process executing on separate computers.

Network elements 102 and 104 are coupled communicatively with a network 116. Network elements 104 and 106 are coupled communicatively with a network 118. Network elements 104 and 108 are coupled communicatively with a network 120. Each of networks 116, 118, and 120 is a computer network, such as, for example, a local area network (LAN), wide area network (WAN), or internetwork such as the Internet. Networks 116, 118, and 120 may contain additional network elements such as routers.

In one embodiment, client application 110 addresses messages to server applications 112 and 114, and network elements 102, 104, 106, and 108 intercept the data packets that contain the messages. In an alternative embodiment, client application 110 explicitly addresses messages to network element 102. Network elements 102, 104, 106, and 108 assemble one or more data packets to determine at least a portion of a message contained therein. Network elements 102, 104, 106, and 108 perform security functions, such as encryption and decryption, on the messages.

A management console 122 may be coupled communicatively to one or more of networks 116, 118, and 120. Through management console 122, configuration information may be entered and distributed, through networks 116, 118, and 120, to network elements 102, 104, 106, and 108. Such configuration information may include cryptographic keys that can be used to encrypt and decrypt information. Such configuration information may indicate mappings between message classifications and security functions. The message classifications may indicate criteria that packets and/or messages need to satisfy in order to belong to those message classifications. The security functions may designate keys that are to be used in performing cryptographic operations.

For example, using management console 122, a first mapping may be established between a first message classification and a first encryption function. Criteria associated with the first message classification may indicate, for example, that only messages contained in data packets originating from client application 110 and destined for server application 112 belong to the first message classification. The first encryption function may specify, for example, that messages are to be encrypted using a first public key. The first public key may be provided to management console 122, for example.

With the first mapping established at management console 122, the first mapping may be propagated to specified ones of network elements 102, 104, 106, and 108. For example, management console 122 may propagate the first mapping to network element 102. Network element 102 may store the first mapping in a mapping structure.

Also using management console 122, a second mapping may be established between the first message classification and a first decryption function. The first decryption function may specify, for example, that messages be decrypted using a first private key that corresponds to the first public key. The first private key may be provided to management console 122, for example.

With the second mapping established at management console 122, the second mapping may be propagated to specified ones of network elements 102, 104, 106, and 108. For example, management console 122 may propagate the second mapping to network element 106. Network element 106 may store the second mapping in a mapping structure.

Assuming the above scenario, when network element 102 receives one or more data packets that collectively contain a message originating from client application 110 and destined for server application 112, network element 102 determines that the message belongs to the first message classification. Network element 102 determines from the first mapping that the first message classification is mapped to the first encryption function. In response to this determination, network element 102 encrypts the message using the first public key specified in the first encryption function, and sends the encrypted message in one or more data packets towards the message's destination.

The data packets containing the encrypted message are eventually received by network element 106. When network element 106 receives the data packets, network element 106 determines that the message belongs to the first message classification. Network element 106 determines from the second mapping that the first message classification is mapped to the first decryption function. In response to this determination, network element 106 decrypts the message using the first private key specified in the first decryption function, and sends the decrypted message in one or more data packets towards the message's destination.

Server application 112 receives the data packets that contain the decrypted message. Unbeknownst to client application 110 and server application 112, the message was cryptographically protected during the message's travels through networks 116 and 118.

Extending the above example, using management console 122, a third mapping may be established between a second message classification and a second encryption function. Criteria associated with the second message classification may indicate, for example, that only messages contained in data packets originating from client application 110 and destined for server application 114 belong to the second message classification. The second encryption function may specify, for example, that messages are to be encrypted using a second public key that differs from the first public key. The second public key may be provided to management console 122, for example.

With the third mapping established at management console 122, the third mapping may be propagated to specified ones of network elements 102, 104, 106, and 108. For example, management console 122 may propagate the third mapping to network element 102. Network element 102 may store the third mapping in a mapping structure.

Also using management console 122, a fourth mapping may be established between the second message classification and a second decryption function. The second decryption function may specify, for example, that messages be decrypted using a second private key that corresponds to the second public key. The second private key may be provided to management console 122, for example.

With the fourth mapping established at management console 122, the fourth mapping may be propagated to specified ones of network elements 102, 104, 106, and 108. For example, management console 122 may propagate the fourth mapping to network element 108. Network element 108 may store the fourth mapping in a mapping structure.

Assuming the above scenario, when network element 102 receives one or more data packets that collectively contain a message originating from client application 110 and destined for server application 114, network element 102 determines that the message belongs to the second message classification. Network element 102 determines from the third mapping that the second message classification is mapped to the second encryption function. In response to this determination, network element 102 encrypts the message using the second public key specified in the second encryption function, and sends the encrypted message in one or more data packets towards the message's destination.

The data packets containing the encrypted message are eventually received by network element 108. When network element 108 receives the data packets, network element 108 determines that the message belongs to the second message classification. Network element 108 determines from the fourth mapping that the second message classification is mapped to the second decryption function. In response to this determination, network element 106 decrypts the message using the second private key specified in the second decryption function, and sends the decrypted message in one or more data packets towards the message's destination.

Server application 114 receives the data packets that contain the decrypted message. Unbeknownst to client application 110 and server application 114, the message was cryptographically protected during the message's travels through networks 116 and 120.

Encryption and decryption are not the only security functions that network elements 102, 104, 106, and 108 can perform on messages traveling between applications 110, 112, and 114. Network elements 102, 104, 106, and 108 can also perform signing and verification functions on messages traveling between applications 110, 112, and 114.

For example, using management console 122, a fifth mapping may be established between the first message classification and a first signature function. The first signature function may specify, for example, that digests of messages are to be created using a first hash function, and that such digests are to be encrypted using the first public key, thereby creating signatures.

With the fifth mapping established at management console 122, the fifth mapping may be propagated to specified ones of network elements 102, 104, 106, and 108. For example, management console 122 may propagate the fifth mapping to network element 102. Network element 102 may store the fifth mapping in a mapping structure.

Also using management console 122, a sixth mapping may be established between the first message classification and a first verification function. The first verification function may specify, for example, that digests of messages are to be created using the first hash function, and that encrypted digests (i.e., signatures) are to be decrypted using the first private key, which corresponds to the first public key.

With the sixth mapping established at management console 122, the sixth mapping may be propagated to specified ones of network elements 102, 104, 106, and 108. For example, management console 122 may propagate the sixth mapping to network element 106. Network element 106 may store the sixth mapping in a mapping structure.

Assuming the above scenario, when network element 102 receives one or more data packets that collectively contain a message originating from client application 110 and destined for server application 112, network element 102 determines that the message belongs to the first message classification. Network element 102 determines from the fifth mapping that the first message classification is mapped to the first signature function. In response to this determination, network element 102 generates a digest by inputting the message into the first hash function. Network element 102 also encrypts the digest using the first public key specified in the first signature function, and sends the encrypted digest (i.e., signature) with the message in one or more data packets towards the message's destination.

The data packets containing the message and the encrypted digest are eventually received by network element 106. When network element 106 receives the data packets, network element 106 determines that the message belongs to the first message classification. Network element 106 determines from the sixth mapping that the first message classification is mapped to the first verification function. In response to this determination, network element 106 generates a digest by inputting the message into the first hash function specified in the first verification function. Network element 106 also decrypts the encrypted digest using the first private key specified in the first verification function.

Network element 106 compares the decrypted digest with the digest that resulted from inputting the message into the first hash function. If the digests are the same, then network element 106 considers the signature to be verified. If the digests are not the same, then network element 106 considers the signature to not be verified. Network element 106 may perform one or more specified actions based on whether the signature was verified. For example, if the signature was verified, then network element 106 may send the message in one or more data packets towards the message's destination. Alternatively, if the signature was not verified, then network element 106 may prevent the message from being sent to the message's destination.

If network element 106 sends the message to the message's destination, then server application 112 receives the data packets that contain the message. Unbeknownst to client application 110 and server application 112, the message was signed after departing from client application 110 and verified before arriving at server application 112.

In addition to the encryption, decryption, signing and validation functions described above, network elements 102, 104, 106, and 108 can also perform authentication and authorization functions on behalf of applications 110, 112, and 114.

For example, network element 106 may be configured to intercept requests directed for server application 112. Network element 106 may be configured to respond to such requests with requests for authentication information. For example, network element 106 may be configured to respond to a request from client application 110 with a request for a username and password.

Assuming that client application 110 receives the request for authentication information and responds with a username and password, network element 106 may be configured to lookup the username along with a corresponding password (or password derivative, such as a one-way digest hash of a password) in a specified data store or identity store, which may be external to network element 106. Network element 106 may be configured to compare the password received from client application 110 with the password (or password derivative) associated with the username in the data store or identity store. Alternatively, network element 106 may be configured to request, from a data store or identity store that contains the username and password (or password derivative), a result that indicates whether the username matches the password; thus, for security purposes, the actual password might not be provided to network element 106. In any case, if the passwords match, then network element 106 determines that client application 110 is authentic. If the passwords do not match, then network element 106 determines that client application 110 is not authentic. Network element 106 may perform one or more specified actions based on whether an application is authentic. For example, if client application 110 is authentic, then network element 106 may send, to server application 112, the original request received from client application 110. Alternatively, if client application 110 is not authentic, then network element 106 may prevent the original request from being sent to server application 112.

Usernames and passwords in the data store or identity store may be associated with sets of permissions, also indicated in the data store or identity store. Network element 106 may classify application layer messages contained in payloads of data packets originating from client application 110. Network element 106 may determine, based on the set of permissions associated with the username received from client application 110, whether messages of particular message classifications are allowed from client application 110.

Based on whether a particular message is allowed, network element 106 may perform one or more specified actions. If a particular message belongs to a message classification that is not allowed by the set of permissions, then network element 106 may prevent the message from being sent to server application 112, for example. Alternatively, if a particular message belongs to a message classification that is allowed by the set of permissions, then network element 106 may send the message to server application 112, for example.

Multiple network elements may be configured in this manner. Thus, network elements 102, 104, 106, and 108 all may be configured to perform authentication functions and authorization functions relative to messages received from client application 110. Through management console 122, a common authentication configuration may be propagated to each of network elements 102, 104, 106, and 108. Thus, each of network elements 102, 104, 106, and 108 may be configured to perform authentication functions using authentication information stored in the same central data store or identity store.

Consequently, the risk that up-to-date authentication information may not be available to all instances of a server application is avoided. For example, assuming that server application 112 and server application 114 are separate instances of the same application, it makes no difference whether a request from client application 110 gets sent toward server application 112 or server application 114, since both network element 106 and network element 108 may authenticate client application 110 based on the same up-to-date authentication information. There is no risk that the authentication information available to network element 106 will be different from the authentication information available to network element 108.

Figure 2A:
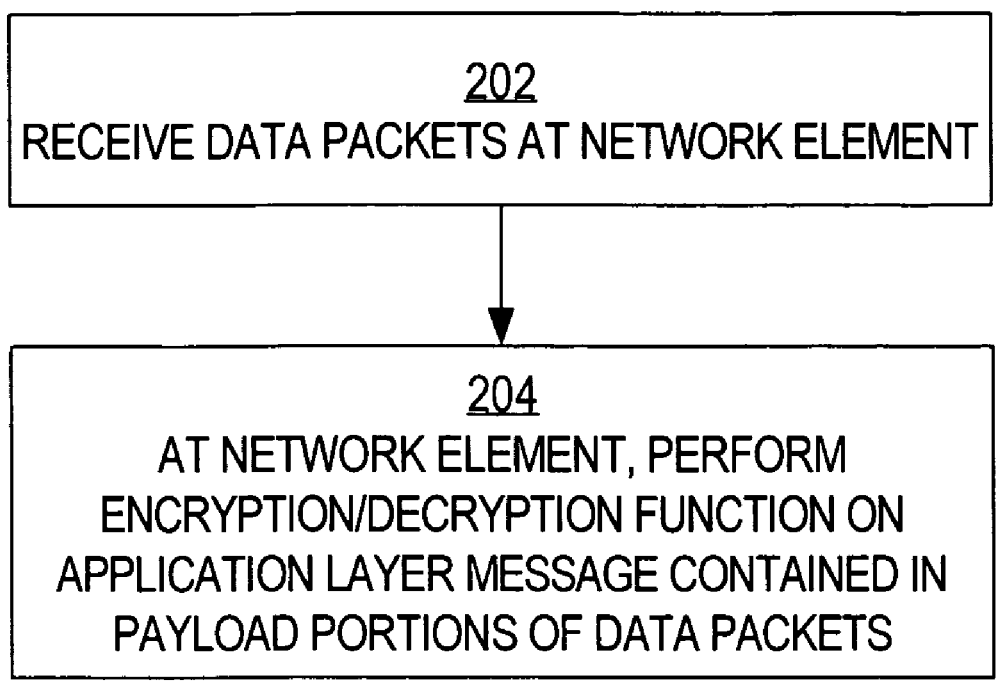
FIG. 2A depicts a flow diagram that illustrates an overview of one embodiment of a method of performing security functions on a message payload (or portion thereof) in a network element.

FIG. 2A depicts a flow diagram 200A that illustrates an overview of one embodiment of a method of performing security functions on a message payload in a network element. Such a method may be performed, for example, by any of network elements 102, 104, 106, and 108.

In block 202, a network element receives one or more data packets. The payload portions of the data packets collectively contain at least a portion of an application layer message. For example, network element 102 may receive, from client application 110, two TCP data packets that, together, contain in their payload portions an application layer message such as a Simple Mail Transfer Protocol (SMTP)-formatted message. For another example, network element 106 may receive, from network 118, two TCP data packets that, together, contain in their payload portions an encrypted application layer message that network element 102 encrypted using a particular public key. Network element 102 is capable of determining application layer message boundaries, so, in one embodiment, network element 102 may perform operations (as described below) on an application layer message contained in a stream, or portions thereof, even if network element 102 has not yet received all of the data packets that contain all of the portions of the application layer message.

In block 204, the network element performs either an encryption function or a decryption function on at least a portion of the application layer message. For example, network element 102 may encrypt, using a particular public key that corresponds to client application 110, the application layer message contained in the TCP data packets. For another example, network element 106 may decrypt, using a particular private key that corresponds to the particular public key, the encrypted application layer message contained in the TCP data packets. Once the network element has encrypted or decrypted the message, the network element may send the encrypted or decrypted message on towards the message's destination within one or more data packets. Thus, intermediate network elements may perform security functions on behalf of applications, so that the applications are spared from the burden of performing security functions themselves.

Figure 2B:
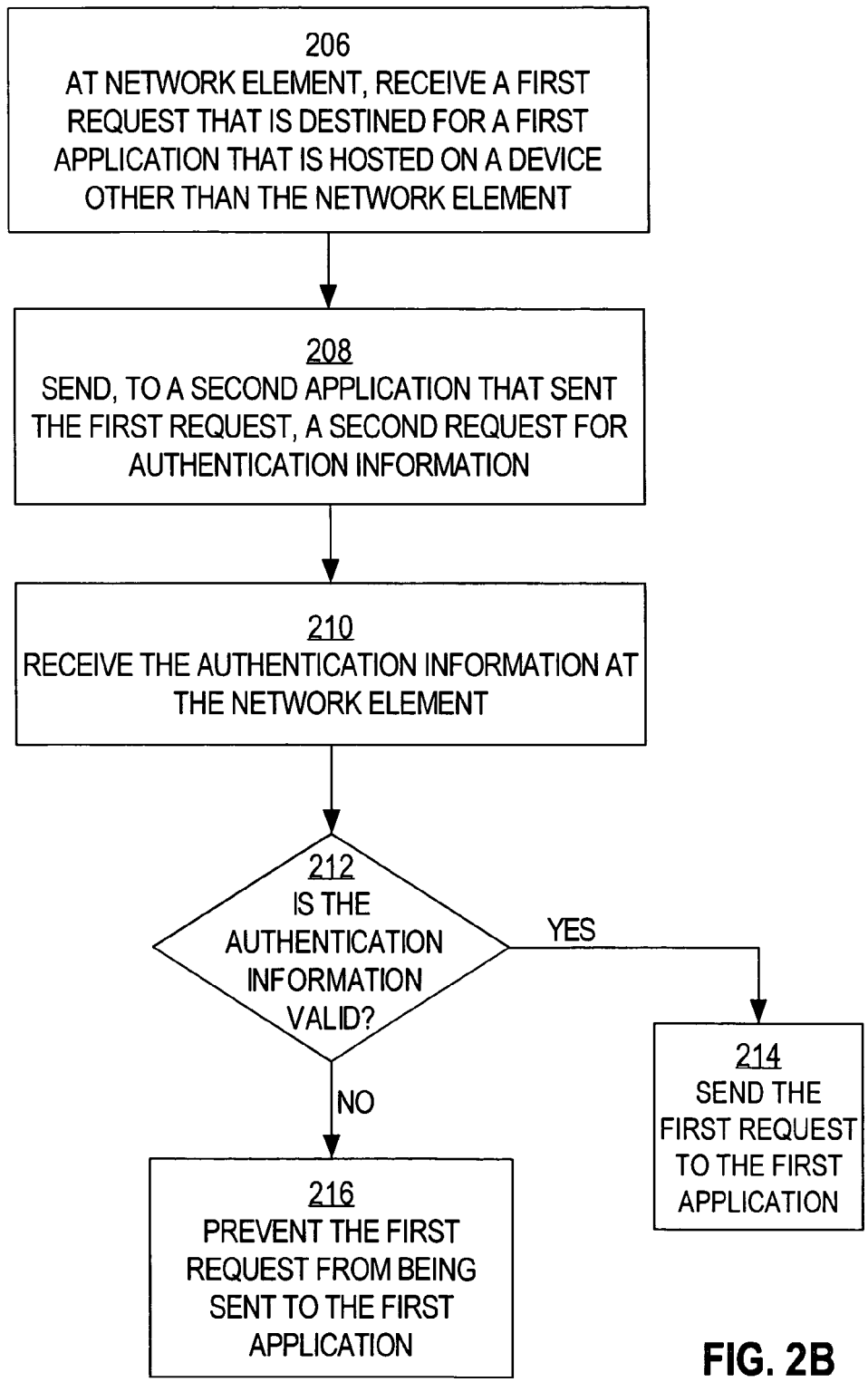
FIG. 2B depicts a flow diagram that illustrates an overview of one embodiment of a method of performing an authentication function in a network element.

FIG. 2B depicts a flow diagram 200B that illustrates an overview of one embodiment of a method of performing an authentication function in a network element. Such a method may be performed, for example, by any of network elements 102, 104, 106, and 108.

In block 206, a network element receives a first request that is destined for a first application that is hosted on a device other than the network element. For example, network element 106 may intercept a request, such as a Hypertext Transfer Protocol (HTTP) request, that client application 110 sent toward server application 112. The request may be contained, collectively, in the payload portions of one or more TCP packets, for example.

In block 208, in response to receiving the first request, the network element sends, to a second application that sent the first request, a second request for authentication information. Continuing the example, network element 106 may send, to client application 110, a request for a username and password. Network element 106 may format the message so that the message appears to come from server application 112 instead of network element 106; this may induce client application 110 to send a username and password toward server application 112.

In block 210, the network element receives the authentication information. Continuing the example, network element 106 may intercept a username and password that client application 110 sent toward server application 112. Alternatively, the authentication information may be contained in the first request, in which case the operation of block 208 do not need to be performed.

In block 212, the network element determines whether the authentication information is valid. For example, network element 106 may compare the password sent by client application 110 with a password that is associated, in a data store or identity store external to network element 106, with the username sent by client application 110. If the passwords match, then network element 106 may determine that the authentication information is valid. If the passwords do not match, the network element 106 may determine that the authentication information is invalid. If the authentication information is valid, then control passes to block 214. If the authentication information is not valid, then control passes to block 216.

In block 214, the network element sends the first request to the first application. Continuing the example, network element 106 may send, to server application 112, the request that client application 110 sent toward server application 112.

Alternatively, in block 216, the network element prevents the first request from being sent to the first application. Continuing the example, network element 106 may prevent the request that client application 110 sent towards server application 112 from being sent to server application 112. Network element 106 may accomplish this by dropping the TCP packets that contain the request, for example. Thus, intermediate network elements may perform authentication functions on behalf of applications, so that the applications are spared from the burden of performing authentication functions themselves.

3.0 IMPLEMENTATION EXAMPLES

3.1 Multi-Blade Architecture

Figure 6:
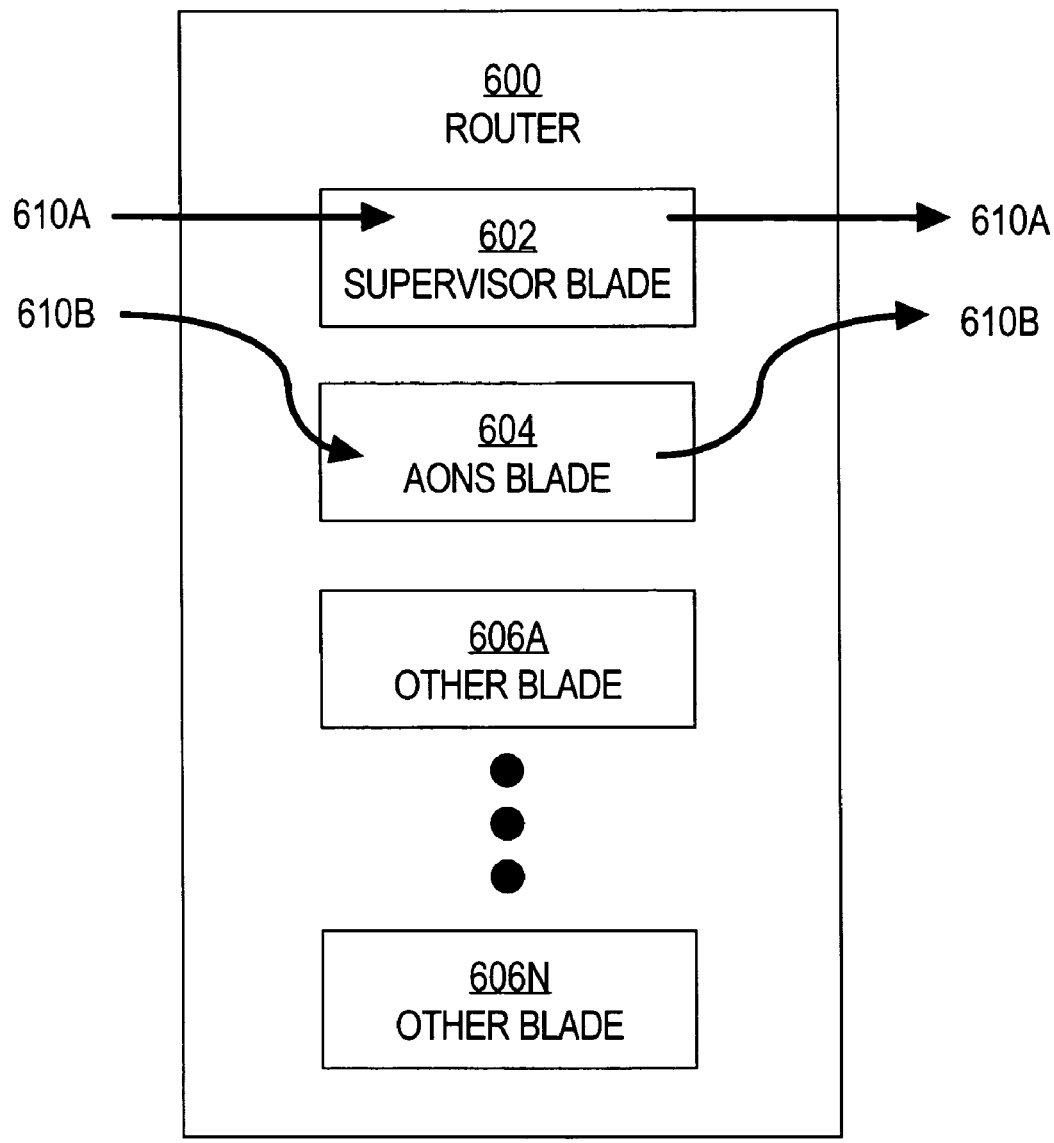
FIG. 6 is a block diagram that illustrates one embodiment of a router in which a supervisor blade directs some packet flows to an AONS blade and/or other blades.

According to one embodiment, an Application-Oriented Network Services (AONS) blade in a router or a switch performs the actions discussed above. FIG. 6 is a block diagram that illustrates one embodiment of a router 600 in which a supervisor blade 602 directs some of packet flows 610A-B to an AONS blade and/or other blades 606N. Router 600 comprises supervisor blade 602, AONS blade 604, and other blades 606A-N. Each of blades 602, 604, and 606A-N is a single circuit board populated with components such as processors, memory, and network connections that are usually found on multiple boards. Blades 602, 604, and 606A-N are designed to be addable to and removable from router 600. The functionality of router 600 is determined by the functionality of the blades therein. Adding blades to router 600 can augment the functionality of router 600, but router 600 can provide a lesser degree of functionality with fewer blades at a lesser cost if desired. One of more of the blades may be optional.

Router 600 receives packet flows such as packet flows 610A-B. More specifically, packet flows 610A-B received by router 600 are received by supervisor blade 602. Supervisor blade 602 may comprise a forwarding engine and/or a route processor such as those commercially available from Cisco Systems, Inc.

In one embodiment, supervisor blade 602 classifies packet flows 610A-B based on one or more parameters contained in the packet headers of those packet flows. If the parameters contained in the packet header of a particular packet match specified parameters, then supervisor blade 602 sends the packets to a specified one of AONS blade 604 and/or other blades 606A-N. Alternatively, if the parameters contained in the packet header do not match any specified parameters, then supervisor blade 602 performs routing functions relative to the particular packet and forwards the particular packet on toward the particular packet's destination.

For example, supervisor blade 602 may determine that packet headers in packet flow 610B match specified parameters. Consequently, supervisor blade 602 may send packets in packet flow 610B to AONS blade 604. Supervisor blade 602 may receive packets back from AONS blade 604 and/or other blades 606A-N and send the packets on to the next hop in a network path that leads to those packets' destination. For another example, supervisor blade 602 may determine that packet headers in packet flow 610A do not match any specified parameters. Consequently, without sending any packets in packet flow 610A to AONS blade 604 or other blades 606A-N, supervisor blade 602 may send packets in packet flow 610A on to the next hop in a network path that leads to those packets' destination.

AONS blade 604 and other blades 606A-N receive packets from supervisor blade 602, perform operations relative to the packets, and return the packets to supervisor blade 602. Supervisor blade 602 may send packets to and receive packets from multiple blades before sending those packets out of router 600. For example, supervisor blade 602 may send a particular group of packets to other blade 606A. Other blade 606A may perform firewall functions relative to the packets and send the packets back to supervisor blade 602. Supervisor blade 602 may receive the packet from other blade 606A and send the packets to AONS blade 604. AONS blade 604 may perform one or more message payload-based operations relative to the packets and send the packets back to supervisor blade 602.

According to one embodiment, the following events occur at an AONS router or a switch such as router 600. First, packets, containing messages from clients to servers, are received. Next, access control list-based filtering is performed on the packets and some of the packets are sent to an AONS blade or module. Next, TCP termination is performed on the packets. Next, Secure Sockets Layer (SSL) termination is performed on the packets if necessary. Next, Universal Resource Locator (URL)-based filtering is performed on the packets. Next, message header-based and message content-based filtering is performed on the packets. Next, the messages contained in the packets are classified into AONS message types. Next, a policy flow that corresponds to the AONS message type is selected. Next, the selected policy flow is executed. Then the packets are either forwarded, redirected, dropped, copied, modified, or fanned-out as specified by the selected policy flow.

3.2 Performing Security Functions on Message Payloads in a Network Element

FIGS. 3A-F depict a flow diagram 300 that illustrates one embodiment of a method of performing message payload processing functions at a network element on behalf of an application. For example, one or more of network elements 102, 104, 106, and 108 may perform such a method. More specifically, AONS blade 604 may perform one or more steps of such a method. Other embodiments may omit one or more of the operations depicted in flow diagram 300. Other embodiments may contain operations additional to the operation depicted in flow diagram 300. Other embodiments may perform the operations depicted in flow diagram 300 in an order that differs from the order depicted in flow diagram 300.

Figure 3A:
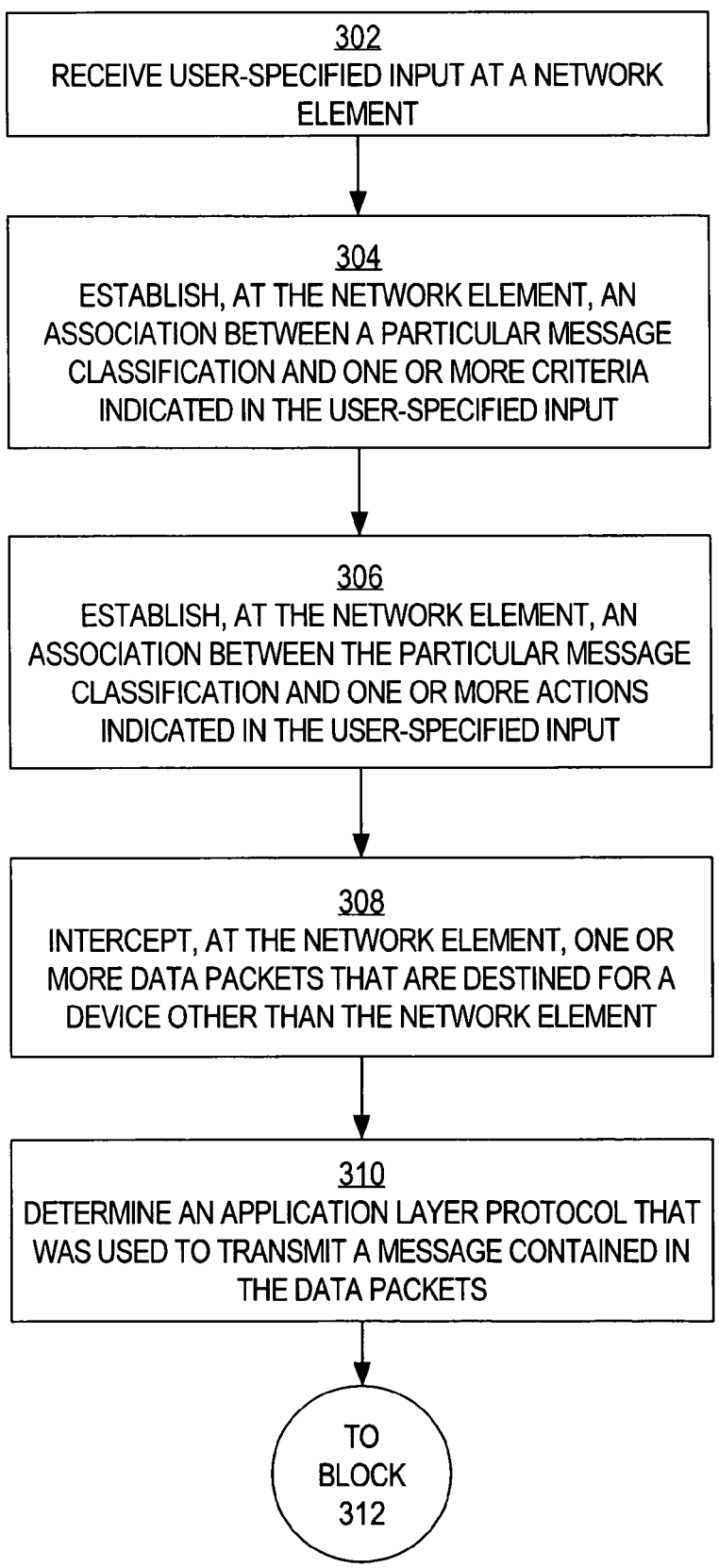

Referring first to FIG. 3A, in block 302, user-specified input is received at a network element. The user-specified input indicates the following: one or more criteria that are to be associated with a particular message classification, and one or more actions that are to be associated with the particular message classification. The user-specified input may indicate an order in which the one or more actions are to be performed. The user-specified input may indicate that outputs of actions are to be supplied as inputs to other actions. For example, network element 104, and more specifically AONS blade 604, may receive such user-specified input from a network administrator.

The user-specified input may indicate multiple sets of criteria that are to be associated, respectively, with multiple separate message classifications, and multiple sets of actions that are to be associated with the multiple message classifications. For example, the user-specified input may indicate a first set of criteria that is to be associated with a first message classification, a second set of criteria that is to be associated with a second message classification, a first set of actions that are to be associated with the first message classification, and a second set of actions that are to be associated with the second message classification.

In block 304, an association is established, at the network element, between the particular message classification and the one or more criteria. For example, AONS blade 604 may establish an association between a particular message classification and one or more criteria. For example, the criteria may indicate a particular string of text that a message needs to contain in order for the message to belong to the associated message classification. For another example, the criteria may indicate a particular path that needs to exist in the hierarchical structure of an XML-formatted message in order for the message to belong to the associated message classification. For another example, the criteria may indicate one or more source IP addresses and/or destination IP addresses from or to which a message needs to be addressed in order for the message to belong to the associated message classification.

Multiple associations may be established between separate sets of criteria and separate message classifications. For example, AONS blade 604 may establish a first association between a first set of criteria and a first message classification, and a second association between a second set of criteria and a second message classification.

In block 306, an association is established, at the network element, between the particular message classification and the one or more actions. One or more actions that are associated with a particular message classification comprise a "policy" that is associated with that particular message classification. A policy may comprise a "flow" of one or more actions that are ordered according to a particular order specified in the user-specified input, and/or one or more other actions that are not ordered. For example, AONS blade 604 may establish an association between a particular message classification and one or more actions. Collectively, the operations of blocks 302-306 comprise "provisioning" the network element.

Multiple associations may be established between separate sets of actions and separate message classifications. For example, AONS blade 604 may establish a first association between a first set of actions and a first message classification, and a second association between a second set of actions and a second message classification. For example, a set of actions may include an "encryption" action, a "decryption" action, a "signing" action, a "verification" action, and/or an "authentication" action.

Each action may indicate one or more parameters. For example, an "encryption" action may indicate a public key that is to be used to encrypt messages. For another example, a "decryption" action may indicate a private key that is to be used to decrypt messages. For another example, a "signing" action and a "verification" action each may indicate a hash function that is to be used to generate digests from messages. For another example, an "authentication" action may indicate an authentication information request that is to be sent to an application, and a data store or identity store that contains authentication information that may be used to validate credentials received from an application.

An action may identify, as a parameter of the action, a specific portion of a message on which the action is to be performed. The portion may be identified using any of a variety of mechanisms. For example, a user-specified starting location and ending location may identify the portion. For another example, a user-specified XPath path may identify a portion of an XML-formatted message. For another example, a user-specified regular expression may identify the portion. Thus, actions may be performed on a specified portion of a message while leaving the remainder of the message unmodified. A portion of a message may be encrypted without encrypting the rest of the message, for example. Indeed, by associating separate encryption actions with the same message classification, for example, different portions of the same message may be encrypted based on different keys.

In block 308, one or more data packets that are destined for a device other than the network element are received by the network element. The data packets may be, for example, data packets that contain IP and TCP headers. The IP addresses indicated in the IP headers of the data packets may differ from the network element's IP address; thus, the data packets may be destined for a device other than the network element. For example, network element 104, and more specifically supervisor blade 602, may intercept data packets that client application 110 originally sent. The data packets may be destined for server application 112, for example.

In block 310, based on one or more information items indicated in the headers of the data packets, an application layer protocol that was used to transmit a message contained in the payload portions of the data packets (hereinafter "the message") is determined. The information items may include, for example, a source IP address in an IP header, a destination IP address in an IP header, a TCP source port in a TCP header, and a TCP destination port in a TCP header. For example, network element 104, and more specifically AONS blade 604, may store mapping information that maps FTP (an application layer protocol) to a first combination of IP addresses and/or TCP ports, and that maps HTTP (another application layer protocol) to a second combination of IP addresses and/or TCP ports. Based on this mapping information and the IP addresses and/or TCP ports indicated by the data packets, network element 104 may determine which application layer protocol (FTP, HTTP, Simple Mail Transfer Protocol (SMTP), etc.) was used to transmit the message.

In block 312, a message termination technique that is associated with the application layer protocol used to transmit the message is determined. For example, network element 104, and more specifically AONS blade 604, may store mapping information that maps FTP to a first procedure, that maps HTTP to a second procedure, and that maps SMTP to a third procedure. The first procedure may employ a first message termination technique that can be used to extract, from the data packets, a message that was transmitted using FTP. The second procedure may employ a second message termination technique that can be used to extract, from the data packets, a message that was transmitted using HTTP. The third procedure may employ a third message termination technique that can be used to extract, from the data packets, a message that was transmitted using SMTP. Based on this mapping information and the application layer protocol used to transmit the message, network element 104 may determine which procedure should be called to extract the message from the data packets.

In block 314, the contents of the message are determined based on the termination technique that is associated with the application layer protocol that was used to transmit the message. For example, network element 104, and more specifically AONS blade 604, may provide the data packets as input to a procedure that is mapped to the application layer protocol determined in block 312. The procedure may use the appropriate message termination technique to extract the contents of the message from the data packets. The procedure may return the message as output to AONS blade 604. Thus, in one embodiment, the message extracted from the data packets is independent of the application layer protocol that was used to transmit the message.

In one embodiment, determining the contents of the message involves assembling the contents of the payload portions of two or more of the data packets. For example, network element 104 may determine the proper order of two or more TCP data packets (based on TCP sequence numbers, for example), extract the contents of the payload portions of the TCP data packets, and concatenate the contents according to the proper order to form at least a portion of the message. The message may be a multi-part (MIME) message, and each part may be handled separately as though it were a separate message; each part may participate in message classification.

In block 316, a message classification that is associated with criteria that the message satisfies is determined. For example, network element 104 may store mapping information that maps different criteria to different message classifications. The mapping information indicates, among possibly many different associations, the association established in block 304. Network element 104 may determine whether the contents of the message satisfy criteria associated with any of the known message classifications. In one embodiment, if the contents of the message satisfy the criteria associated with a particular message classification, then it is determined that the message belongs to the particular message classification.

Although, in one embodiment, the contents of the message are used to determine a message's classification, in alternative embodiments, information beyond that contained in the message may be used to determine the message's classification. For example, in one embodiment, a combination of the contents of the message and one or more IP addresses and/or TCP ports indicated in the data packets that contain the message is used to determine the message's classification. For another example, in one embodiment, one or more IP addresses and/or TCP ports indicated in the data packets that contain the message are used to determine the message's classification, regardless of the contents of the message.

In block 318, one or more actions that are associated with the message classification determined in block 316 are performed. If two or more of the actions are associated with a specified order of performance of actions, as indicated by the user-specified input, then those actions are performed in the specified order. If the output of any of the actions is supposed to be provided as input to any of the actions, as indicated by the user-specified input, then the output of the specified action is provided as input to the other specified action.

A variety of different actions may be performed relative to the message. FIGS. 3C-F represent just one of many different possible techniques that implementations may perform relative to each traversed action in a flow of actions that is associated with a message's message classification. A flow of actions may contain conditions and branches, so some actions in the flow of actions might not be traversed. A sample flow of actions is described below with reference to FIG. 4.

Figure 3C:
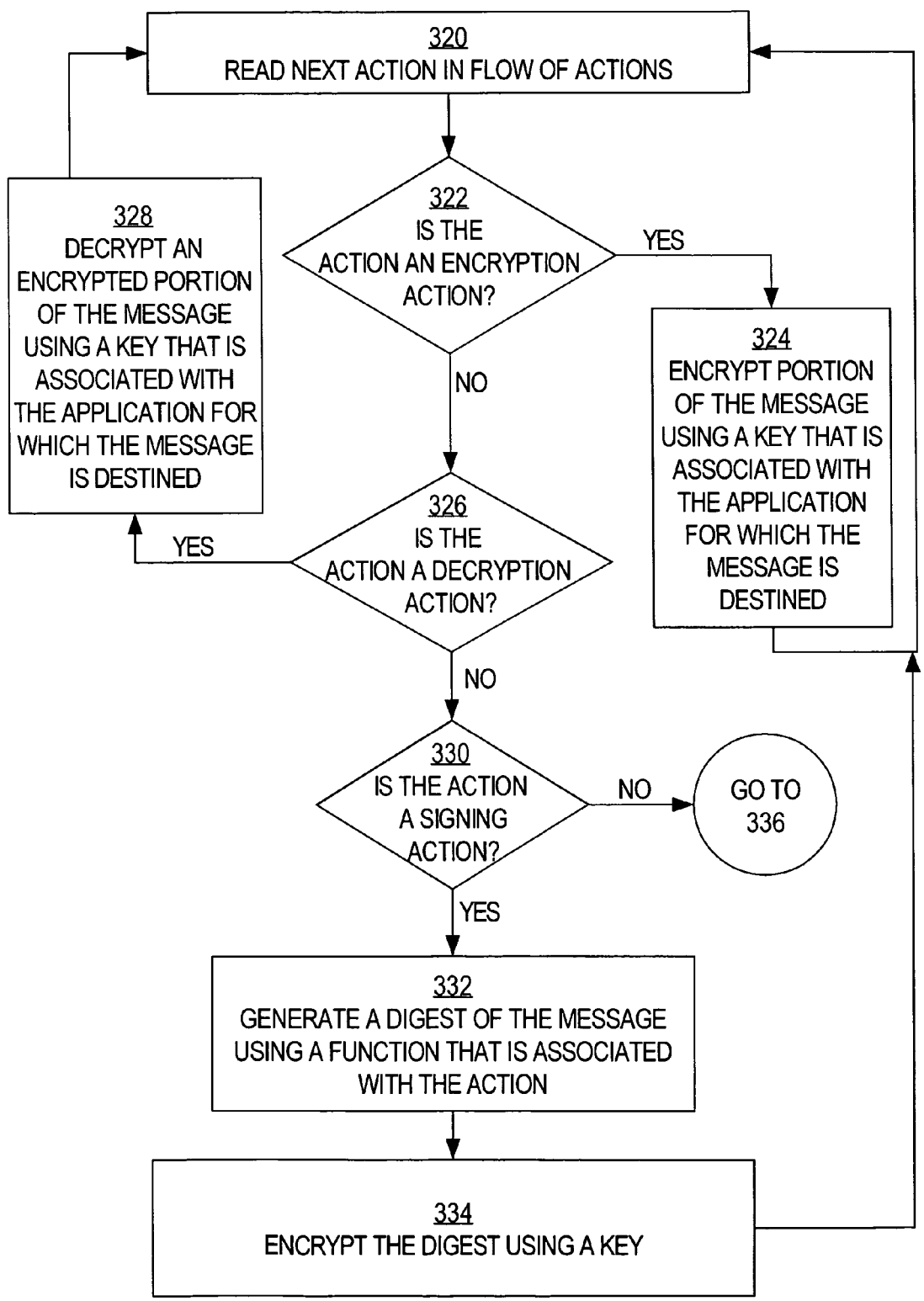

Referring to FIG. 3C, in block 320, the next action in a flow of actions is read, unless no more actions are contained in the flow. For example, network element 104 may read the next action in a flow of actions that is associated with the message's message classification. Once the next action has been read, the kind of action is determined as follows, for example. In block 322, it is determined whether the action is an encryption action. For example, network element 104 may determine whether the action is an encryption action. If the action is an encryption action, then control passes to block 324. Otherwise, control passes to block 326.

In block 324, a portion of the message is encrypted using a key. The key may be associated with the application for which the message is destined, for example. For example, network element 104 may encrypt all of or a portion of a message using a public key that is associated with server application 112. If the message is an XML document, then a user-specified XML document path, which is mapped to the action as a parameter of the action, may indicate which portion of the message is to be encrypted. Network element 104 may encrypt the portion using a public key that is mapped to the action as a parameter of the action. Such a mapping may be established using management console 122. The public key may be stored at network element 104. Alternatively, the message may be encrypted using some other key that is not associated with the application for which the message is destined. For example, the message may be encrypted using a key that is associated with the network element that would receive the message. Control passes back to block 320.

In block 326, it is determined whether the action is a decryption action. For example, network element 104 may determine whether the action is a decryption action. If the action is a decryption action, then control passes to block 328. Otherwise, control passes to block 330.

In block 328, an encrypted portion of the message is decrypted using a key. The key may be is associated with the application for which the message is destined, for example. For example, network element 104 may decrypt a portion of an encrypted message using a private key that is associated with server application 112. Network element 104 may decrypt the portion using a private key that is mapped to the action. Such a mapping may be established using management console 122. The private key may be stored at network element 104. Alternatively, the message may be decrypted using some other key that is not associated with the application for which the message is destined. For example, the message may be decrypted using a key that is associated with the network element that received the message. Control passes back to block 320.

In block 330, it is determined whether the action is a signing action. For example, network element 104 may determine whether the action is a signing action. If the action is a signing action, then control passes to block 332. Otherwise, control passes to block 336 of FIG. 3D.

In block 332, a digest of the message is generated using a function that is associated with the action. For example, network element 104 may generate a digest of the message by inputting the message or a portion thereof into a hash function that is mapped to the action. Such a mapping may be established using management console 122. The hash function may be stored at network element 104. Control passes back to block 334.

In block 334, the digest is encrypted using a key that is associated with the application that sent the message. For example, network element 104 may encrypt the digest using a private key that is associated with client application 110. Network element 104 may encrypt the digest using a private key that is mapped to the action. Such a mapping may be established using management console 122. The private key may be stored at network element 104. The encrypted digest may be sent as a signature with the message, if and when the message is sent. Control passes back to block 320.

Referring now to FIG. 3D, in block 336, it is determined whether the action is a verification action. For example, network element 104 may determine whether the action is a verification action. If the action is a verification action, then control passes to block 338. Otherwise, control passes to block 348 of FIG. 3E.

In block 338, an encrypted digest is decrypted using a key that is associated with the application that sent the message. The encrypted digest may be received with the message as a signature for the message. For example, network element 104 may decrypt an encrypted digest using a public key that is associated with client application 110. Network element 104 may decrypt the digest using a public key that is mapped to the action. Such a mapping may be established using management console 122. The public key may be stored at network element 104. Control passes to block 340.

In block 340, a locally generated digest of the message is generated using a function that is associated with the action. For example, network element 104 may generate a digest of the message by inputting the message into a hash function that is mapped to the action. Such a mapping may be established using management console 122. The hash function may be stored at network element 104. Control passes back to block 342.

In block 342, it is determined whether the decrypted digest matches the locally generated digest. For example, network element 104 may determine whether the digest decrypted in block 338 matches the digest generated in block 340. If the digests match, then control passes to block 344. Otherwise, control passes to block 346.

In block 344, a branch of the flow that corresponds to the determination that the signature is verified is taken. For example, as a result of verifying the signature, network element 104 may follow a branch of the flow that contains an action that allows the message to pass through to server application 112. Control passes back to block 320 of FIG. 3C.

Alternatively, in block 346, a branch of the flow that corresponds to the determination that the signature is not verified is taken. For example, as a result of being unable to verify the signature, network element 104 may follow a branch of the flow that contains an action that prevents the message from passing through to server application 112. Depending on the actions contained in the branch, network element 104 may log and/or drop the message, and/or take some other action. Control passes to block 320 of FIG. 3C.

Figure 3E:
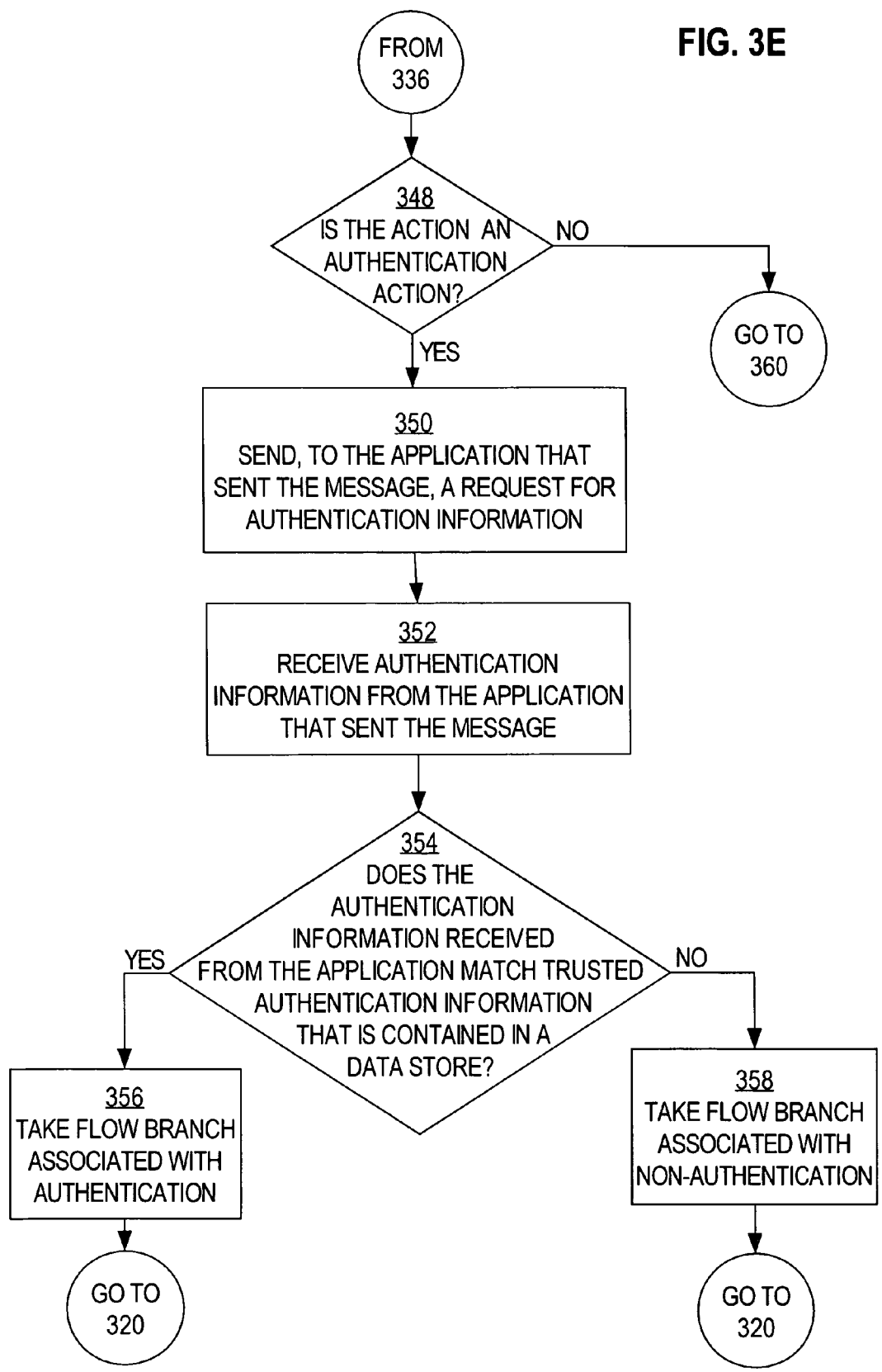

Referring now to FIG. 3E, in block 348, it is determined whether the action is an authentication action. For example, network element 104 may determine whether the action is an authentication action. If the action is an authentication action, then control passes to block 350. Otherwise, control passes to block 360 of FIG. 3F.

In block 350, a request for authentication information is sent to the application that sent the message. For example, network element 104 may send, toward client application 110, a request for a username and password, or Kerberos token, or X.509 certificate, or SAML assertion, etc. The request may be mapped to the action. Such a mapping may be established using management console 122. Control passes back to block 352.

In block 352, authentication information is received from the application that sent the message. For example, network element 104 may receive a username and password sent from client application 110.

In block 354, it is determined whether the authentication information received from the application matches trusted authentication information that is contained in a data store or identity store. For example, network element 104 may lookup a password that is mapped, in a specified data store or identity store, to the username received from client application 110. A pointer or reference to the data store or identity store may be mapped to the action. Network element 104 may determine whether the password contained in the data store or identity store matches the password received from client application 110. If the authentication information matches, then control passes to block 356. Otherwise, control passes to block 358.

In block 356, a branch of the flow that corresponds to the determination that the application is authenticated is taken. For example, as a result of authenticating the application, network element 104 may follow a branch of the flow that contains an action that allows the message to pass through to server application 112. For another example, as a result of authenticating the application, network element 104 may determine, based on a set of permissions that are mapped to the username in the data store or identity store, whether operations specified in the message are permitted. Network element may allow the message to pass through to server application 112 if the operations are permitted, and prevent the message from passing through to server application 112 if the operations are not permitted. Control passes back to block 320 of FIG. 3C.

Alternatively, in block 358, a branch of the flow that corresponds to the determination that the application is not authenticated is taken. For example, as a result of being unable to authenticate the application, network element 104 may follow a branch of the flow that contains an action that prevents the message from passing through to server application 112. Depending on the actions contained in the branch, network element 104 may log and/or drop the message, and/or take some other action. Control passes to block 320 of FIG. 3C.

Figure 3F:
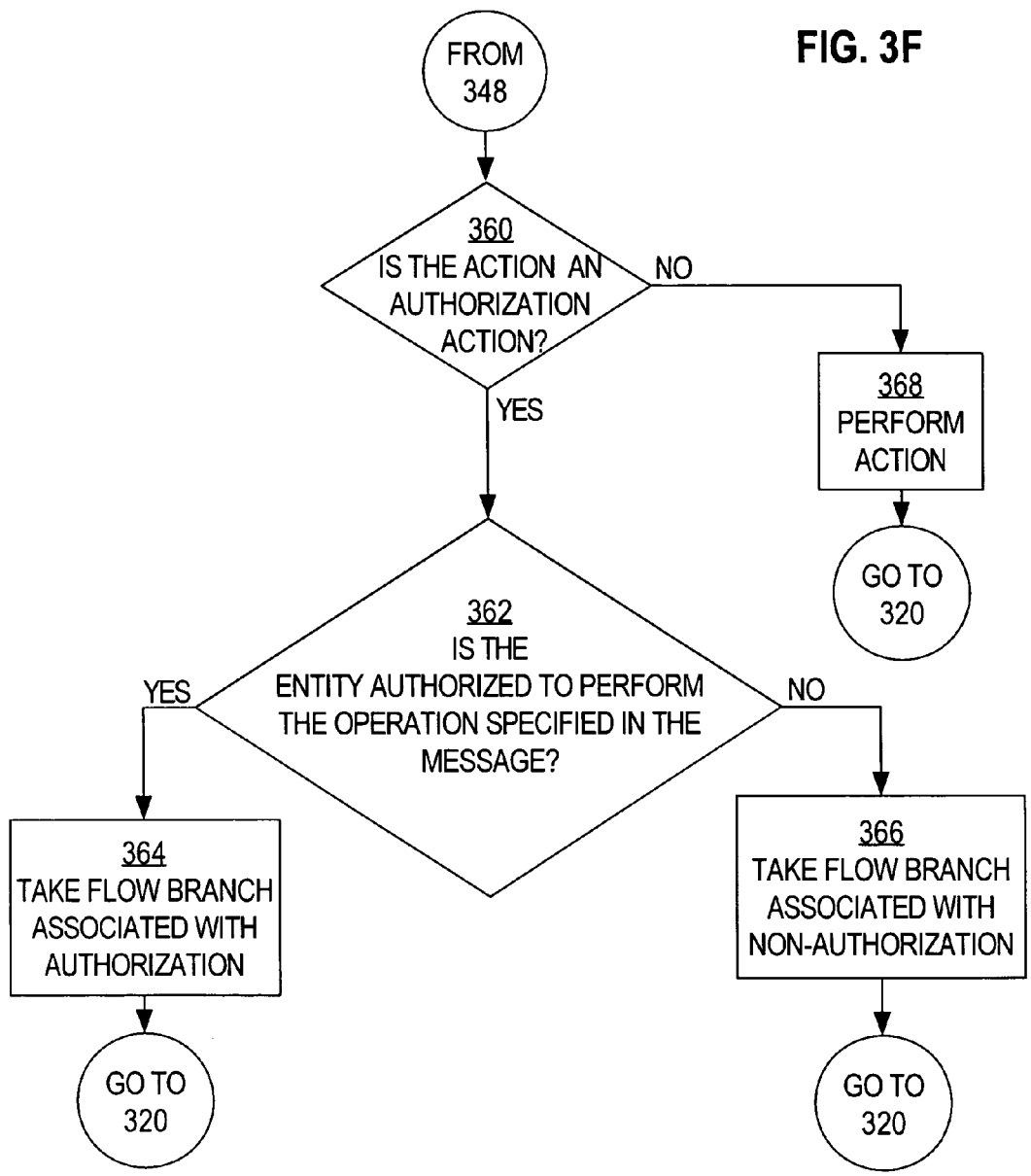

Referring now to FIG. 3F, in block 360, it is determined whether the action is an authorization action. For example, network element 104 may determine whether the action is an authorization action. If the action is an authorization action, then control passes to block 362. Otherwise, control passes to block 368.

In block 362, it is determined whether the entity that is attempting to perform an operation indicated by the message is authorized to perform that operation. Such an entity might be previously determined by an authentication action as described above. If the entity is authorized to perform the operation, then control passes to block 364. Otherwise, control passes to block 366.

In block 364, a branch of the flow that corresponds to the determination that the entity is authorized to perform the operation is taken. For example, network element 104 may follow a branch of the flow that contains an action that allows an entity to access a specified database. Control passes back to block 320 of FIG. 3C.

Alternatively, in block 366, a branch of the flow that corresponds to the determination that the entity is not authorized to perform the operation is taken. For example, network element 104 may follow a branch of the flow that does not contain an action that allows the entity to access a specified database. Depending on the actions contained in the branch, network element 104 may log and/or drop the message, and/or take some other action. Control passes to block 320 of FIG. 3C.

Alternatively, in block 368, an action other than those discussed above is performed. For example, network element 104 may perform some other specified action besides an encryption, decryption, signing, verification, or authentication action. Control passes back to block 320 of FIG. 3C.

If the message was modified in some way (e.g., content, format, or protocol modification) during the performance of the actions, and if the modified message is supposed to be forwarded out of the network element, then the network element encapsulates the modified message into new data packets and sends the new data packets towards the modified message's destination—which also may have been modified.

A message might not belong to any known message classification. In this case, according to one embodiment, the network element does not perform any user-specified actions relative to the message. Instead, the network element simply forwards the data packets to the next hop along the path to the data packets' indicated destination.

The method illustrated in flow diagram 300 may be performed relative to multiple sets of data packets, each set carrying a separate message. For example, network element 104 may perform the method illustrated relative to a first set of data packets that carry a first message, and then network element 104 may perform the method relative to a second set of data packets that carry a second message. The first message may satisfy a first set of criteria associated with a first message classification, and the second message may satisfy a second set of criteria associated with a second message classification. Thus, network element 104 may perform a first set of actions relative to the first message, and a second set of actions relative to the second message.

As a result of the method illustrated in flow diagram 300, applications such as client application 110, server application 112, and server application 114 can communicate with each other in a secure manner, and without performing any security functions locally. Indeed, the applications implicitly rely on the network to accomplish some or all of their tasks, such as security functions.

3.3 Action Flows

Figure 4:
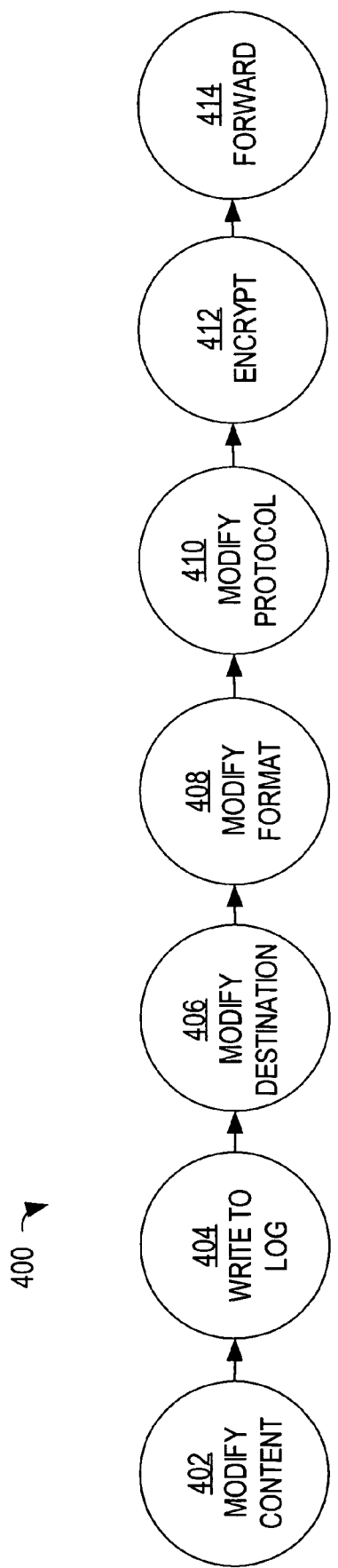
FIG. 4 depicts a sample flow that might be associated with a particular message classification.

FIG. 4 depicts a sample flow 400 that may be associated with a particular message classification. Flow 400 comprises, in order, actions 402-414; other flows may comprise one or more other actions. Action 402 indicates that the content of the message should be modified in a specified manner. Action 404 indicates that a specified event should be written to a specified log. Action 406 indicates that the message's destination should be changed to a specified destination. Action 408 indicates that the message's format should be translated into a specified message format. Action 410 indicates that the application layer protocol used to transmit the message or content should be changed to a specified application layer protocol. Action 412 indicates that the message or content should be encrypted using a particular key. Action 414 indicates that the message should be forwarded towards the message's destination.

In other embodiments, any one of actions 402-414 may be performed individually or in combination with any others of actions 402-414. Although not shown in FIG. 4, a flow of actions may contain conditions/decisions and branches based on the results of those conditions/decisions.

Other actions not specifically mentioned above may be performed. For example, a network element may determine, from information contained in data packets that the network element receives, an identity of either a sender or intended receiver of the data packets. The network element may perform a cryptographic function on a message contained in the data packets using a cryptographic key that is associated with or mapped to the identity.

For another example, a network element may determine a type of credential that is contained in data packets that the network element receives. Based on the type of the credential, the network element may select one of several credential stores (repositories that store credentials). The network element may compare the received credential with a credential that is stored in the selected credential store. Additionally or alternatively, based on the type of the credential, the network element may select one of several destinations, and send at least a port of an application layer message contained in the data packets to the selected destination.

For another example, a network element may determine a particular amount that is specified in an application layer message. The network element may determine whether the particular amount exceeds a specified amount. Then, if the particular amount exceeds the specified amount, the network element may perform one or more other specified actions, such as dropping and/or logging the application layer message.

For another example, a network element may look up a certificate that is mapped to a username token that is specified in an application layer message. The network element may send the certificate to a server on behalf of the application that sent the application layer message. This may be especially useful when the server does not understand the username token, but does understand the certificate.

For another example, a network element may receive an application layer message that contains two separate assertions, such as a signature and a SAML assertion from a trusted authority. The assertion from the trusted authority might function as a certification by the trusted authority that the application that sent the application layer message is who and what the application purports to be. Such an assertion might have been obtained from the trusted authority by the application and embedded into the application layer message. The network element may verify both of the assertions. For example, to verify to assertion from the trusted authority, the network element may either query the trusted authority or verify the assertion using other sufficient information provided in the application layer message, if such other information was provided.

For yet another example, instead of or in addition to receiving a username and password from an application, the network element may send a challenge to the application. In response to the challenge, the network element may receive a challenge-response from the application. The network element may determine whether the challenge-response satisfies the challenge. If the challenge-response satisfies the challenge, then the network element may perform one or more specified actions. Otherwise, the network element may perform one or more other specified actions.

A network element may receive an application layer message that was sent using Secure Socket Layer (SSL) protocol. The network element may change the application layer message so that it conforms to a different application layer protocol (e.g., HTTP to JMS), and then send the changed application layer message toward its destination using SSL protocol again.

3.4 AONS Examples 3.4.1 AONS General Overview

Application-Oriented Network Systems (AONS) is a technology foundation for building a class of products that embed intelligence into the network to better meet the needs of application deployment. AONS complements existing networking technologies by providing a greater degree of awareness of what information is flowing within the network and helping customers to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AONS provides this enhanced support by understanding more about the content and context of information flow. As such, AONS works primarily at the message rather than at the packet level. Typically, AONS processing of information terminates a TCP connection to inspect the full message, including the "payload" as well as all headers. AONS also understands and assists with popular application-level protocols such as HTTP, FTP, SMTP and de facto standard middleware protocols.

AONS differs from middleware products running on general-purpose computing systems in that AONS' behavior is more akin to a network appliance, in its simplicity, total cost of ownership and performance. Furthermore, AONS integrates with network-layer support to provide a more holistic approach to information flow and management, mapping required features at the application layer into low-level networking features implemented by routers, switches, firewalls and other networking systems.

Although some elements of AONS-like functionality are provided in existing product lines from Cisco Systems, Inc., such products typically work off a more limited awareness of information, such as IP/port addresses or HTTP headers, to provide load balancing and failover solutions. AONS provides a framework for broader functional support, a broader class of applications and a greater degree of control and management of application data.

3.4.2 AONS Terminology

An "application" is a software entity that performs a business function either running on servers or desktop systems. The application could be a packaged application, software running on application servers, a legacy application running on a mainframe, or custom or proprietary software developed in house to satisfy a business need or a script that performs some operation. These applications can communicate with other applications in the same department (departmental), across departments within a single enterprise (intra enterprise), across an enterprise and its partners (inter-enterprise or B2B) or an enterprise and its customers (consumers or B2C). AONS provides value added services for any of the above scenarios.

An "application message" is a message that is generated by an application to communicate with another application. The application message could specify the different business level steps that should be performed in handling this message and could be in any of the message formats described in the section below. In the rest of the document, unless otherwise specified explicitly, the term "message" also refers to an application message.

An "AONS node" is the primary AONS component within the AONS system (or network). As described later, the AONS node can take the shape of a client proxy, server proxy or an intermediate device that routes application messages.

Each application message, when received by the first AONS node, gets assigned an AONS message ID and is considered to be an "AONS message" until that message gets delivered to the destination AONS node. The concept of the AONS message exists within the AONS cloud. A single application message may map to more than one AONS message. This may be the case, for example, if the application message requires processing by more than one business function. For example, a "LoanRequest" message that is submitted by a requesting application and that needs to be processed by both a "CreditCheck" application and a "LoanProcessing" application would require processing by more than one business function. In this example, from the perspective of AONS, there are two AONS messages: The "LoanRequest" to the "CreditCheck" AONS message from the requesting application to the CreditCheck application; and the "LoanRequest" to the "LoanProcessing" AONS message from the CreditCheck application to the LoanProcessing Application.

In one embodiment, AONS messages are encapsulated in an AONP (AON Protocol) message that contains AONP headers, and are translated to a "canonical" format. AONP is a mechanism to enable federation between two or more AONS nodes. For example, a first AONS node may know that it is acting in conjunction with a second or other AONS node; thus the AONS nodes are "federated." The first AONS node might have performed one or more actions, such as encryption, signing, authentication, etc., relative to a particular message. The first AONS node may indicate, in one or more AONP headers, the actions that the first AONS node performed. Upon receiving the AONP message, the second AONS node may determine from the AONP headers that the actions have been performed. As a result, the second AONS node may forego performing those actions, or perform other functions in an efficient and optimal way. Reliability, logging and security services are provided from an AONS message perspective.

The set of protocols or methods that applications typically use to communicate with each other are called "application access protocols" (or methods) from an AONS perspective. Applications can communicate to the AONS network (typically end point proxies: a client proxy and a server proxy) using any supported application access methods. Some examples of application access protocols include: IBM MQ Series, Java Message Service (JMS), TIBCO, Simple Object Access Protocol (SOAP) over Hypertext Transfer Protocol (HTTP)/HTTPS, Simple Mail Transfer Protocol (SMTP), File Transfer Protocol (FTP), Java Database Connectivity (JDBC), TCP, etc. Details about various access methods are explained in later sections of this document.

There are a wide variety of "message formats" that are used by applications. These message formats may range from custom or proprietary formats to industry-specific formats to standardized formats. Extensible Markup Language (XML) is gaining popularity as a universal language or message format for applications to communicate with each other. AONS supports a wide variety of these formats.

In addition, in one embodiment, AONS provides content translation services from one format to another based on the needs of applications. A typical deployment might involve a first AONS node that receives an application message (the client proxy) translating the message to a "canonical" format, which is carried as an AONS message through the AONS network. The server proxy might translate the message from the "canonical" format to the format understood by the receiving application before delivering the message. However, proxies are not required. For understanding some of the non-industry standard formats, a message dictionary may be used.

A node that performs the gateway functionality between multiple application access methods or protocols is called a "protocol gateway." An example of this would be a node that receives an application message through File Transfer Protocol (FTP) and sends the same message to another application as a HTTP post. In AONS, the client and server proxies are typically expected to perform the protocol gateway functionality.

If an application generates a message in Electronic Data Interchange (EDI) format and if the receiving application expects the message to be in an XML format, then the message format needs to be translated but the content of the message needs to be kept intact through the translation. In AONS, the end point proxies typically perform this "message format translation" functionality.

In some cases, even though the sending and receiving application use the same message format, the content needs to be translated for the receiving application. For example, if a United States-resident application is communicating with a United Kingdom-resident application, then the date format in the messages between the two applications might need to be translated (from mm/dd/yyyy to dd/mm/yyyy) even if the applications use the same data representation (or message format). This translation is called "content translation."

3.4.3 AONS Functional Overview

As defined previously, AONS can be defined as network-based intelligent intermediary systems that efficiently and effectively integrate business and application needs with more flexible and responsible network services.

In particular, AONS can be understood through the following characteristics:

AONS operates at a higher layer (layers 5-6) than traditional network element products (layers 2-4). AONS uses message-level inspection as a complement to packet-level inspection—by understanding application messages, AONS adds value to multiple network element products, such as switches, firewalls, content caching systems and load balancers, on the "message exchange route." AONS provides increased flexibility and granularity of network responsiveness in terms of security, reliability, traffic optimization (compression, caching), visibility (business events and network events) and transformation (e.g., from XML to EDI).

AONS is a comprehensive technology platform, not just a point solution. AONS can be implemented through distributed intelligent intermediary systems that sit between applications, middleware, and databases in a distributed intra- and inter-enterprise environment (routing messages, performing transformations, etc.). AONS provides a flexible framework for end user configuration of business flows and policies and partner-driven extensibility of AONS services.

AONS is especially well suited for network-based deployment. AONS is network-based rather than general-purpose server-based. AONS is hybrid software-based and hardware-based (i.e., application-specific integrated circuit (ASIC)/field programmable gate array (FPGA)-based acceleration). AONS uses out-of-band or in-line processing of traffic, as determined by policy. AONS is deployed in standalone products (network appliances) as well as embedded products (service blades for multiple switching, routing, and storage platforms).

3.4.4 AONS System Overview

Figure 7:
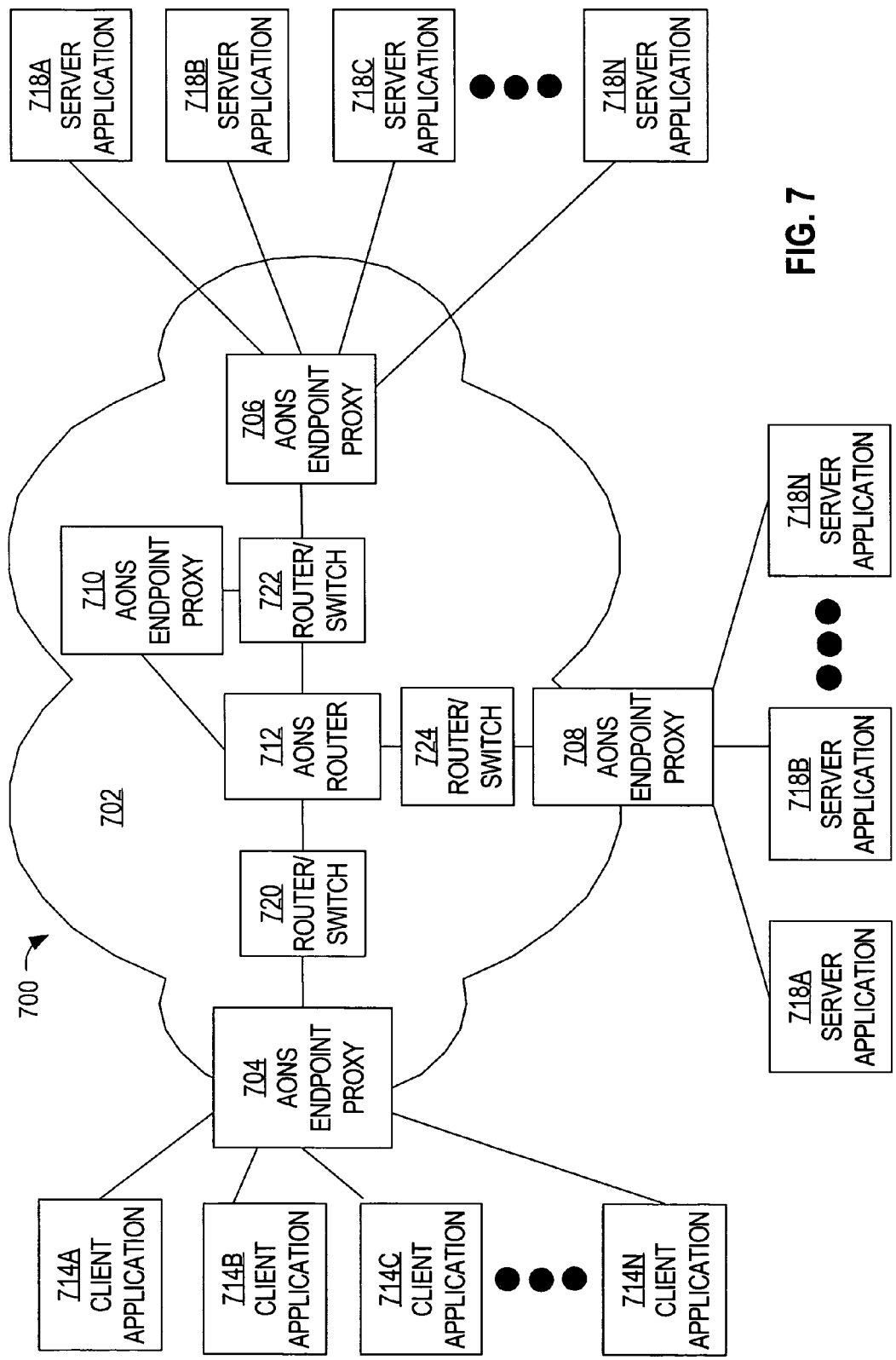
FIG. 7 is a diagram that illustrates the various components involved in an AONS network according to one embodiment.

This section outlines the system overview of an example AONS system. FIG. 7 is a diagram 700 that illustrates the various components involved in an example AONS network 702 according to one embodiment of the invention. The roles performed by each of the nodes are mentioned in detail in subsequent sections.

Within AONS network 702, key building blocks include AONS Endpoint Proxies (AEPs) 704-710, which are located at the edge of the AONS network and serve as the entry and exit points, and an AONS Router (AR), which is located within the AONS network. Visibility into application intent may begin within AEP 704 placed at the edge of a logical AONS "cloud." As a particular client application of client applications 714A-N attempts to send a message across the network to a particular server application destination of server applications 716A-N and 718A-N, the particular client application will first interact with AEP 704.

AEP 704 serves as either a transparent or explicit messaging gateway which aggregates network packets into application messages and infers the message-level intent by examining the header and payload of a given message, relating the message to the appropriate context, optionally applying appropriate policies (e.g. message encryption, transformation, etc.) and then routing the message towards the message's application destination via a network switch.

AONS Router (AR) 712 may intercept the message en route to the message's destination endpoint. Based upon message header contents, AR 712 may determine that a new route would better serve the needs of a given application system. AR 712 may make this determination based upon enterprise-level policy, taking into account current network conditions. As the message nears its destination, the message may encounter AEP 706, which may perform a final set of operations (e.g. message decryption, acknowledgement of delivery) prior to the message's arrival. In one embodiment, each message is only parsed once: when the message first enters the AONS cloud. It is the first AEP that a message traverses that is responsible for preparing a message for optimal handling within the underlying network.

AEPs 704-708 can further be classified into AEP Client Proxies and AEP Server Proxies to explicitly highlight roles and operations performed by the AEP on behalf of the specific end point applications.

A typical message flow involves a particular client application 714A submitting a message to the AEP Client Proxy (CP) 704 through one of the various access protocols supported by AONS. On receiving this message, AEP CP 704 assigns an AONS message id to the message, encapsulates the message with an AONP header, and performs any necessary operations related to the AONS network (e.g. security and reliability services). Also, if necessary, the message is converted to a "canonical" format by AEP CP 704. The message is carried over a TCP connection to AR 710 along the path to the destination application 718A. The AONS routers or switches along the path perform the infrastructure services necessary for the message and can change the routing based on the policies configured by the customer. The message is received at the destination AEP Server Proxy (SP) 706. AEP SP 706 performs necessary security and reliability functions and translates the message to the format that is understood by the receiving application, if necessary. AEP SP 706 then sends the message to receiving application 718A using any of the access protocols that application 718A and AONS support. A detailed message flow through AONS network 702 is described in later sections.

The message processing described herein may be performed with respect to the content of different kinds of messages that an AONS node may encounter. AONS nodes may process request messages, response messages, messages that called out from an AONS node or that are brought into an AONS node, or exception messages; AONS nodes may process contents of messages beyond those or the type that are sent between client and server applications. For example, in response to intercepting a message from a client application, an AONS node may generate and send another message to a database server. The AONS may subsequently receive yet another message from the database server. The AONS node may perform message processing in the manner described herein on any of the messages mentioned above, not just on the messages from the client.

An AONS node may perform specified actions in response to determining that the delivery of a message will cause a failure. For example, an AONS node may determine that a message is larger than the maximum size that can be accepted by a server application for which the message is destined. In response, the AONS node may prevent the message from being forwarded to the server application. Instead, the AONS node may log the message for later inspection by an administrator. For another example, in response to determining that a message contains a virus or other malignant content, an AONS node may "inoculate" the message (e.g., by encrypting and/or compressing the message content), and then store the "inoculated" message in a log for later inspection by an administrator.

3.4.5 AONS System Elements

This section outlines the different concepts that are used from an AONS perspective.

An "AEP Client Proxy" is an AONS node that performs the services necessary for applications on the sending side of a message (a client). In the rest of this document, an endpoint proxy also refers to a client or server proxy. Although AONS nodes may fulfill the roles of proxies, they are typically not designated as such; "AEP proxy" is a term used to define a role. The typical responsibilities of the client proxy in processing a message are: message pre-classification & early rejection, protocol management, message identity management, message encapsulation in an AONP header, end point origination for reliable delivery, security end point service origination (encryption, digital signature, authentication), flow selection & execution/infrastructure services (logging, compression, content transformation, etc.), routing—next hop AONS node or destination, AONS node and route discovery/advertising role and routes, and end point origination for the reliable delivery mechanism (guaranteed delivery router).

Not all functionalities described above need to be performed for each message. The functionalities performed on the message are controlled by the policies configured for the AONS node.

An "AEP Server Proxy" is an AONS node that performs the services necessary for applications on the receiving side of a message (a server). In the rest of the document, a Server Proxy may also be referred as an end point proxy. The typical responsibilities of the Server Proxy in processing a message are: protocol management, end point termination for reliable delivery, security end point service termination (decryption, verification of digital signature, etc.), flow selection & execution/infrastructure services (logging, compression, content translation, etc.), message de-encapsulation in AONP header, acknowledgement to sending AONS node, application routing/request message delivery to destination, response message correlation, and routing to entry AONS node.

Note that not all the functionalities listed above need to be performed for each message. The functionalities performed on the message are controlled by the policies configured for the AONS node and what the message header indicates.

An "AONS Router" is an AONS node that provides message-forwarding functionalities along with additional infrastructure services within an AONS network. An AONS Router communicates with Client Proxies, Server Proxies and other AONS Routers. An AONS Router may provide service without parsing a message; an AONS Router may rely on an AONP message header and the policies configured in the AONS network instead of parsing messages. An AONS Router provides the following functionalities: scalability in the AONS network in terms of the number of TCP connections needed; message routing based on message destination, policies configured in the AONS cloud, a route specified in the message, and/or content of the message; a load at the intended destination—re-routing if needed; availability of the destination—re-routing if needed; cost of transmission (selection among multiple service providers); and infrastructure services such as sending to a logging facility, sending to a storage area network (SAN) for backup purposes, and interfacing to a cache engine for cacheable messages (like catalogs).

AONS Routers do not need to understand any of the application access protocols and, in one embodiment, deal only with messages encapsulated with an AONP header.

Application-Oriented Networking Protocol (AONP) is a protocol used for communication between the nodes in an AONS network. In one embodiment, each AONS message carries an AONP header that conveys the destination of the message and additional information for processing the message in subsequent nodes. AONP also addresses policy exchange (static or dynamic), fail-over among nodes, load balancing among AONS nodes, and exchange of routing information. AONP also enables application-oriented message processing in multiple network elements (like firewalls, cache engines and routers/switches). AONP supports both a fixed header and a variable header (formed using type-length-value (TLV) fields) to support efficient processing in intermediate nodes as well as flexibility for additional services.

Unless explicitly specified otherwise, "router" or "switch" refers herein to a typical Layer 3 or Layer 2 switch or a router that is currently commercially available.

3.4.6 AONS Example Features

In one embodiment, an underlying "AONS foundation platform of subsystem services" (AOS) provides a range of general-purpose services including support for security, compression, caching, reliability, policy management and other services. On top of this platform, AONS then offers a range of discreet functional components that can be wired together to provide the overall processing of incoming data traffic. These "bladelets™" are targeted at effecting individual services in the context of the specific policy or action demanded by the application or the information technology (IT) manager. A series of access method adaptors ensure support for a range of ingress and egress formats. Finally, a set of user-oriented tools enable managers to appropriately view, configure and set policies for the AONS solution. These four categories of functions combine to provide a range of end-customer capabilities including enhanced security, infrastructure optimization, business continuity, application integration and operational visibility.

The enhanced visibility and enhanced responsiveness enabled by AONS solutions provides a number of intelligent, application-oriented network services. These intelligent services can be summarized in four primary categories:

Enhanced security and reliability: enabling reliable message delivery and providing message-level security in addition to existing network-level security.

Infrastructure optimization: making more efficient use of network resources by taking advantage of caching and compression at the message level as well as by integrating application and network quality-of-service (QoS).

Business and infrastructure activity monitoring and management: by reading information contained in the application layer message, AONS can log, audit, and manage application-level business events, and combine these with network, server, and storage infrastructure events in a common, policy-driven management environment.

Content-based routing and transformation: message-based routing and transformation of protocol, content, data, and message formats (e.g., XML transformation). The individual features belonging to each of these primary categories are described in greater detail below.

3.4.6.1 Enhanced Security and Reliability

Authentication: AONS can verify the identity of the sender of an inbound message based upon various pieces of information contained within a given message (username/password, digital certificate, Security Assertion Markup Language (SAML) assertion, etc.), and, based upon these credentials, determine whether or not the message should be processed further.

Authorization: Once principal credentials are obtained via message inspection, AONS can determine what level of access the originator of the message should have to the services it is attempting to invoke. AONS may also make routing decisions based upon such derived privileges or block or mask certain data elements within a message once it's within an AONS network as appropriate.

Encryption/Decryption: Based upon policy, AONS can perform encryption of message elements (an entire message, the message body or individual elements such as credit card number) to maintain end-to-end confidentiality as a message travels through the AONS network. Conversely, AONS can perform decryption of these elements prior to arrival at a given endpoint.

Digital Signatures: In order to ensure message integrity and allow for non-repudiation of message transactions, AONS can digitally sign entire messages or individual message elements at any given AEP. The decision as to what gets signed will be determined by policy as applied to information derived from the contents and context of each message.

Reliability: AONS can complement existing guaranteed messaging systems by intermediating between unlike proprietary mechanisms. It can also provide reliability for HTTP-based applications (including web services) that currently lack reliable delivery. As an additional feature, AONS can generate confirmations of successful message delivery as well as automatically generate exception responses when delivery cannot be confirmed.

3.4.6.2 Infrastructure Optimization

Compression and stream-based data extraction: AEPs can compress message data prior to sending the message data across the network in order to conserve bandwidth and conversely decompress it prior to endpoint delivery. AEPs can also extract data to perform message classification without waiting for the whole message to be read in.

Caching: AONS can cache the results of previous message inquires based upon the rules defined for a type of request or based upon indicators set in the response. Caching can be performed for entire messages or for certain elements of a message in order to reduce application response time and conserve network bandwidth utilization. Message element caching enables delta processing for subsequent message requests.

TCP Connection Pooling: By serving as an intermediary between message clients and servers AONS can consolidate the total number of persistent connections required between applications. AONS thereby reduces the client and server-processing load otherwise associated with the ongoing initiation and teardown of connections between a mesh of endpoints.

Batching: An AONS intermediary can batch transactional messages destined for multiple destinations to reduce disk I/O overheads on the sending system. Similarly, transactional messages from multiple sources can be batched to reduce disk I/O overheads on the receiving system.

Hardware Acceleration: By efficiently performing compute-intensive functions such as encryption and Extensible Stylesheet Language Transformation (XSLT) transformations in an AONS network device using specialized hardware, AONS can offload the computing resources of endpoint servers, providing potentially lower-cost processing capability.

Quality of Service: AONS can integrate application-level QoS with network-level QoS features based on either explicit message prioritization (e.g., a message tagged as "high priority") or via policy that determines when a higher quality of network service is required for a message as specific message content is detected.

Policy Enforcement: At the heart of optimizing the overall AONS solution is the ability to ensure business-level polices are expressed, implemented and enforced by the infrastructure. The AONS Policy Manager ensures that once messages are inspected, the appropriate actions (encryption, compression, routing, etc.) are taken against that message as appropriate.

3.4.6.3 Activity Monitoring and Management

Auditing/Logging/Metering: AONS can selectively filter messages and send them to a node or console for aggregation and subsequent analysis. Tools enable viewing and analysis of message traffic. AONS can also generate automatic responses to significant real-time events, both business and infrastructure-related. By intelligently gathering statistics and sending them to be logged, AONS can produce metering data for auditing or billing purposes.

Management: AONS can combine both message-level and network infrastructure level events to gain a deeper understanding of overall system health. The AONS management interface itself is available as a web service for those who wish to access it programmatically.

Testing and Validation: AONS' ability to intercept message traffic can be used to validate messages before allowing them to reach destination applications. In addition to protecting from possible application or server failures, this capability can be leveraged to test new web services and other functions by examining actual message flow from clients and servers prior to production deployment. AONS also provides a "debug mode" that can be turned on automatically after a suspected failure or manually after a notification to assist with the overall management of the device.

Workload Balancing and Failover: AONS provides an approach to workload balancing and failover that is both policy- and content-driven. For example, given an AONS node's capability to intermediate between heterogeneous systems, the AONS node can balance between unlike systems that provide access to common information as requested by the contents of a message. AONS can also address the issue of message affinity necessary to ensure failover at the message rather than just the session level as is done by most existing solutions. Balancing can also take into account the response time for getting a message reply, routing to an alternate destination if the preferred target is temporarily slow to respond.

Business Continuity: By providing the ability to replicate inbound messages to a remote destination, AONS enables customers to quickly recover from system outages. AONS can also detect failed message delivery and automatically re-route to alternate endpoints. AONS AEPs and ARs themselves have built-in redundancy and failover at the component level and can be clustered to ensure high availability.

3.4.6.4 Content-Based Routing And Transformation

Content-based Routing: Based upon its ability to inspect and understand the content and context of a message, AONS provides the capability to route messages to an appropriate destination by matching content elements against pre-established policy configurations. This capability allows AONS to provide a common interface (service virtualization) for messages handled by different applications, with AONS examining message type or fields in the content (part number, account type, employee location, customer zip code, etc.) to route the message to the appropriate application. This capability also allows AONS to send a message to multiple destinations (based on either statically defined or dynamic subscriptions to message types or information topics), with optimal fan-out through AONS routers. This capability further allows AONS to redirect all messages previously sent to an application so that it can be processed by a new application. This capability additionally allows AONS to route a message for a pre-processing step that is deemed to be required before receipt of a message (for example, introducing a management pre-approval step for all travel requests). This capability also allows AONS to route a copy of a message that exceeds certain criteria (e.g. value of order) to an auditing system, as well as forwarding the message to the intended destination. This capability further allows AONS to route a message to a particular server for workload or failover reasons. This capability also allows AONS to route a message to a particular server based on previous routing decisions (e.g., routing a query request based on which server handled for the original order). This capability additionally allows AONS to route based on the source of a message. This capability also allows AONS to route a message through a sequence of steps defined by a source or previous intermediary.

Message Protocol Gateway: AONS can act as a gateway between applications using different transport protocols. AONS supports open standard protocols (e.g. HTTP, FTP, SMTP), as well as popular or de facto standard proprietary protocols such as IBM MQ and JMS.

Message Transformations: AONS can transform the contents of a message to make them appropriate for a particular receiving application. This can be done for both XML and non-XML messages, the latter via the assistance of either a message dictionary definition or a well-defined industry standard format.

3.4.7 AONS Functional Modules

Figure 8:
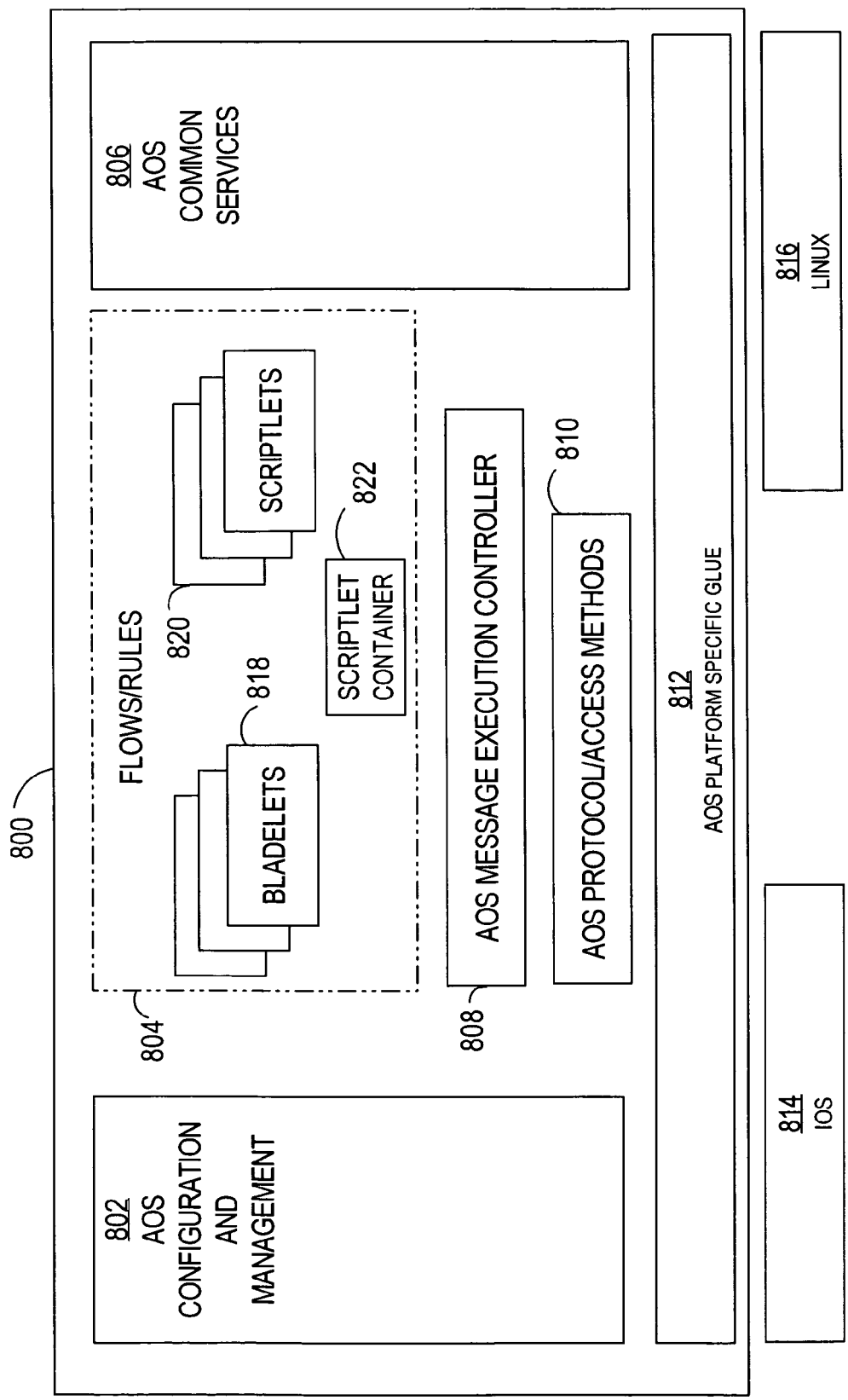
FIG. 8 is a block diagram that depicts functional modules within an example AONS node.

FIG. 8 is a block diagram that depicts functional modules within an example AONS node. AONS node 800 comprises AOS configuration and management module 802, flows/rules 804, AOS common services 806, AOS message execution controller 808, AOS protocol access methods 810, and AOS platform-specific "glue" 812. AONS node 800 interfaces with Internetworking Operating System (IOS) 814 and Linux Operating System 816. Flows/rules 804 comprise bladelets™ 818, scriptlets™ 820, and scriptlet™ container 822.

In one embodiment, AOS common services 806 include: security services, standard compression services, delta compression services, caching service, message logging service, policy management service, reliable messaging service, publish/subscribe service, activity monitoring service, message distribution service, XML parsing service, XSLT transformation service, and QoS management service.

In one embodiment, AOS protocol/access methods 810 include: TCP/SSL, HTTP/HTTPS, SOAP/HTTP, SMTP, FTP, JMS/MQ and JMS/RV, and Java Database Connectivity (JDBC).

In one embodiment, AOS message execution controller 808 includes: an execution controller, a flow subsystem, and a bladelet™ subsystem.

In one embodiment, AOS bladelets™ 818 and scriptlets™ 820 include: message input (read message), message output (send message), logging/audit, decision, external data access, XML parsing, XML transformation, caching, scriptlet container, publish, subscribe, message validation (schema, format, etc.), filtering/masking, signing, authentication, authorization, encryption, decryption, activity monitoring sourcing, activity monitoring marking, activity monitoring processing, activity monitoring notification, message discard, firewall block, firewall unblock, message intercept, and message stop-intercept.

In one embodiment, AOS configuration and management module 802 includes: configuration, monitoring, topology management, capability exchange, failover redundancy, reliability/availability/serviceability (RAS) services (tracing, debugging, etc.), archiving, installation, upgrades, licensing, sample scriptlets™, sample flows, documentation, online help, and language localization.

In one embodiment, supported platforms include: Cisco Catalyst 6503, Cisco Catalyst 6505, Cisco Catalyst 6509, and Cisco Catalyst 6513. These products are typically deployed in data centers. Other products, such as "branch office routers" (e.g., the Cisco Volant router series) and "edge routers" are also supported. In one embodiment, supported supervisor modules include: Sup2 and Sup720. In one embodiment, specific functional areas relating to the platform include: optimized TCP, SSL, public key infrastructure (PKI), encryption/decryption, interface to Cat6K supervisor, failover/redundancy, image management, and QoS functionality. Although some embodiments of the invention are described herein with reference to PKI keys, embodiments of the invention are not limited to PKI keys. Other keys and/or tokens, such as Kerberos tokens and/or PGP tokens, may be used in conjunction with embodiments of the invention.

In one embodiment, cryptographic key distribution and processing is controlled by user-specified policies that are stored, with the keys, at a central console called an AMC. The policies may state, for example, that different kinds of keys are to be used to encrypt/decrypt/sign different kinds of data traffic. Keys may be associated with policies. The AMC may automatically distribute the key-to-policy associations to user-specified AONS nodes. The AMC also manages the lifecycles of keys, indicating when keys expire, which keys have been revoked, and so forth.

3.4.8 AONS Modes of Operation

AONS may be configured to run in multiple modes depending on application integration needs, and deployment scenarios. According to one embodiment, the primary modes of operation include implicit mode, explicit mode, and proxy mode. In implicit mode, an AONS node transparently intercepts relevant traffic with no changes to applications. In explicit mode, applications explicitly address traffic to an intermediary AONS node. In proxy mode, applications are configured to work in conjunction with AONS nodes, but applications do not explicitly address traffic to AONS nodes.

In implicit mode, applications are unaware of AONS presence. Messages are addressed to receiving applications. Messages are redirected to AONS via configuration of application "proxy" or middleware systems to route messages to AONS, and/or via configuration of networks (packet interception). For example, domain name server (DNS)-based redirection could be used to route messages. For another example, a 5-tuple-based access control list (ACL) on a switch or router could be used. Network-based application recognition and content switching modules may be configured for URL/URI redirection. Message-based inspection may be used to determine message types and classifications. In implicit mode, applications communicate with each other using AONS as an intermediary (implicitly), using application-native protocols.

Figure 9:
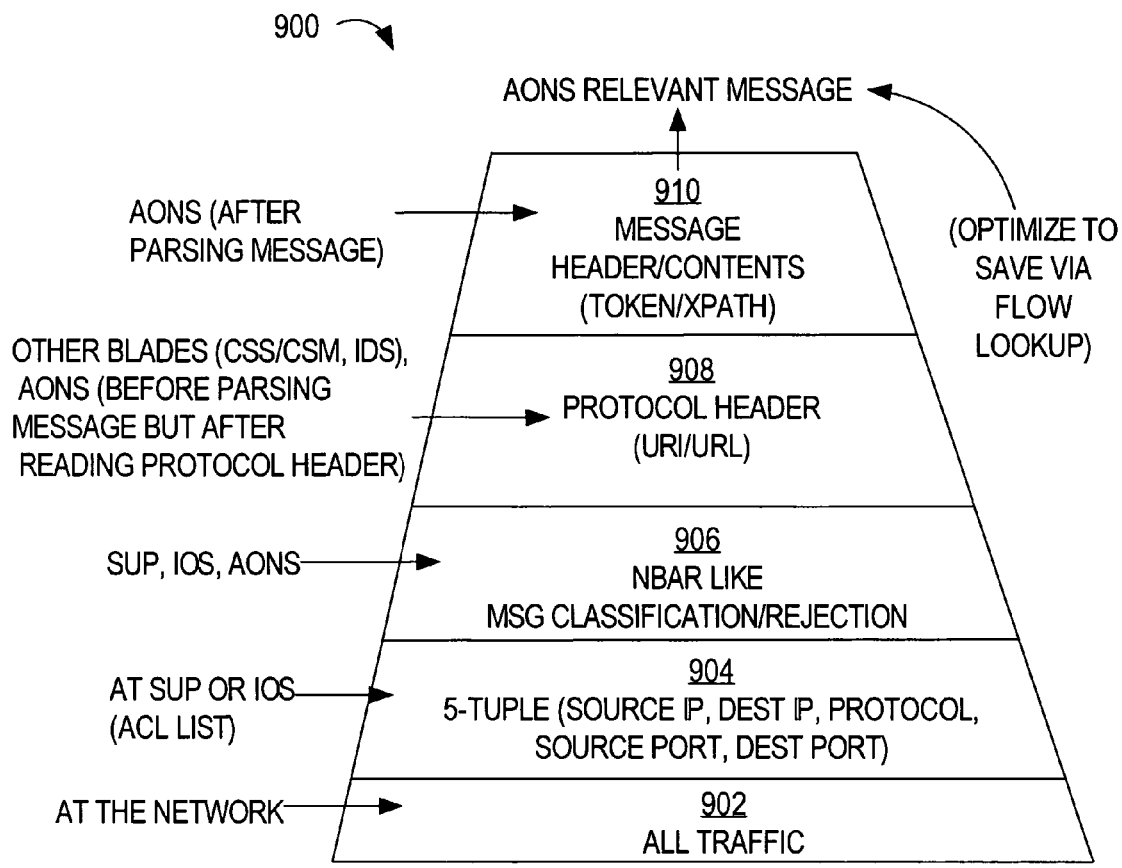
FIG. 9 is a diagram that shows multiple tiers of filtering that may be performed on message traffic in order to produce only a select set of traffic that will be processed at the AONS layer.

Traffic redirection, message classification, and "early rejection" (sending traffic out of AONS layers prior to complete processing within AONS layers) may be accomplished via a variety of mechanisms, such as those depicted in FIG. 9. FIG. 9 shows multiple tiers of filtering that may be performed on message traffic in order to produce only a select set of traffic that will be processed at the AONS layer. Traffic that is not processed at the AONS layer may be treated as any other traffic.

At the lowest layer, layer 902, all traffic passes through. At the next highest layer, layer 904, traffic may be filtered based on 5-tuples. A supervisor blade or a network operating system such as Internetwork Operating System (IOS) may perform such filtering. Traffic that passes the filters at layer 904 passes to layer 906. At layer 906, traffic may be further filtered based on network-based application recognition-like filtering and/or message classification and rejection. Traffic that passes the filters at layer 906 passes to layer 908. At layer 908, traffic may be further filtered based on protocol headers. For example, traffic may be filtered based on URLs/URIs in the traffic. Traffic that passes the filters at layer 908 passes to layer 910. At layer 910, traffic may be processed based on application layer messages, include headers and contents. For example, XPath content identification technology within messages may be used to process traffic at layer 910. An AONS blade may perform processing at layer 910. Thus, a select subset of all network traffic may be provided to an AONS blade.

In explicit mode, applications are aware of AONS presence. Messages are explicitly addressed to AONS nodes. Applications may communicate with AONS using AONP. AONS may perform service virtualization and destination selection.

In proxy mode, applications are explicitly unaware of AONS presence. Messages are addressed to their ultimate destinations (i.e., applications). However, client applications are configured to direct traffic via a proxy mode.

3.4.9 AONS Message Routing

Components of message management in AONS may be viewed from two perspectives: a node view and a cloud view.

Figure 10:
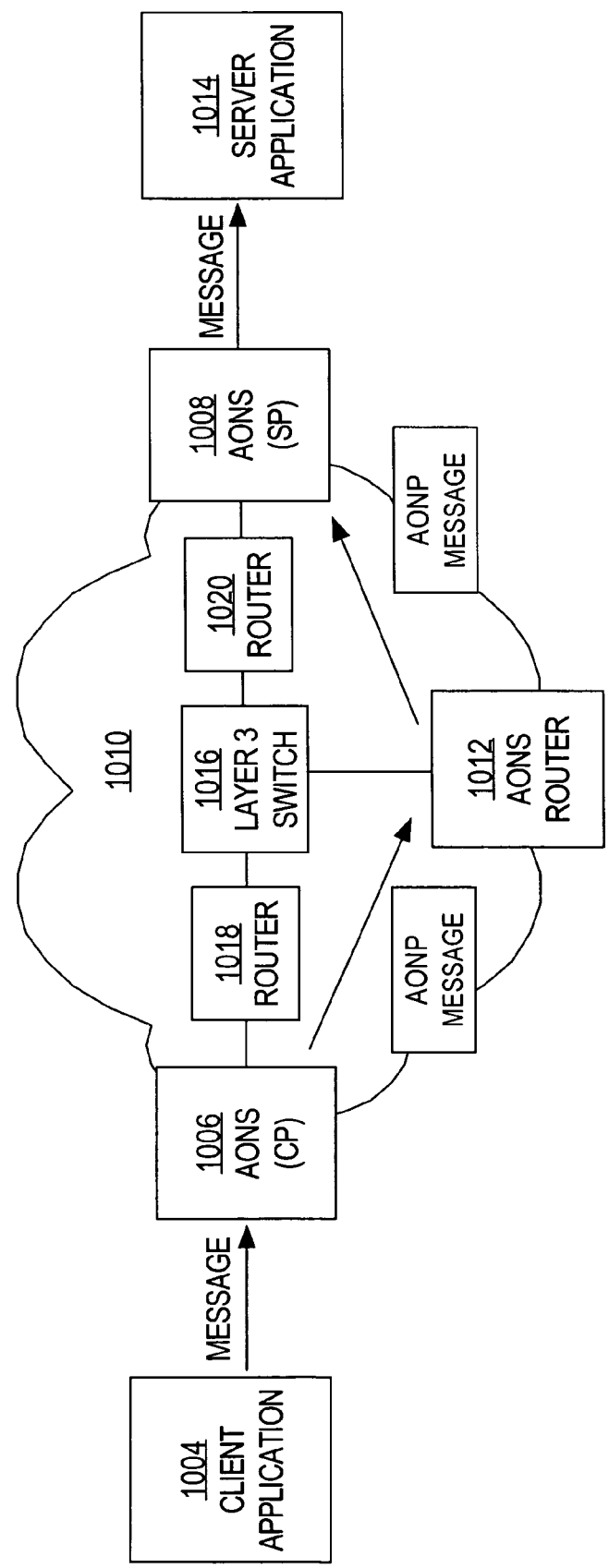
FIG. 10 is a diagram that illustrates the path of a message within an AONS cloud according to a cloud view.

FIG. 10 is a diagram that illustrates the path of a message within an AONS cloud 1010 according to a cloud view. A client application 1004 sends a message to an AONS Client Proxy (CP) 1006. If AONS CP 1006 is not present, then client application 1004 may send the message to an AONS Server Proxy (SP) 1008. The message is processed at AONS CP 1006. AONS CP 1006 transforms the message into AONP format if the message is entering AONS cloud 1010.

Within AONS cloud 1010, the message is routed using AONP. Thus, using AONP, the message may be routed from AONS CP 1006 to an AONS router 1012, or from AONS CP 1006 to AONS SP 1008, or from AONS router 1012 to another AONS router, or from AONS router 1012 to AONS SP 1008. Messages processed at AONS nodes are processed in AONP format.

When the message reaches AONS SP 1008, AONS SP 1008 transforms the message into the message format used by server application 1014. AONS SP 1008 routes the message to server application 1014 using the message protocol of server application 1014. Alternatively, if AONS SP 1008 is not present, AONS CP 1006 may route the message to server application 1014.

The details of the message processing within AONS cloud 1010 can be understood via the following perspectives: Request/Response Message Flow, One-Way Message Flow, Message Flow with Reliable Delivery, Node-to-Node Communication, and multicast publish-subscribe.

Figure 11A:
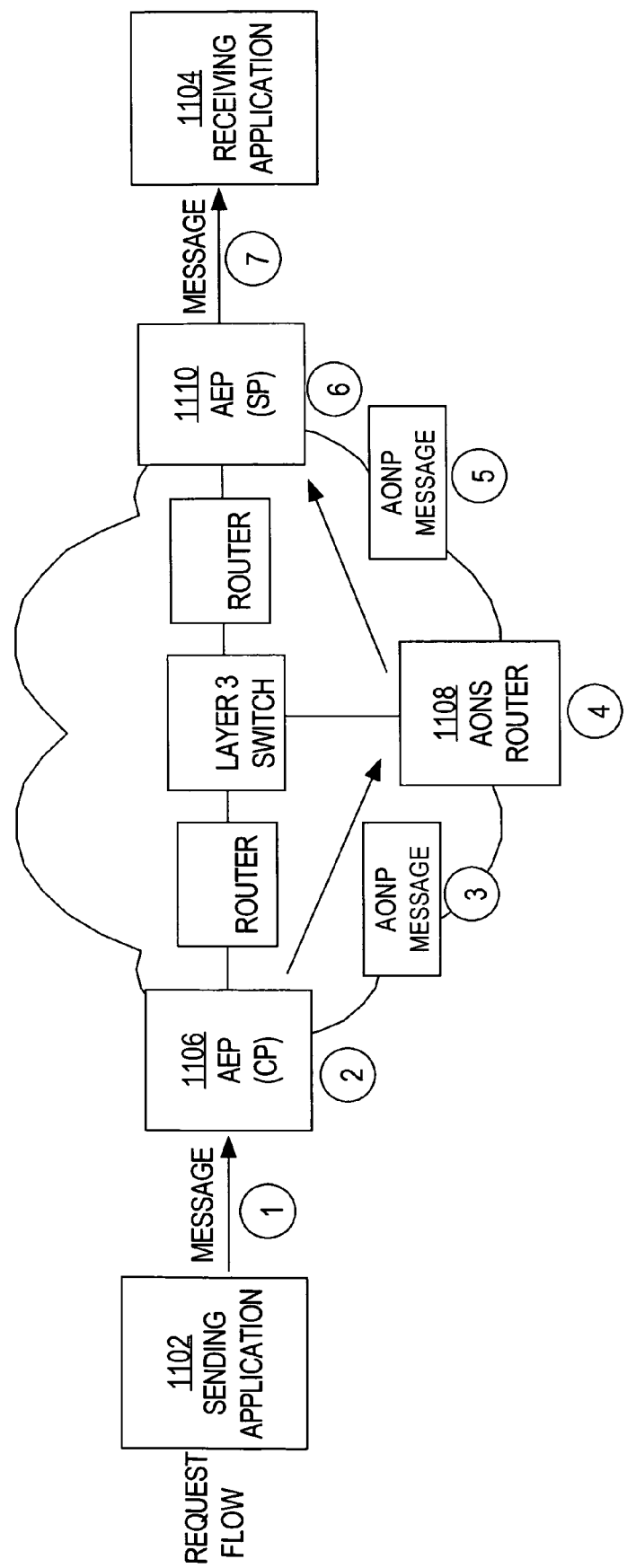
FIG. 11A and FIG. 11B are diagrams that illustrate a request/response message flow.
Figure 11B:
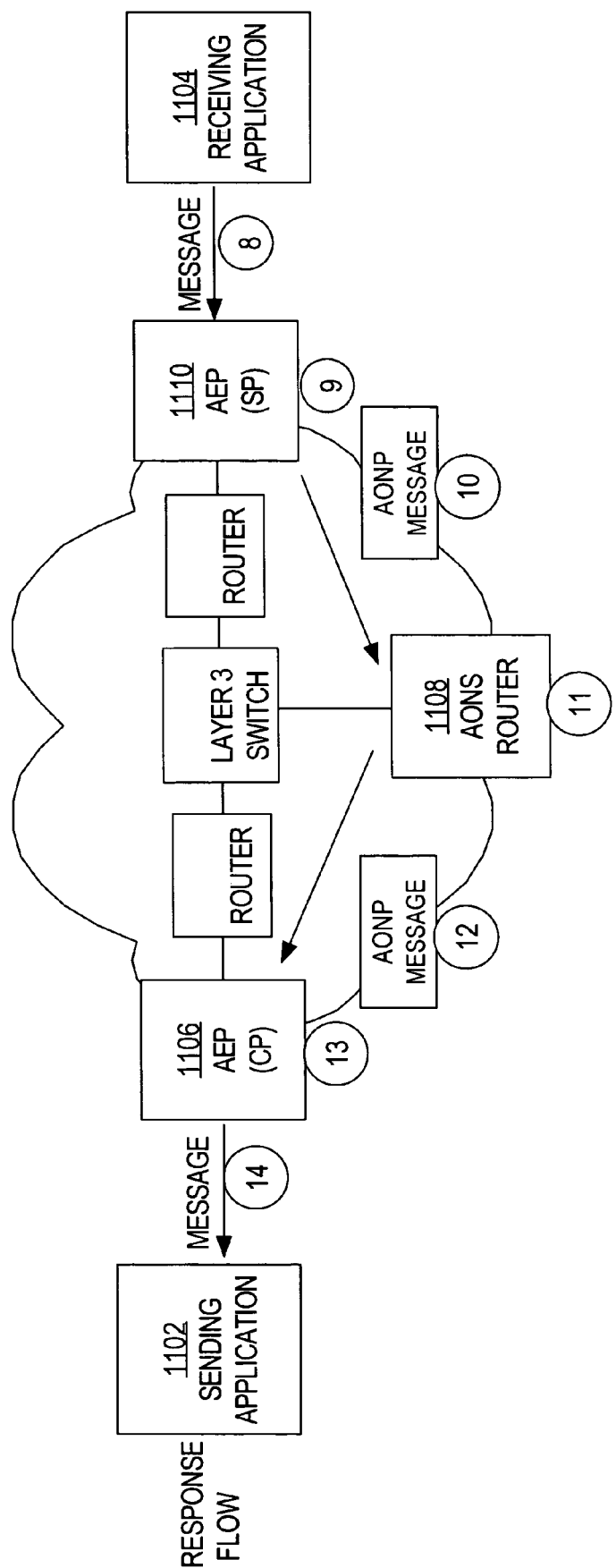

FIG. 11A and FIG. 11B are diagrams that illustrate a request/response message flow. Referring to FIG. 11A, at circumscribed numeral 1, a sending application 1102 sends a message towards a receiving application 1104. At circumscribed numeral 2, an AEP CP 1106 intercepts the message and adds an AONP header to the message, forming an AONP message. At circumscribed numeral 3, AEP CP 1106 sends the AONP message to an AONS router 1108. At circumscribed numeral 4, AONS router 1108 receives the AONP message. At circumscribed numeral 5, AONS router 1108 sends the AONP message to an AEP SP 1110. At circumscribed numeral 6, AEP SP 1110 receives the AONP message and removes the AONP header from the message, thus decapsulating the message. At circumscribed numeral 7, AEP SP 1110 sends the message to receiving application 1104.

Referring to FIG. 11B, at circumscribed numeral 8, receiving application 1104 sends a response message toward sending application 1102. At circumscribed numeral 9, AEP SP 1110 intercepts the message and adds an AONP header to the message, forming an AONP message. At circumscribed numeral 10, AEP SP 1110 sends the AONP message to AONS router 1108. At circumscribed numeral 11, AONS router 1108 receives the AONP message. At circumscribed numeral 12, AONS router 1108 sends the AONP message to AEP CP 1106. At circumscribed numeral 13, AEP CP 1106 receives the AONP message and removes the AONP header from the message, thus decapsulating the message. At circumscribed numeral 14, AEP CP 1106 sends the message to sending application 1102. Thus, a request is routed from sending application 1102 to receiving application 1104, and a response is routed from receiving application 1104 to sending application 1102.

Figure 12A:
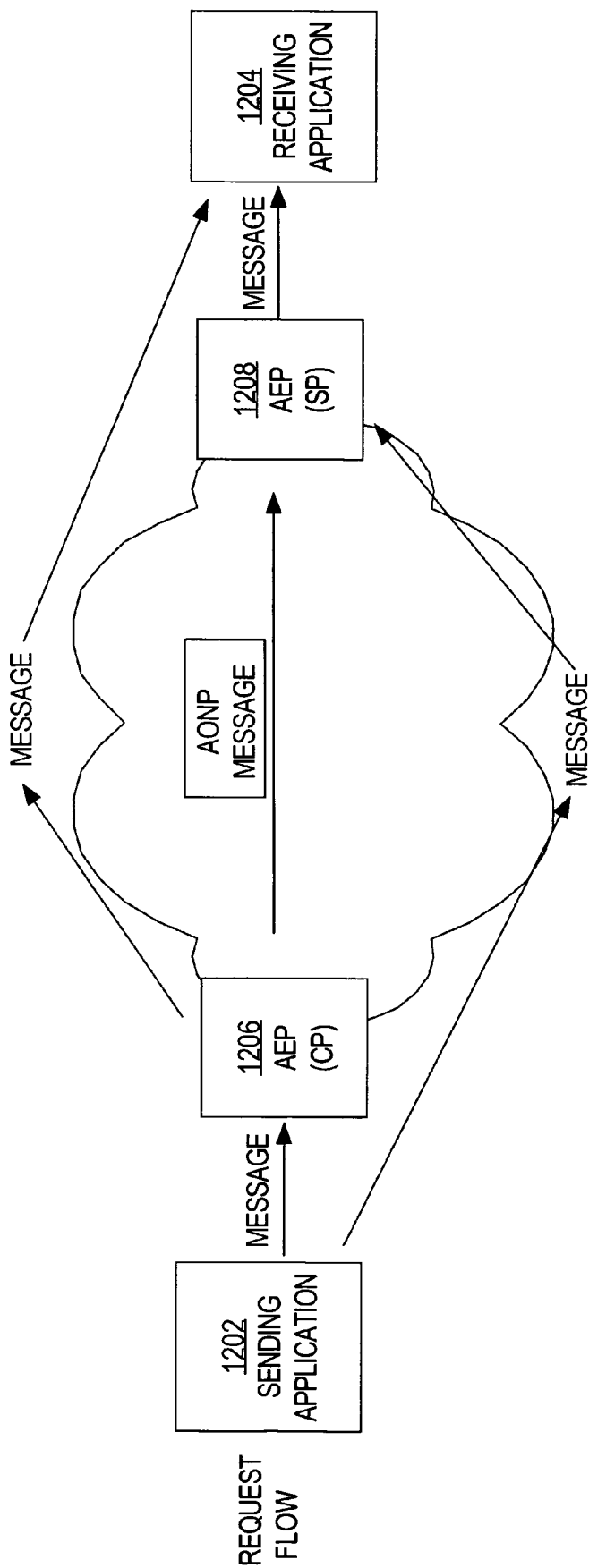
FIG. 12A and FIG. 12B are diagrams that illustrate alternative request/response message flows.
Figure 12B:
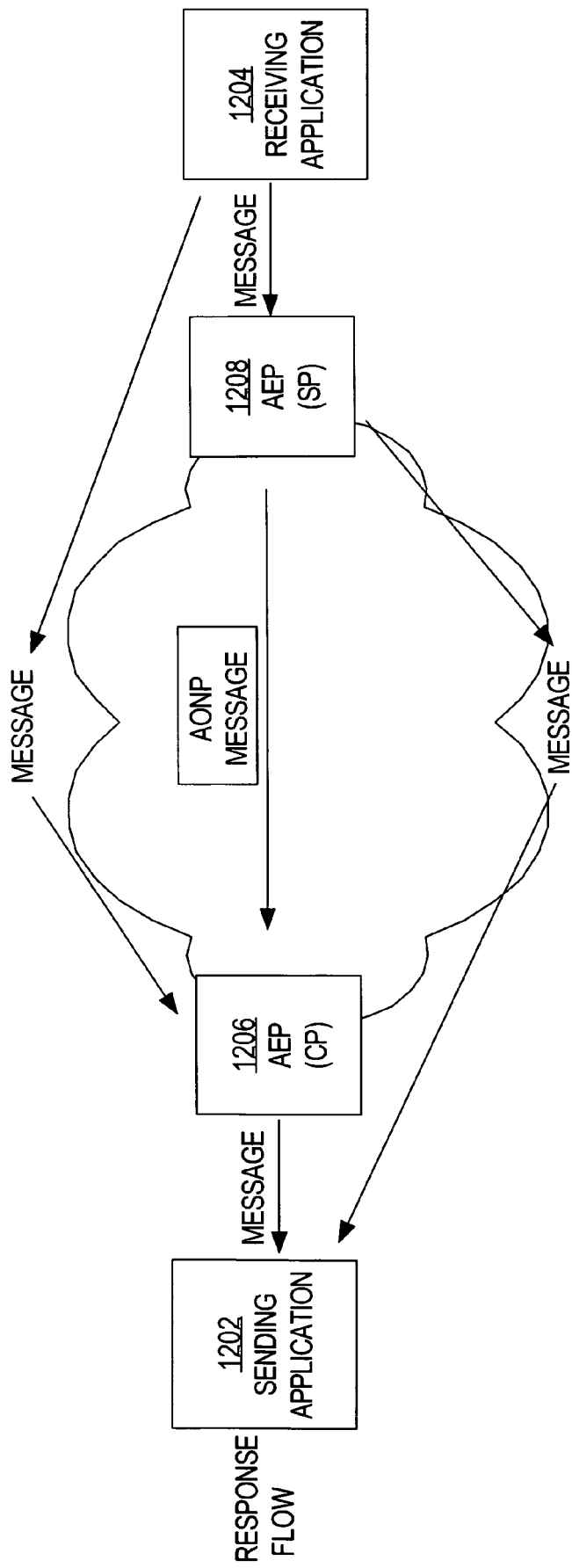

FIG. 12A and FIG. 12B are diagrams that illustrate alternative request/response message flows. FIG. 12A shows three possible routes that a message might take from a sending application 1202 to a receiving application 1204. According to a first route, sending application 1202 sends the message toward receiving application 1204, but an AEP CP 1206 intercepts the message and sends the message to receiving application 1204. According to a second route, sending application 1202 sends the message toward receiving application 1204, but AEP CP 1206 intercepts the message, encapsulates the message within an AONP message, and sends the AONP message to an AEP SP 1208, which decapsulates the message from the AONP message and sends the message to receiving application 1204. According to a third route, sending application 1202 sends the message toward receiving application 1204, but AEP SP 1208 intercepts the message and sends the message to receiving application 1204.

FIG. 12B shows three possible routes that a response message might take from receiving application 1204 to sending application 1202. According to a first route, receiving application 1204 sends the message toward sending application 1202, but AEP CP 1206 intercepts the message and sends the message to sending application 1204. According to a second route, receiving application 1204 sends the message toward sending application 1202, but AEP SP 1208 intercepts the message, encapsulates the message within an AONP message, and sends the AONP message to AEP CP 1206, which decapsulates the message from the AONP message and sends the message to sending application 1202. According to a third route, receiving application 1204 sends the message toward sending application 1202, but AEP SP 1208 intercepts the message and sends the message to sending application 1202.

Figure 13:
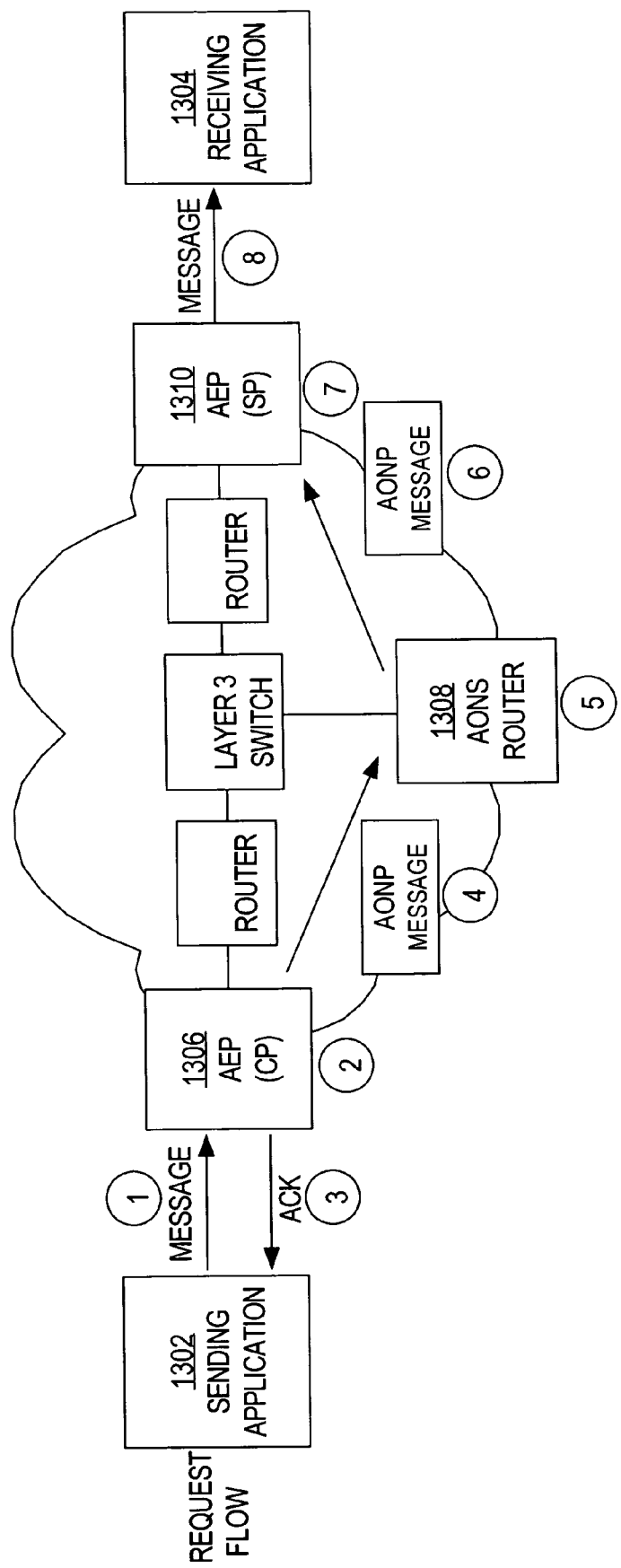
FIG. 13 is a diagram that illustrates a one-way message flow.

FIG. 13 is a diagram that illustrates a one-way message flow. At circumscribed numeral 1, a sending application 1302 sends a message towards a receiving application 1304. At circumscribed numeral 2, an AEP CP 1306 intercepts the message and adds an AONP header to the message, forming an AONP message. At circumscribed numeral 3, AEP CP 1306 sends an ACK (acknowledgement) back to sending application 1302. At circumscribed numeral 4, AEP CP 1306 sends the AONP message to an AONS router 1308. At circumscribed numeral 5, AONS router 1308 receives the AONP message. At circumscribed numeral 6, AONS router 1308 sends the AONP message to an AEP SP 1310. At circumscribed numeral 7, AEP SP 1310 receives the AONP message and removes the AONP header from the message, thus decapsulating the message. At circumscribed numeral 8, AEP SP 1310 sends the message to receiving application 1304.

Figure 14:
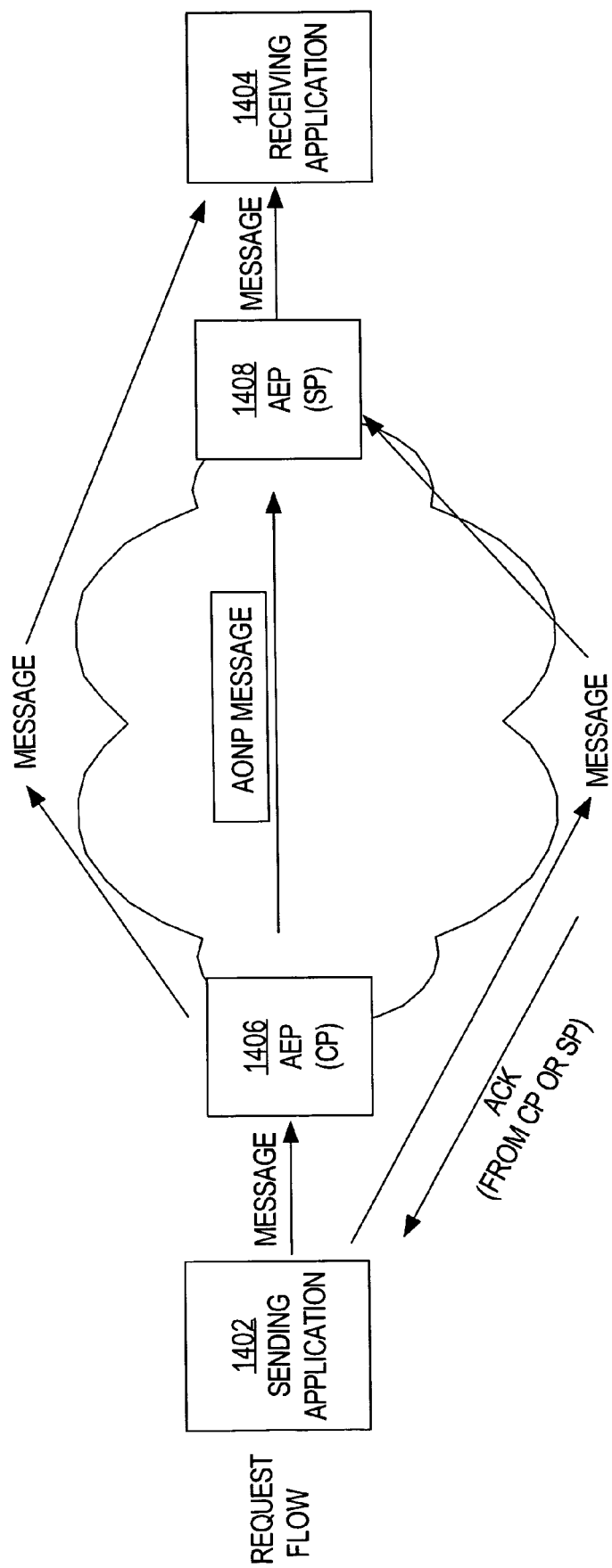
FIG. 14 is a diagram that illustrates alternative one-way message flows.

FIG. 14 is a diagram that illustrates alternative one-way message flows. FIG. 14 shows three possible routes that a message might take from a sending application 1402 to a receiving application 1404. According to a first route, sending application 1402 sends the message toward receiving application 1404, but an AEP CP 1406 intercepts the message and sends the message to receiving application 1404. AEP CP 1406 sends an ACK (acknowledgement) to sending application 1402. According to a second route, sending application 1402 sends the message toward receiving application 1404, but AEP CP 1406 intercepts the message, encapsulates the message within an AONP message, and sends the AONP message to an AEP SP 1408, which decapsulates the message from the AONP message and sends the message to receiving application 1404. Again, AEP CP 1406 sends an ACK to sending application 1402. According to a third route, sending application 1402 sends the message toward receiving application 1404, but AEP SP 1408 intercepts the message and sends the message to receiving application 1404. In this case, AEP SP 1408 sends an ACK to sending application 1402. Thus, when an AEP intercepts a message, the intercepting AEP sends an ACK to the sending application.

According to one embodiment, AONP is used in node-to-node communication with the next hop. In one embodiment, AONP uses HTTP. AONP headers may include HTTP or TCP headers. AONP may indicate RM ACK, QoS level, message priority, and message context (connection, message sequence numbers, message context identifier, entry node information, etc.). The actual message payload is in the message body. Asynchronous messaging may be used between AONS nodes. AONS may conduct route and node discovery via static configuration (next hop) and/or via dynamic discovery and route advertising ("lazy" discovery).

Figure 15B:
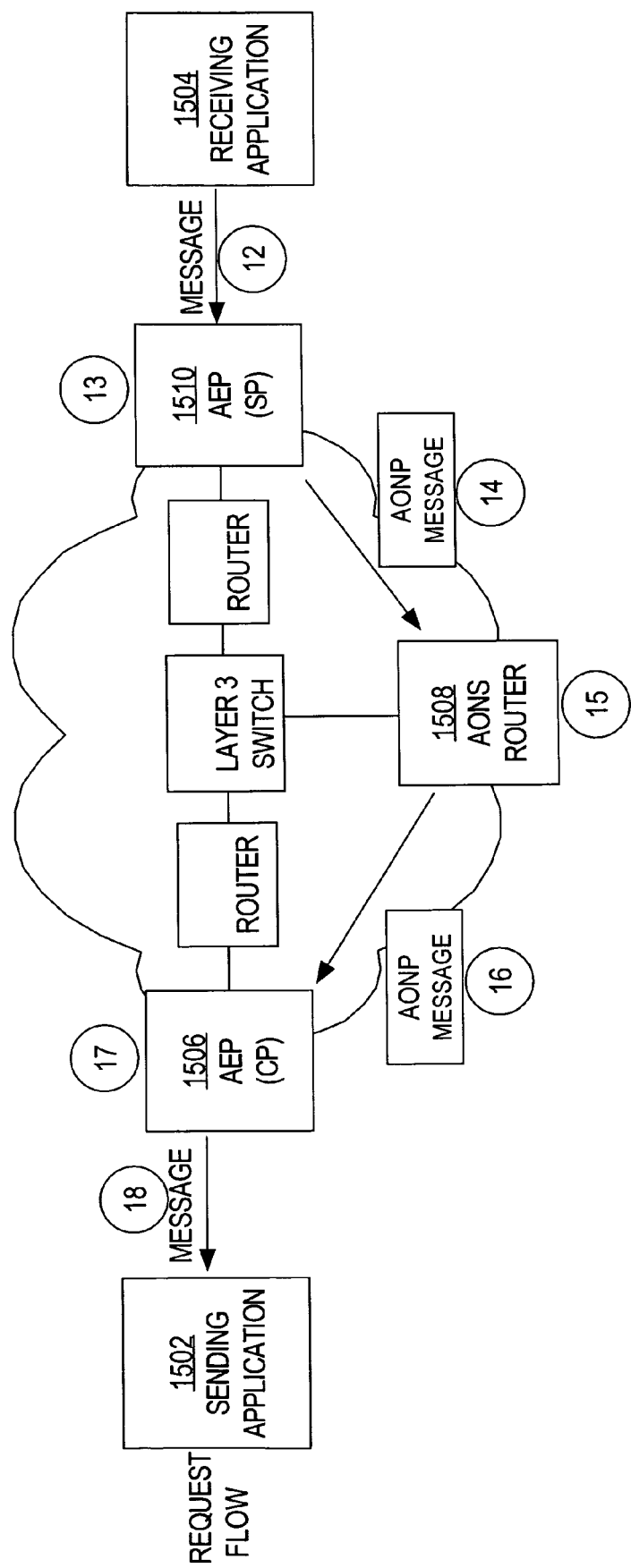

FIG. 15A and FIG. 15B are diagrams that illustrate a request/response message flow with reliable message delivery. Referring to FIG. 15A, at circumscribed numeral 1, a sending application 1502 sends a message towards a receiving application 1504. At circumscribed numeral 2, an AEP CP 1506 intercepts the message and adds an AONP header to the message, forming an AONP message. At circumscribed numeral 3, AEP CP 1506 saves the message to a data store 1512. Thus, if there are any problems with sending the message, AEP CP 1506 can resend the copy of the message that is stored in data store 1512.

At circumscribed numeral 4, AEP CP 1506 sends the AONP message to an AONS router 1508. At circumscribed numeral 5, AONS router 1508 receives the AONP message. At circumscribed numeral 6, AONS router 1508 sends the AONP message to an AEP SP 1510. At circumscribed numeral 7, AEP SP 1510 receives the AONP message and removes the AONP header from the message, thus decapsulating the message. At circumscribed numeral 8, AEP SP 1510 sends the message to receiving application 1504.

At circumscribed numeral 9, AEP SP 1510 sends a reliable messaging (RM) acknowledgement (ACK) to AONS router 1508. At circumscribed numeral 10, AONS router 1508 receives the RM ACK and sends the RM ACK to AEP CP 1506. At circumscribed numeral 11, AEP CP 1506 receives the RM ACK and, in response, deletes the copy of the message that is stored in data store 1512. Because the delivery of the message has been acknowledged, there is no further need to store a copy of the message in data store 1512. Alternatively, if AEP CP 1506 does not receive the RM ACK within a specified period of time, then AEP CP 1506 resends the message.

Referring to FIG. 15B, at circumscribed numeral 12, receiving application 1504 sends a response message toward sending application 1502. At circumscribed numeral 13, AEP SP 1510 intercepts the message and adds an AONP header to the message, forming an AONP message. At circumscribed numeral 14, AEP SP 1510 sends the AONP message to AONS router 1508. At circumscribed numeral 15, AONS router 1508 receives the AONP message. At circumscribed numeral 16, AONS router 1508 sends the AONP message to AEP CP 1506. At circumscribed numeral 17, AEP CP 1506 receives the AONP message and removes the AONP header from the message, thus decapsulating the message. At circumscribed numeral 18, AEP CP 1506 sends the message to sending application 1502.

Figure 16:
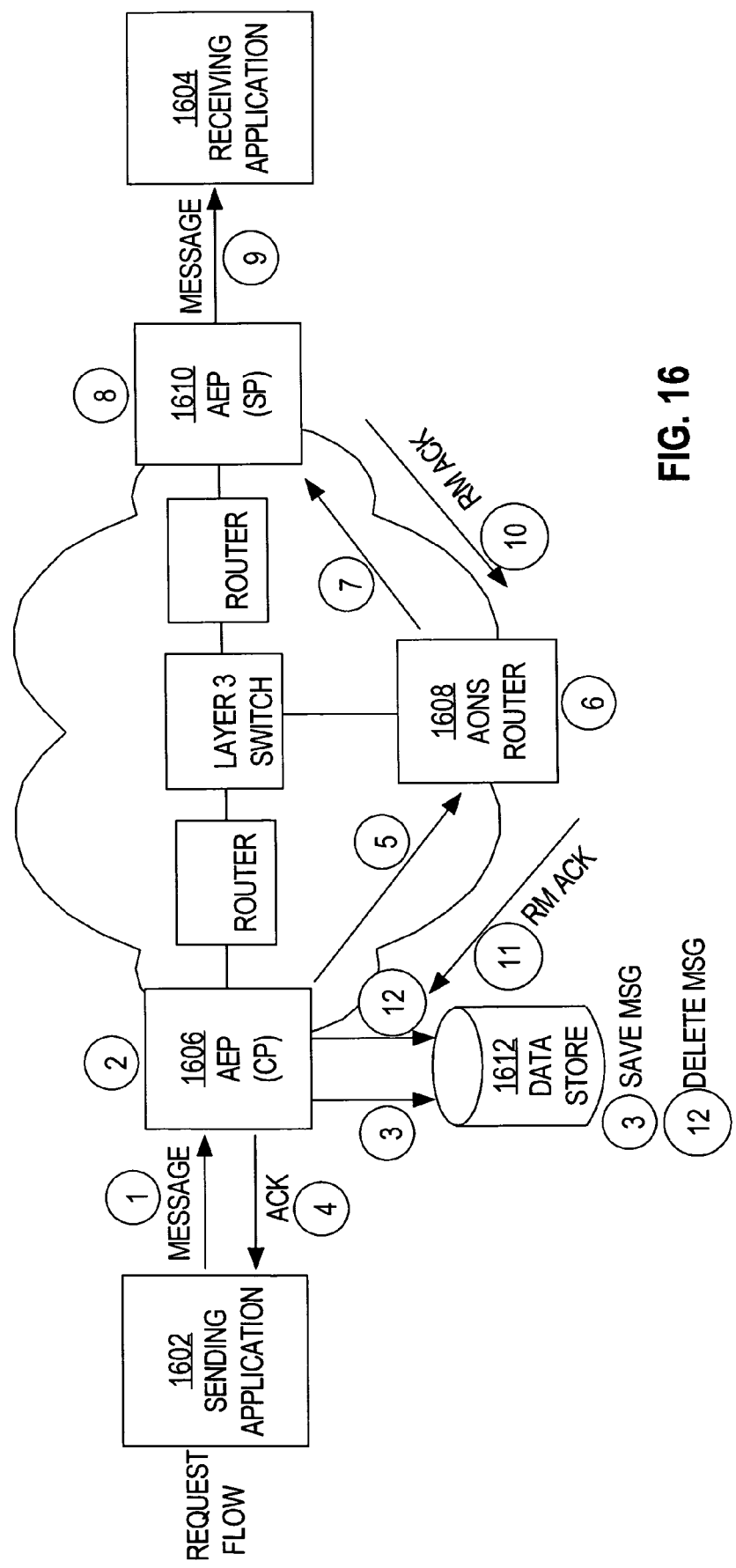
FIG. 16 is a diagram that illustrates a one-way message flow with reliable message delivery.

FIG. 16 is a diagram that illustrates a one-way message flow with reliable message delivery. At circumscribed numeral 1, a sending application 1602 sends a message towards a receiving application 1604. At circumscribed numeral 2, an AEP CP 1606 intercepts the message and adds an AONP header to the message, forming an AONP message. At circumscribed numeral 3, AEP CP 1606 saves the message to a data store 1612. Thus, if there are any problems with sending the message, AEP CP 1606 can resend the copy of the message that is stored in data store 1612. At circumscribed numeral 4, AEP CP 1606 sends an ACK (acknowledgement) back to sending application 1602. At circumscribed numeral 5, AEP CP 1606 sends the AONP message to an AONS router 1608. At circumscribed numeral 6, AONS router 1608 receives the AONP message. At circumscribed numeral 7, AONS router 1608 sends the AONP message to an AEP SP 1610. At circumscribed numeral 8, AEP SP 1610 receives the AONP message and removes the AONP header from the message, thus decapsulating the message. At circumscribed numeral 9, AEP SP 1610 sends the message to receiving application 1604.

At circumscribed numeral 10, AEP SP 1610 sends a reliable messaging (RM) acknowledgement (ACK) to AONS router 1608. At circumscribed numeral 11, AONS router 1608 receives the RM ACK and sends the RM ACK to AEP CP 1606. At circumscribed numeral 12, AEP CP 1606 receives the RM ACK and, in response, deletes the copy of the message that is stored in data store 1612. Because the delivery of the message has been acknowledged, there is no further need to store a copy of the message in data store 1612. Alternatively, if AEP CP 1606 does not receive the RM ACK within a specified period of time, then AEP CP 1606 resends the message. If the resend is not successful within a timeout period, a "delivery-failure" notification message will be send to the original sending application.

Figure 17:
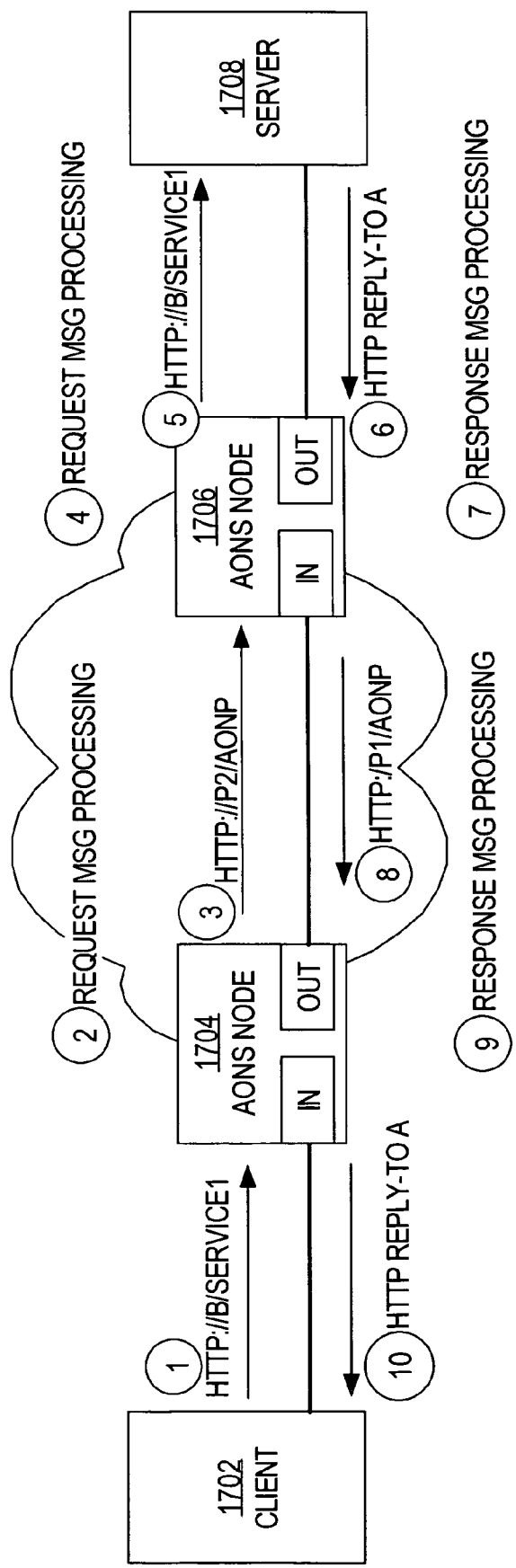
FIG. 17 is a diagram that illustrates synchronous request and response messages.

FIG. 17 is a diagram that illustrates synchronous request and response messages. At circumscribed numeral 1, an AONS node 1704 receives, from a client 1702, a request message, in either implicit or explicit mode. At circumscribed numeral 2, AONS node 1704 reads the message, selects and executes a flow, and adds an AONP header to the message. At circumscribed numeral 3, AONS node 1704 sends the message to a next hop node, AONS node 1706. At circumscribed numeral 4, AONS node 1706 reads the message, selects and executes a flow, and removes the AONP header from the message, formatting the message according to the message format expected by a server 1708. At circumscribed numeral 5, AONS node 1706 sends the message to the message's destination, server 1708.

At circumscribed numeral 6, AONS node 1706 receives a response message from server 1708 on the same connection on which AONS node 1706 sent the request message. At circumscribed numeral 7, AONS node 1706 reads the message, correlates the message with the request message, executes a flow, and adds an AONP header to the message. At circumscribed numeral 8, AONS node 1706 sends the message to AONS node 1704. At circumscribed numeral 9, AONS node 1704 reads the message, correlates the message with the request message, executes a flow, and removes the AONP header from the message, formatting the message according to the message format expected by client 1702. At circumscribed numeral 10, AONS node 1704 sends the message to client 1702 on the same connection on which client 1702 sent the request message to AONS node 1704.

Figure 18:
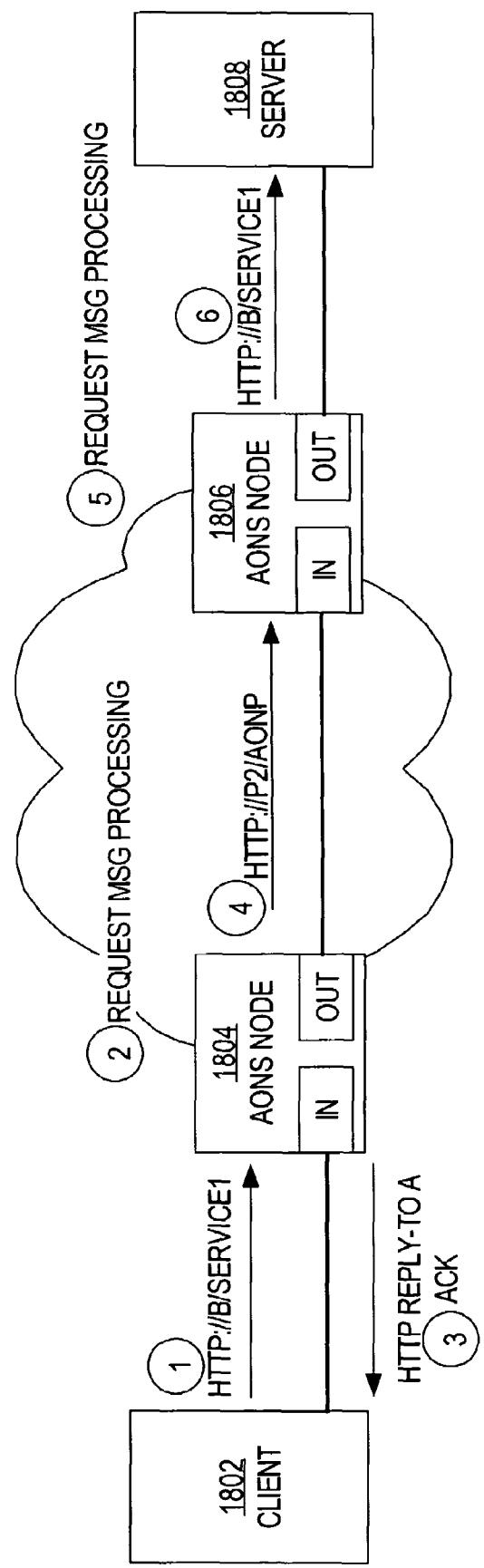
FIG. 18 is a diagram that illustrates a sample one-way end-to-end message flow.

FIG. 18 is a diagram that illustrates a sample one-way end-to-end message flow. At circumscribed numeral 1, an AONS node 1804 receives, from a client 1802, a request message, in either implicit or explicit mode. At circumscribed numeral 2, AONS node 1804 reads the message, selects and executes a flow, and adds an AONP header to the message. At circumscribed numeral 3, AONS node 1804 sends an acknowledgement to client 1802. At circumscribed numeral 4, AONS node 1804 sends the message to a next hop node, AONS node 1806. At circumscribed numeral 5, AONS node 1806 reads the message, selects and executes a flow, and removes the AONP header from the message, formatting the message according to the message format expected by a server 1808. At circumscribed numeral 6, AONS node 1806 sends the message to the message's destination, server 1808.

According to the node view, the message lifecycle within an AONS node, involves ingress/egress processing, message processing, message execution control, and flow execution.

Figure 19:
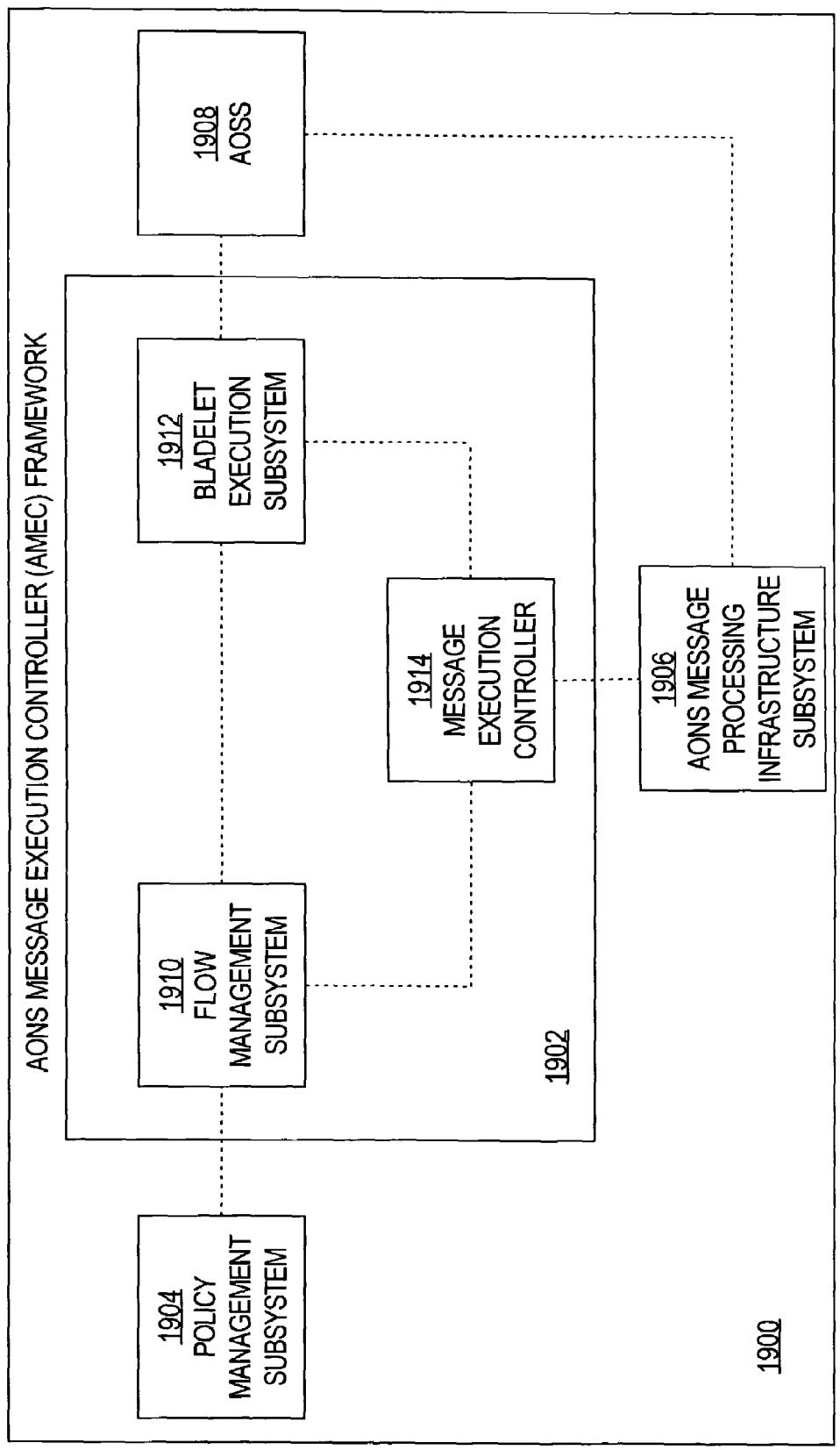
FIG. 19 is a diagram that illustrates message-processing modules within an AONS node.

FIG. 19 is a diagram that illustrates message-processing modules within an AONS node 1900. AONS node 1900 comprises an AONS message execution controller (AMEC) framework 1902, a policy management subsystem 1904, an AONS message processing infrastructure subsystem 1906, and an AOSS 1908. AMEC framework 1902 comprises a flow management subsystem 1910, a bladelet™ execution subsystem 1912, and a message execution controller 1914. Policy management subsystem 1904 communicates with flow management subsystem 1910. AOSS 1908 communicates with bladelet™ execution subsystem 1912 and AONS message processing infrastructure subsystem 1906. AONS message processing infrastructure subsystem 1906 communicates with message execution controller 1914. Flow management subsystem 1910, bladelet™ execution subsystem, and message execution controller 1914 all communicate with each other.

Figure 20:
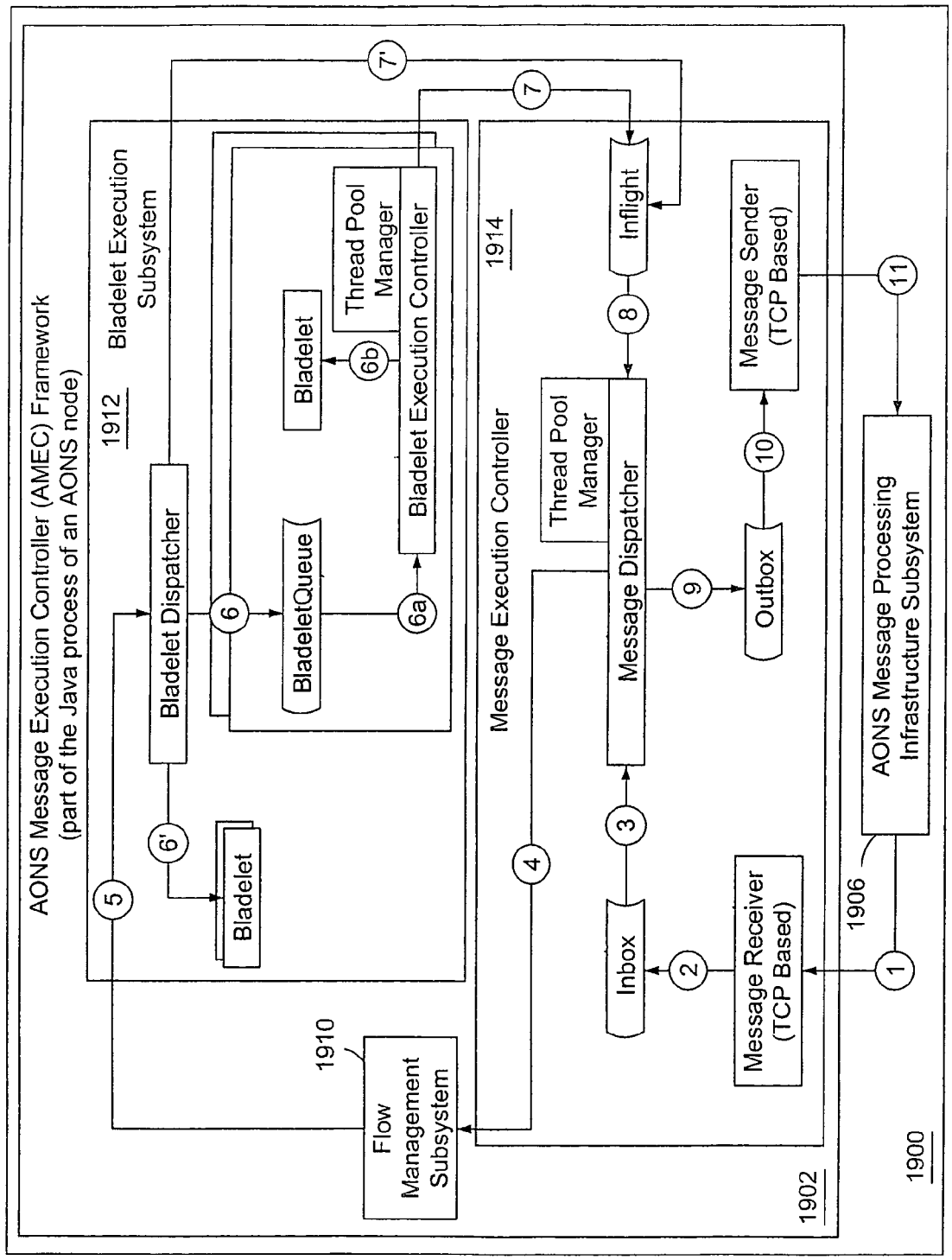
FIG. 20 is a diagram that illustrates message processing within AONS node.

FIG. 20 is a diagram that illustrates message processing within AONS node 1900. AMEC framework 1902 is an event-based multi-threaded mechanism to maximize throughput while minimizing latency for messages in the AONS node. According to one embodiment, received packets are re-directed, TCP termination is performed, SSL termination is performed if needed, Layer 5 protocol adapter and access method processing is performed (using access methods such as HTTP, SMTP, FTP, JMS/MQ, JMS/RV, JDBC, etc.), AONS messages (normalized message format for internal AONS processing) are formed, messages are queued, messages are dequeued based on processing thread availability, a flow (or rule) is selected, the selected flow is executed, the message is forwarded to the message's destination, and for request/response-based semantics, responses are handled via connection/session state maintained within AMEC framework 1902.

In one embodiment, executing the flow comprises executing each step (i.e., bladelet™/action) of the flow. If a bladelet™ is to be run within a separate context, then AMEC framework 1902 may enqueue into bladelet™-specific queues, and, based on thread availability, dequeue appropriate bladelet™ states from each bladelet™ queue.

3.4.10 Flows, Bladelets™, and Scriptlets™

According to one embodiment, flows string together bladelets™ (i.e., actions) to customize message processing logic. Scriptlets™ provide a mechanism for customers and partners to customize or extend native AONS functionality. Some bladelets™ and services may be provided with an AONS node.

3.4.11 AONS Services

As mentioned in the previous section, a set of core services may be provided by AONS to form the underlying foundation of value-added functionality that can be delivered via an AONS node. In one embodiment, these include: Security Services, Standard Compression Services, Delta Compression Services, Caching Service, Message Logging Service, Policy Management Service (Policy Manager), Reliable Messaging Service, Publish/Subscribe Service, Activity Monitoring Service, Message Distribution Service, XML Parsing Service, XSLT Transformation Service, and QoS Management Service. In one embodiment, each AONS core service is implemented within the context of a service framework.

3.4.12 AONS Configuration and Management

In one embodiment, an AONS node is provisioned and configured for a class of application messages, where it enforces the policies that are declaratively defined on behalf-of the application end-points, business-domains, security-domains, administrative domains, and network-domains. Furthermore, the AONS node promotes flexible composition and customization of different product functional features by means of configurability and extensibility of different software and hardware sub-systems for a given deployment scenario. Due to the application and network embodiments of the AONS functionality, the AONS architecture framework should effectively and uniformly address different aspects of configurability, manageability, and monitorability of the various system components and their environments.

The AONS Configuration and Management framework is based upon five functional areas ("FCAPS") for network management as recommended by the ISO network management forum. The functional areas include fault management, configuration management, accounting management, performance management, and security management. Fault management is the process of discovering, isolating, and fixing the problems or faults in the AONS nodes. Configuration management is the process of finding and setting up the AONS nodes. Accounting management involves tracking usage and utilization of AONS resources to facilitate their proper usage. Performance management is the process of measuring the performance of the AONS system components and the overall system. Security management controls access to information on the AONS system. Much of the above functionality is handled via proper instrumentation, programming interfaces, and tools as part of the overall AONS solution.

Figure 21:
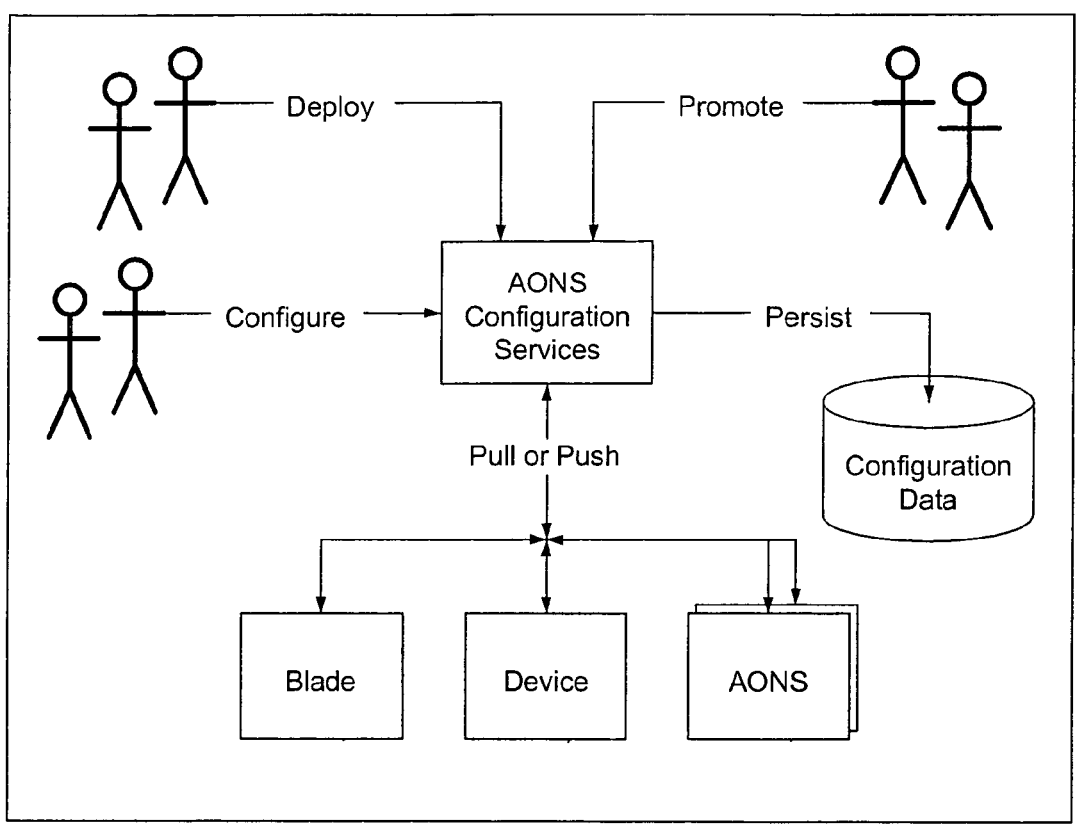
FIG. 21, FIG. 22, and FIG. 23 are diagrams that illustrate entities within an AONS configuration and management framework.
Figure 22:
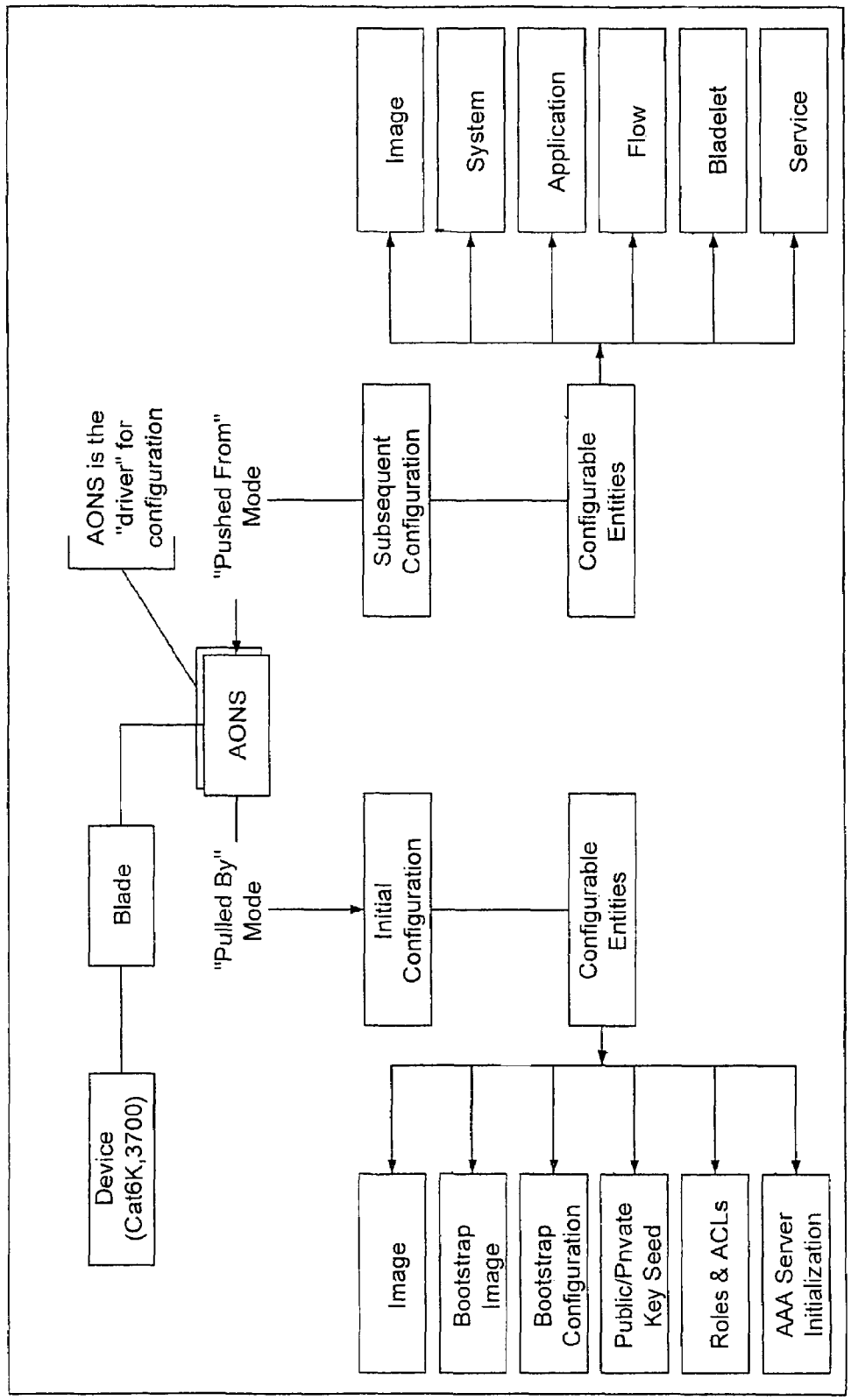
Figure 23:
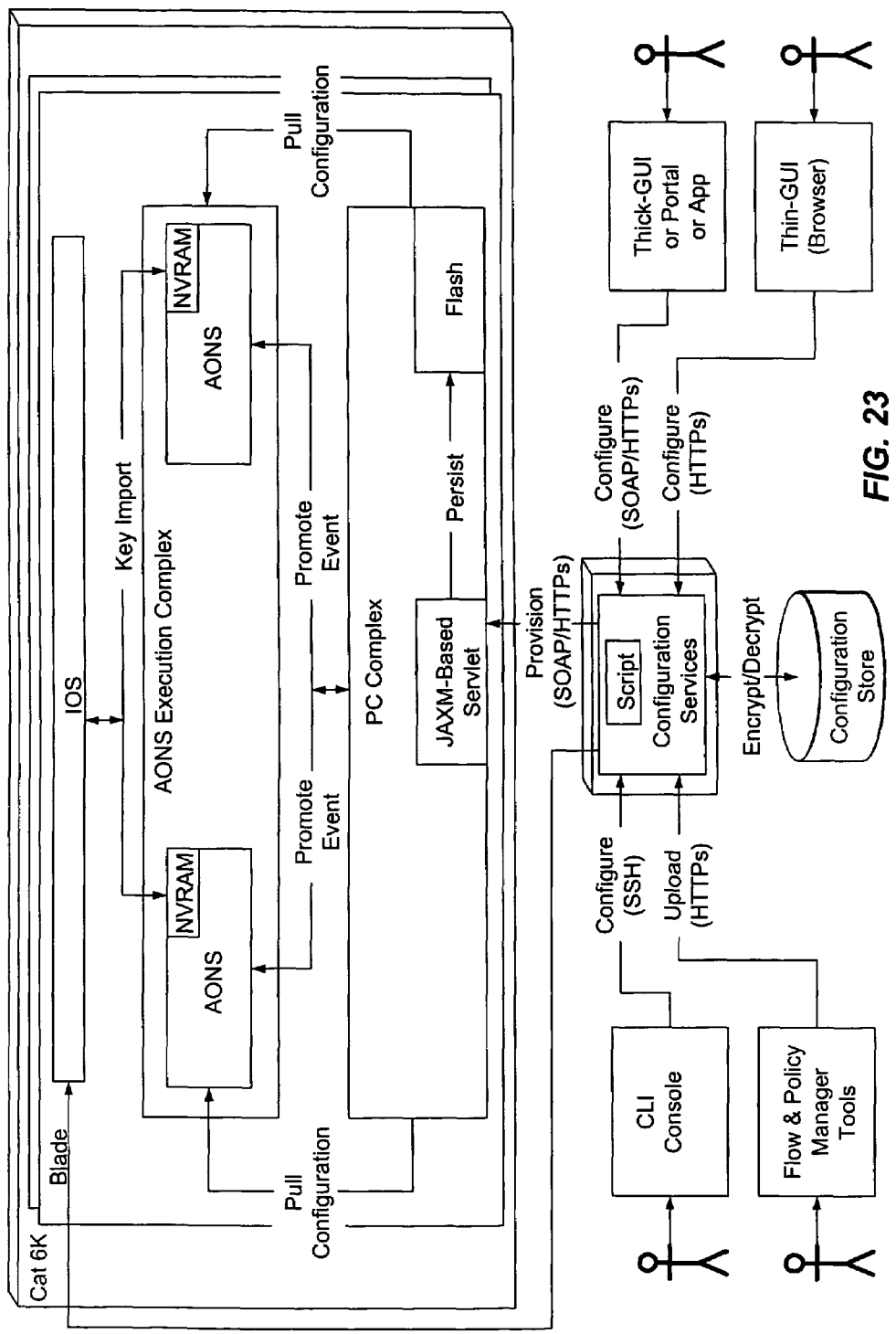

FIG. 21, FIG. 22, and FIG. 23 are diagrams that illustrate entities within an AONS configuration and management framework. An AONS management console (AMC) is the centralized hub for configuration and management of AONS policies, flows, scriptlets™ and other manageable entities. Configurable data is pushed to the AMC from an AONS design studio (flow tool) and the AONS admin may then provision this data to the production deployment. A promotion process is also provided to test and validate changes via a development to staging/certification to production rollout process. An AONS management agent (AMA) resides on individual AONS blades and provides the local control and dispatch capabilities for AONS. The AMA interacts with the AMC to get updates. The AMA takes appropriate actions to implement changes. The AMA is also used for collecting monitoring data to report to third party consoles.

3.4.13 AONS Monitoring

Figure 24:
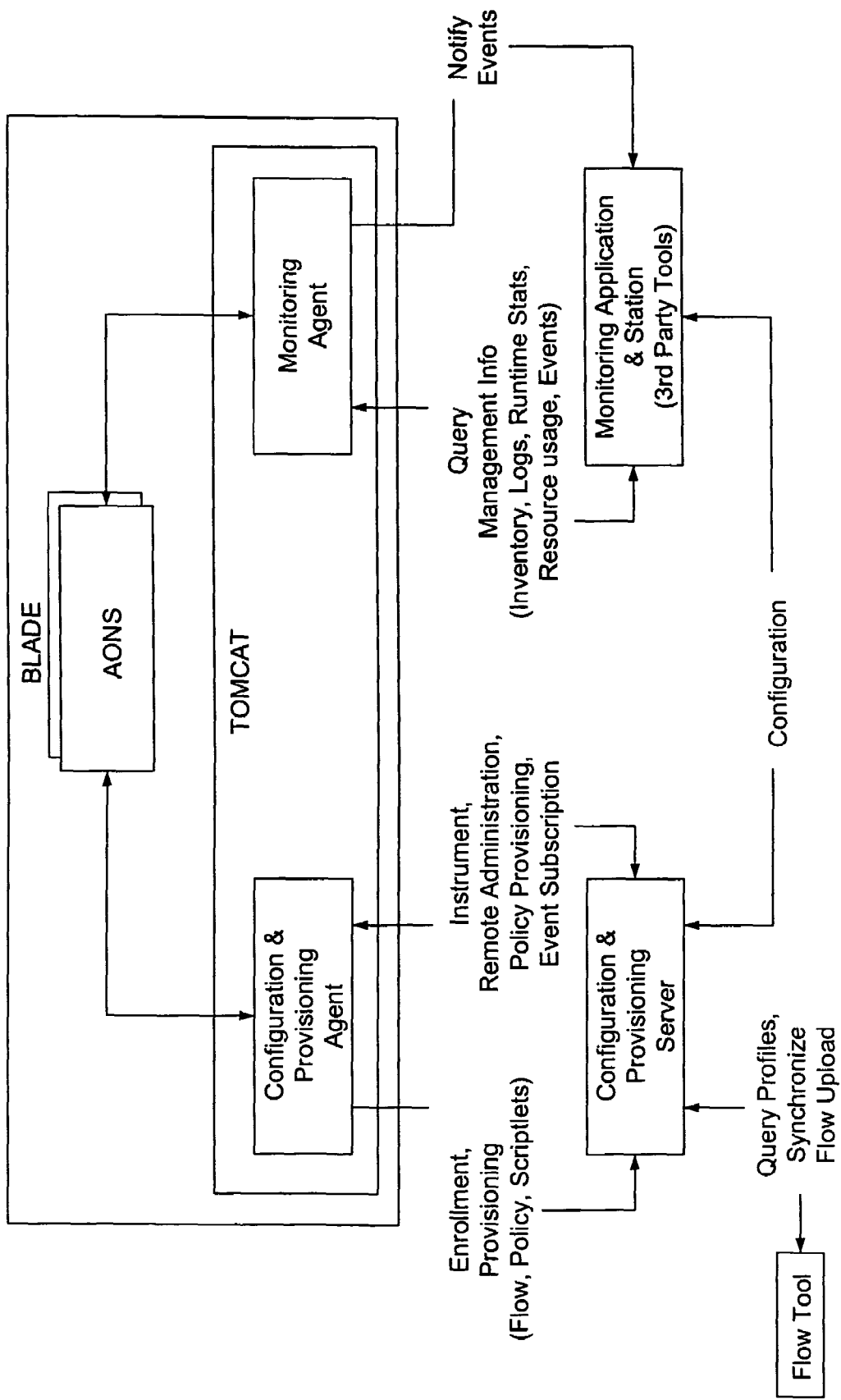
FIG. 24 is a diagram that illustrates an AONS monitoring architecture.

In one embodiment, AONS is instrumented to support well-defined events for appropriate monitoring and visibility into internal processing activities. The monitoring of AONS nodes may be accomplished via a pre-defined JMX MBean agent that is running on each AONS node. This agent communicates with a remote JMX MBean server on the PC complex. An AONS MIB is leveraged for SNMP integration to third party consoles. FIG. 24 is a diagram that illustrates an AONS monitoring architecture.

3.4.14 AONS Tools

In one embodiment, the following tool sets are provided for various functional needs of AONS: a design studio, an admin studio, and a message log viewer. The design studio is a visual tool for designing flows and applying message classification and mapping policies. The admin studio is a web-based interface to perform all administration and configuration functions. The message log viewer is a visual interface to analyze message traffic, patterns, and trace information.

4.0 IMPLEMENTATION MECHANISMS—HARDWARE OVERVIEW

Figure 5:
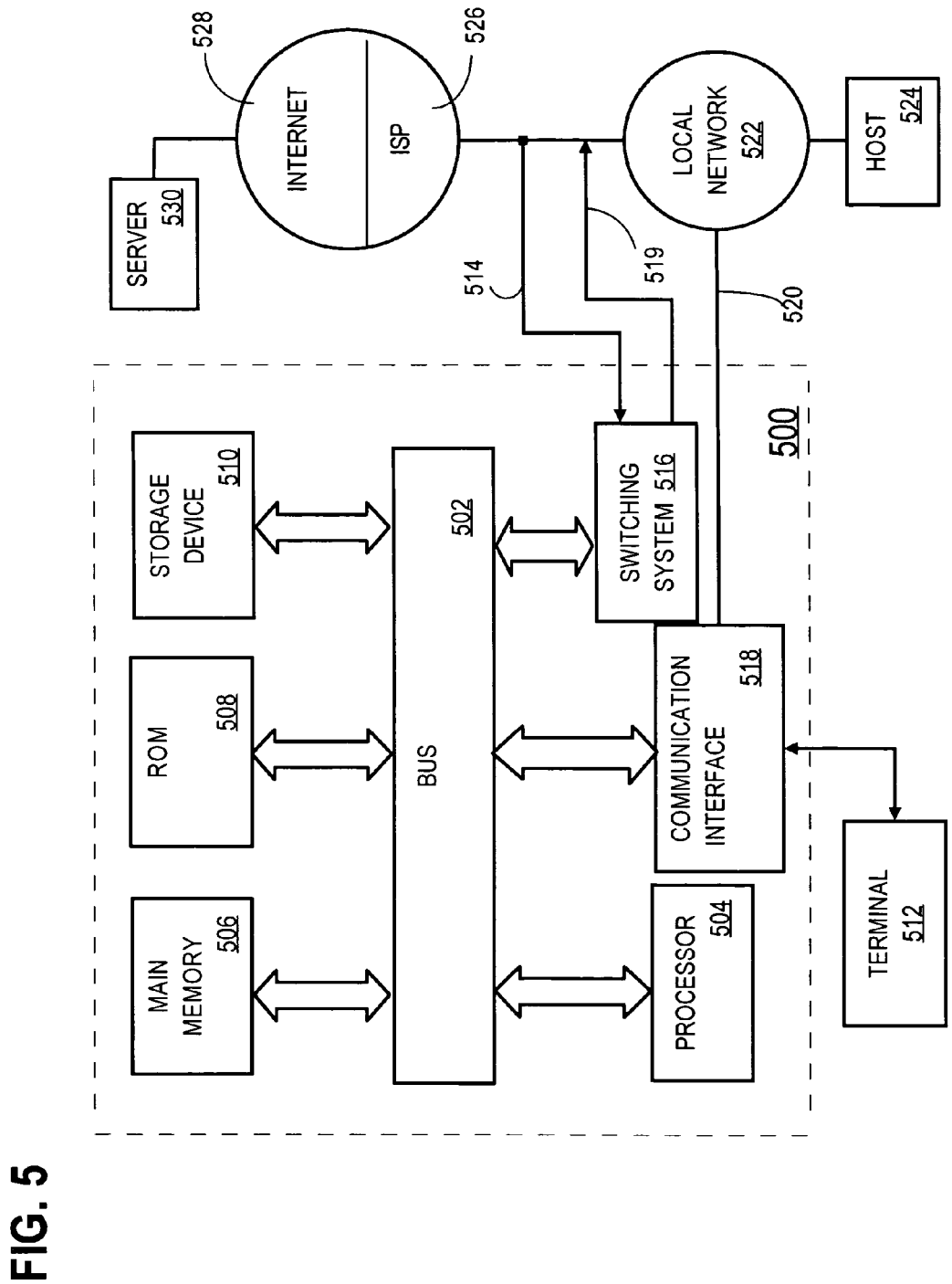
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a proxy device. Thus, in this embodiment, the computer system 500 is a proxy device such as a load balancer.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-322 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for avoiding the storage of client state on computer system 500. According to one embodiment of the invention, computer system 500 provides for such updating in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for avoiding the storage of client state on a server as described herein.

Processor 504 may execute the received code as it is received and/or stored in storage device 510 or other non-volatile storage for later execution. In this manner, computer system 500 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing security functions on a message payload in a network element, the method comprising the computer-implemented steps of:

intercepting, at the network element, one or more data packets comprising network layer or transport layer headers having a destination address that differs from an address of the network element;

determining whether the headers of the data packets match a particular set of criteria;

in response to determining that the headers of the data packets do not match the particular set of criteria, forwarding the data packets to the destination address without performing one or more security functions; and in response to determining that the headers of the data packets match the particular set of criteria, determining whether to perform the one or more security functions relative to at least a portion of an application layer message by performing, at the network element:

assembling payloads of the data packets into at least a portion of an application layer message;

determining whether the portion of the application layer message satisfies second criteria associated with a known message classification;

in response to determining that the portion of the application layer message does not satisfy the second criteria, forwarding the data packets to the destination address without performing the one or more security functions; and in response to determining that the portion of the application layer message satisfies the second criteria, performing the one or more security functions on at least the portion of the application layer message;

wherein each of the one or more security functions is any of an encryption function, a decryption function, a digest function, an authentication function, an authorization function, or an auditing function.

2. A method as recited in claim 1, wherein the particular set of criteria comprises at least one of an IP source address, an IP destination address, a TCP source port, and a TCP destination port.

3. A method as recited in claim 1, wherein performing the one or more security functions comprises performing the one or more security functions using a cryptographic key that is associated with an application, wherein the application is one of (a) an application that sent the one or more data packets and (b) an application for which the one or more data packets are destined.

4. A method as recited in claim 3, wherein the cryptographic key is stored at the network element.

5. A method as recited in claim 3, wherein the cryptographic key is managed by a central console that is separate from the network element, wherein the central console distributes cryptographic keys and manages lifecycles of cryptographic keys.

6. A method as recited in claim 1, further comprising:
sending, from the network element, one or more data packets that contain at least an encrypted portion of the application layer message, wherein the one or more data packets received by the network element contained an unencrypted version of the encrypted portion.

7. A method as recited in claim 1, further comprising:
sending, from the network element, one or more data packets that contain at least a decrypted portion of the application layer message, wherein the one or more data packets received by the network element contained an encrypted version of the decrypted portion.

8. A method as recited in claim 1, wherein the network element is a network switch or router.

9. A method as recited in claim 1, further comprising:
generating, at the network element, a digest based on the message;
wherein performing the one or more security functions comprises encrypting the digest, thereby signing the message.

10. A method as recited in claim 1, further comprising:
generating, at the network element, a first digest based on the message; and
comparing the first digest to a second digest, thereby verifying the message;
wherein performing the one or more security functions comprises decrypting the second digest.

11. A method as recited in claim 1, wherein performing the particular functions on at least the portion of the application layer message comprises performing the one or more security functions on a portion of the application layer message that is located at a user-specified path in an XML document or a non-XML document.

12. A method as recited in claim 1, wherein the application layer message comprises a multi-part MIME message, and further comprising handling each part of the multi-part MIME message separately and independently from each other part of the multi-part MIME message.

13. A method as recited in claim 1, further comprising:
determining, from information contained in the one or more data packets, an identity of a sender or intended receiver of the one or more data packets;
wherein performing the one or more security functions comprises performing the functions using a key that is associated with the identity.

14. A method as recited in claim 1, further comprising:
determining a type of credential that is contained in the one or more data packets;
based on the type of credential, selecting, from among a plurality of credential stores, a particular credential store that is associated with the type of credential; and
comparing the credential with a credential that is stored in the particular credential store.

15. A method as recited in claim 1, further comprising:
determining a type of credential that is contained in the one or more data packets;
based on the type of credential, selecting, from among a plurality of destinations, a particular destination that is associated with the type of credential; and
sending at least a portion of the application layer message toward the particular destination.

16. A method as recited in claim 1, further comprising:
performing, at the network element, a function on a message that is a request message, a response message, an exception processing message, or a message that was not sent between a client application and a server application as a result of an event or trigger that occurred on the network element.

17. A method as recited in claim 1, further comprising:
determining a particular content that is specified in the application layer message;
determining whether the particular content satisfies a set of constraints; and
in response to determining that the particular content satisfies the set of constraints, performing one or more specified actions.

18. A method as recited in claim 1, further comprising:
looking up security information that is mapped to a username token that is specified in the application layer message; and
sending the security information to a receiving application on behalf of a sending application;
wherein the security information is a certificate or an assertion.

19. A method as recited in claim 1, further comprising:
generating security information that is mapped to a username token that is specified in the application layer message; and
sending the security information to a receiving application on behalf of a sending application;
wherein the security information is a certificate or an assertion.

20. A method as recited in claim 1, further comprising:
determining a first assertion that is contained in the application layer message;
determining a second assertion that is contained in the application layer message, wherein the second assertion differs from the first assertion, and wherein the second assertion is an authoritative certification by a trusted authority concerning the application from which the application layer message originated;
verifying the first assertion; and
verifying the second assertion.

21. A method as recited in claim 1, further comprising:
sending a challenge to an application;
receiving a challenge-response that originated from the application;
determining whether the challenge-response satisfies the challenge; and
in response to determining that the challenge-response satisfies the challenge, performing one or more specified actions.

22. A method as recited in claim 1, further comprising:
sending at least a portion of the application layer message using both a first application layer protocol and Secure Sockets Layer (SSL) protocol;
wherein the application layer message was received at the network element using both SSL protocol and a second application layer protocol that differs from the first application layer protocol.

23. A method as recited in claim 1, further comprising:
sending at least a portion of the application layer message using Secure Sockets Layer (SSL) protocol;
wherein the application layer message was received at the network element as clear text.

24. A method as recited in claim 1, further comprising:
sending at least a portion of the application layer message as clear text;
wherein the application layer message was received at the network element using Secure Sockets Layer (SSL) protocol.

25. A volatile or non-volatile computer-readable medium carrying one or more sequences of instructions for performing security functions on a message payload in a network element, which instructions, when executed by one or more processors, cause the one or more processors to carry out the steps of:
intercepting, at the network element, one or more data packets comprising network layer or transport layer headers having a destination address that differs from an address of the network element;
determining whether the headers of the data packets match a particular set of criteria;
in response to determining that the headers of the data packets do not match the particular set of criteria, forwarding the data packets to the destination address without performing one or more security functions; and
in response to determining that the headers of the data packets match the particular set of criteria, determining whether to perform the one or more security functions relative to at least a portion of an application layer message by performing, at the network element:
assembling payloads of the data packets into at least a portion of an application layer message;
determining whether the portion of the application layer message satisfies second criteria associated with a known message classification;
in response to determining that the portion of the application layer message does not satisfy the second criteria, forwarding the data packets to the destination address without performing the one or more security functions; and
in response to determining that the portion of the application layer message satisfies the second criteria, performing the one or more security functions on at least the portion of the application layer message;
wherein each of the one or more security functions is any of an encryption function, a decryption function, a digest function, an authentication function, an authorization function, or an auditing function.

26. An apparatus for performing security functions on a message payload in a network element, comprising:
one or more processors;
means for intercepting, at the network element, one or more data packets comprising network layer or transport layer headers having a destination address that differs from an address of the network element;
means for determining whether the headers of the data packets match a particular set of criteria;
means for forwarding, in response to determining that the headers of the data packets do not match the particular set of criteria, the data packets to the destination address without performing one or more security functions; and
means for determining whether to perform, at the network element, in response to determining that the headers of the data packets match the particular set of criteria, the one or more security functions relative to at least a portion of an application layer message by performing, comprising:
means for assembling payloads of the data packets into at least a portion of an application layer message;
means for determining whether the portion of the application layer message satisfies second criteria associated with a known message classification;
means for forwarding, in response to determining that the portion of the application layer message does not satisfy the second criteria, the data packets to the destination address without performing the one or more security functions; and
means for performing, in response to determining that the portion of the application layer message satisfies the second criteria, the one or more security functions on at least the portion of the application layer message;
wherein each of the one or more security functions is any of an encryption function, a decryption function, a digest function, an authentication function, an authorization function, or an auditing function.

27. An apparatus for performing security functions on a message payload in a network element, comprising:
a network interface that is coupled to a data network for receiving one or more packet flows therefrom;
a processor;
one or more stored sequences of instructions which, when executed by the processor, cause the processor to carry out the steps of:

intercepting, at the network element, one or more data packets comprising network layer or transport layer headers having a destination address that differs from an address of the network element;

determining whether the headers of the data packets match a particular set of criteria;

in response to determining that the headers of the data packets do not match the particular set of criteria, forwarding the data packets to the destination address without performing one or more security functions; and in response to determining that the headers of the data packets match the particular set of criteria, determining whether to perform the one or more security functions relative to at least a portion of an application layer message by performing, at the network element:

assembling payloads of the data packets into at least a portion of an application layer message;

determining whether the portion of the application layer message satisfies second criteria associated with a known message classification;

in response to determining that the portion of the application layer message does not satisfy the second criteria, forwarding the data packets to the destination address without performing the one or more security functions; and in response to determining that the portion of the application layer message satisfies the second criteria, performing the one or more security functions on at least the portion of the application layer message;

wherein each of the one or more security functions is any of an encryption function, a decryption function, a digest function, an authentication function, an authorization function, or an auditing function.

28. The apparatus of claim 27, wherein the particular set of criteria comprises at least one of an IP source address, an IP destination address, a TCP source port, and a TCP destination port.

29. The apparatus of claim 27, wherein performing the one or more security functions comprises performing the particular functions using a cryptographic key that is associated with an application, wherein the application is one of (a) an application that sent the one or more data packets and (b) an application for which the one or more data packets are destined.

30. The apparatus of claim 29, wherein the cryptographic key is stored at the network element.

31. The apparatus of claim 29, wherein the cryptographic key is managed by a central console that is separate from the network element, wherein the central console distributes cryptographic keys and manages lifecycles of cryptographic keys.

32. The apparatus of claim 27, wherein the sequences of instructions further comprises instructions, which, when executed by the processor, cause the processor to carry out the steps of:

sending, from the network element, one or more data packets that contain at least an encrypted portion of the application layer message, wherein the one or more data packets received by the network element contained an unencrypted version of the encrypted portion.

33. The apparatus of claim 27, wherein the sequences of instructions further comprises instructions, which, when executed by the processor, cause the processor to carry out the steps of:

sending, from the network element, one or more data packets that contain at least a decrypted portion of the application layer message, wherein the one or more data packets received by the network element contained an encrypted version of the decrypted portion.

34. The apparatus of claim 27, wherein the sequences of instructions further comprises instructions, which, when executed by the processor, cause the processor to carry out the steps of:

generating, at the network element, a digest based on the message;

wherein performing the one or more security functions comprises encrypting the digest, thereby signing the message.

35. The apparatus of claim 27, wherein the sequences of instructions further comprises instructions, which, when executed by the processor, cause the processor to carry out the steps of:

generating, at the network element, a first digest based on the message; and comparing the first digest to a second digest, thereby verifying the message;

wherein performing the one or more security functions comprises decrypting the second digest.

36. The apparatus of claim 27, wherein performing the one or more security functions on at least the portion of the application layer message comprises performing the one or more security functions on a portion of the application layer message that is located at a user-specified path in an XML document or a non-XML document.

37. The apparatus of claim 27, wherein the application layer message comprises a multi-part MIME message, and further comprising handling each part of the multi-part MIME message separately and independently from each other part of the multi-part MIME message.

38. The apparatus of claim 27, wherein the sequences of instructions further comprises instructions, which, when executed by the processor, cause the processor to carry out the steps of:

determining, from information contained in the one or more data packets, an identity of a sender or intended receiver of the one or more data packets;

wherein performing the one or more security functions comprises performing the functions using a key that is associated with the identity.

39. The apparatus of claim 27, wherein the sequences of instructions further comprises instructions, which, when executed by the processor, cause the processor to carry out the steps of:

determining, from information contained in the one or more data packets, an identity of a sender or intended receiver of the one or more data packets;

wherein performing the one or more security function wherein the sequences of instructions further comprises instructions, which, when executed by the processor, cause the processor to carry out the steps of: comprises performing the functions using a key that is associated with the identity.

40. The apparatus of claim 27, wherein the sequences of instructions further comprises instructions, which, when executed by the processor, cause the processor to carry out the steps of:

determining a type of credential that is contained in the one or more data packets;

based on the type of credential, selecting, from among a plurality of destinations, a particular destination that is associated with the type of credential; and sending at least a portion of the application layer message toward the particular destination.

41. The apparatus of claim 27, wherein the sequences of instructions further comprises instructions, which, when executed by the processor, cause the processor to carry out the steps of:
performing, at the network element, a function on a message that is a request message, a response message, an exception processing message, or a message that was not sent between a client application and a server application as a result of an event or trigger that occurred on the network element.

42. The apparatus of claim 27, wherein the sequences of instructions further comprises instructions, which, when executed by the processor, cause the processor to carry out the steps of:
determining a particular content that is specified in the application layer message;
determining whether the particular content satisfies a set of constraints; and
in response to determining that the particular content satisfies the set of constraints, performing one or more specified actions.

43. The apparatus of claim 27, wherein the sequences of instructions further comprises instructions, which, when executed by the processor, cause the processor to carry out the steps of:
looking up security information that is mapped to a username token that is specified in the application layer message; and
sending the security information to a receiving application on behalf of a sending application;
wherein the security information is a certificate or an assertion.

44. The apparatus of claim 27, wherein the sequences of instructions further comprises instructions, which, when executed by the processor, cause the processor to carry out the steps of:
generating security information that is mapped to a username token that is specified in the application layer message; and
sending the security information to a receiving application on behalf of a sending application;
wherein the security information is a certificate or an assertion.

45. The apparatus of claim 27, wherein the sequences of instructions further comprises instructions, which, when executed by the processor, cause the processor to carry out the steps of:
determining a first assertion that is contained in the application layer message;
determining a second assertion that is contained in the application layer message, wherein the second assertion differs from the first assertion, and wherein the second assertion is an authoritative certification by a trusted authority concerning the application from which the application layer message originated;
verifying the first assertion; and
verifying the second assertion.

46. The apparatus of claim 27, wherein the sequences of instructions further comprises instructions, which, when executed by the processor, cause the processor to carry out the steps of:
sending a challenge to an application;
receiving a challenge-response that originated from the application;
determining whether the challenge-response satisfies the challenge; and
in response to determining that the challenge-response satisfies the challenge, performing one or more specified actions.

47. The apparatus of claim 27, wherein the sequences of instructions further comprises instructions, which, when executed by the processor, cause the processor to carry out the steps of:
sending at least a portion of the application layer message using both a first application layer protocol and Secure Sockets Layer (SSL) protocol;
wherein the application layer message was received at the network element using both SSL protocol and a second application layer protocol that differs from the first application layer protocol.

48. The apparatus of claim 27, wherein the sequences of instructions further comprises instructions, which, when executed by the processor, cause the processor to carry out the steps of:
sending at least a portion of the application layer message using Secure Sockets Layer (SSL) protocol;
wherein the application layer message was received at the network element as clear text.

49. The apparatus of claim 27, wherein the sequences of instructions further comprises instructions, which, when executed by the processor, cause the processor to carry out the steps of:
sending at least a portion of the application layer message as clear text;
wherein the application layer message was received at the network element using Secure Sockets Layer (SSL) protocol.

50. The apparatus of claim 27, wherein the network element is a network router.

* * * * *